(12) United States Patent
Vroom et al.

(10) Patent No.: US 12,017,139 B2
(45) Date of Patent: Jun. 25, 2024

(54) MOBILE DEVICE CONTROLLER SYSTEMS AND METHODS FOR INTERACTING WITH CLIENT APPLICATIONS

(71) Applicant: Skillz Platform Inc., San Francisco, CA (US)

(72) Inventors: Matthew Leigh Vroom, San Francisco, CA (US); Brandon Douglas Henry Parod, Alameda, CA (US); Kyle Robert Thompson, Placentia, CA (US); Jason Clyde, San Francisco, CA (US)

(73) Assignee: Skillz Platform Inc., Las Vegas, NV (US)

( * ) Notice: Subject to any disclaimer, the term of this patent is extended or adjusted under 35 U.S.C. 154(b) by 0 days.

(21) Appl. No.: 17/929,559

(22) Filed: Sep. 2, 2022

(65) Prior Publication Data

US 2023/0182011 A1 Jun. 15, 2023

Related U.S. Application Data

(60) Provisional application No. 63/364,974, filed on May 19, 2022, provisional application No. 63/240,443, filed on Sep. 3, 2021.

(51) Int. Cl.
*A63F 13/31* (2014.01)
*A63F 13/24* (2014.01)
*A63F 13/92* (2014.01)

(52) U.S. Cl.
CPC .............. *A63F 13/31* (2014.09); *A63F 13/24* (2014.09); *A63F 13/92* (2014.09)

(58) Field of Classification Search
None
See application file for complete search history.

(56) References Cited

U.S. PATENT DOCUMENTS

| 7,580,728 | B2 | 8/2009 | Vance et al. |
| D686,209 | S | 7/2013 | Sun et al. |
| 8,529,357 | B2 | 9/2013 | Joynes et al. |
| 8,788,348 | B2 | 7/2014 | Joynes et al. |
| 8,812,987 | B2 | 8/2014 | Joynes et al. |
| D713,467 | S | 9/2014 | Sawhney et al. |

(Continued)

FOREIGN PATENT DOCUMENTS

| EP | 2896440 A1 | 7/2015 |
| WO | 2014113340 A2 | 7/2014 |

*Primary Examiner* — Peter J Iannuzzi
(74) *Attorney, Agent, or Firm* — Mintz Levin Cohn Ferris Glovsky and Popeo, P.C.

(57) ABSTRACT

In an aspect, a first controller module of a mobile device controller can be engaged with a first side of a mobile device of a user. A second controller module of the mobile device controller can be engaged with a second side of the mobile device. One or more mobile device controller characteristics associated with characteristics of the mobile device controller can be transmitted from the mobile device controller to the mobile device. A client application on the mobile device can be modified by a first data processor based on the one or more mobile device controller characteristics. The modified client application can be provided by the first data processor to the user in the mobile device, and the user can interact with the modified client application using the mobile device controller. Related systems, apparatus, techniques, and articles are also described.

19 Claims, 62 Drawing Sheets

(56) References Cited

U.S. PATENT DOCUMENTS

| | | |
|---|---|---|
| D713,468 S | 9/2014 | Sawhney et al. |
| 8,944,912 B2 | 2/2015 | Joynes et al. |
| 8,944,913 B2 | 2/2015 | Joynes et al. |
| 9,005,025 B2 | 4/2015 | Joynes et al. |
| 9,005,026 B2 | 4/2015 | Joynes et al. |
| D736,859 S | 8/2015 | Joynes |
| 9,114,319 B2 | 8/2015 | Joynes et al. |
| 9,126,119 B2 | 9/2015 | Joynes et al. |
| 9,205,340 B2 | 12/2015 | Sharma et al. |
| 9,216,349 B2 | 12/2015 | South |
| 9,407,100 B2 | 8/2016 | Joynes et al. |
| 9,592,452 B2 | 3/2017 | Townley et al. |
| 9,592,453 B2 | 3/2017 | Townley et al. |
| 9,724,601 B2 | 8/2017 | Fujita et al. |
| 9,751,008 B2 | 9/2017 | Fujita et al. |
| 9,757,647 B2 | 9/2017 | Fujita et al. |
| 9,757,649 B2 | 9/2017 | Townley et al. |
| 9,764,231 B2 | 9/2017 | Townley et al. |
| 9,776,081 B2 | 10/2017 | Fujita et al. |
| 9,782,671 B2 | 10/2017 | Fujita et al. |
| 9,808,713 B1 | 11/2017 | Townley et al. |
| 9,839,842 B2 | 12/2017 | Townley et al. |
| 9,841,786 B2 | 12/2017 | Townley et al. |
| 9,841,824 B2 | 12/2017 | Townley et al. |
| 9,855,498 B2 | 1/2018 | Townley et al. |
| 10,092,830 B2 | 10/2018 | Townley et al. |
| 10,159,895 B2 | 12/2018 | Townley et al. |
| 10,258,876 B2 | 4/2019 | Wells et al. |
| 10,272,325 B1 | 4/2019 | Nevarez |
| 10,391,393 B2 | 8/2019 | Townley et al. |
| 10,610,778 B2 | 4/2020 | Nakayama et al. |
| 10,632,368 B2 | 4/2020 | Fujita |
| 10,716,998 B2 | 7/2020 | Wells et al. |
| 11,045,723 B1 | 6/2021 | Lee et al. |
| 2014/0274394 A1 | 9/2014 | Willis |
| 2017/0315678 A1* | 11/2017 | Helmes ................ G06F 1/1632 |
| 2021/0308566 A1* | 10/2021 | Kong .................... A63F 13/24 |

* cited by examiner

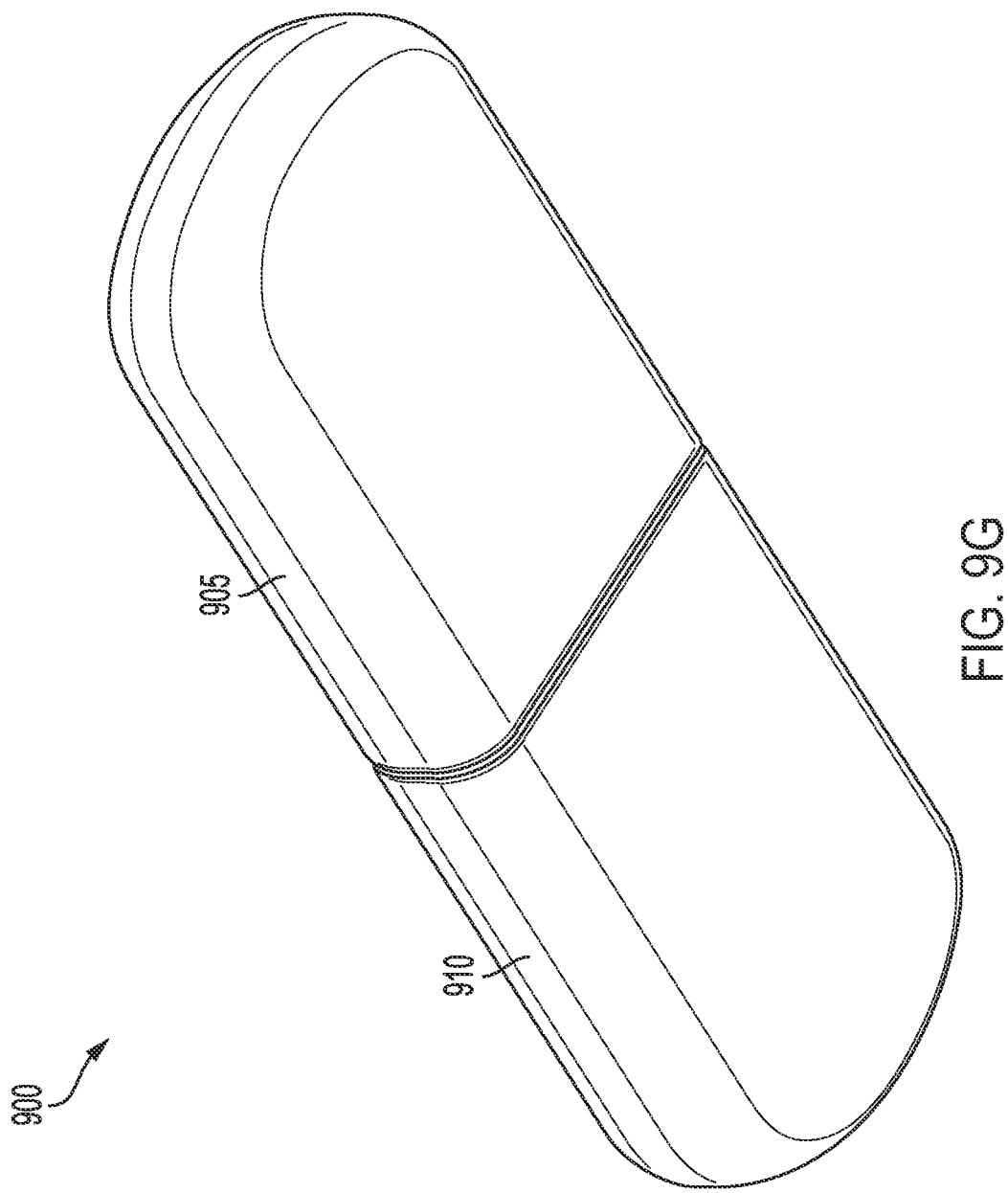

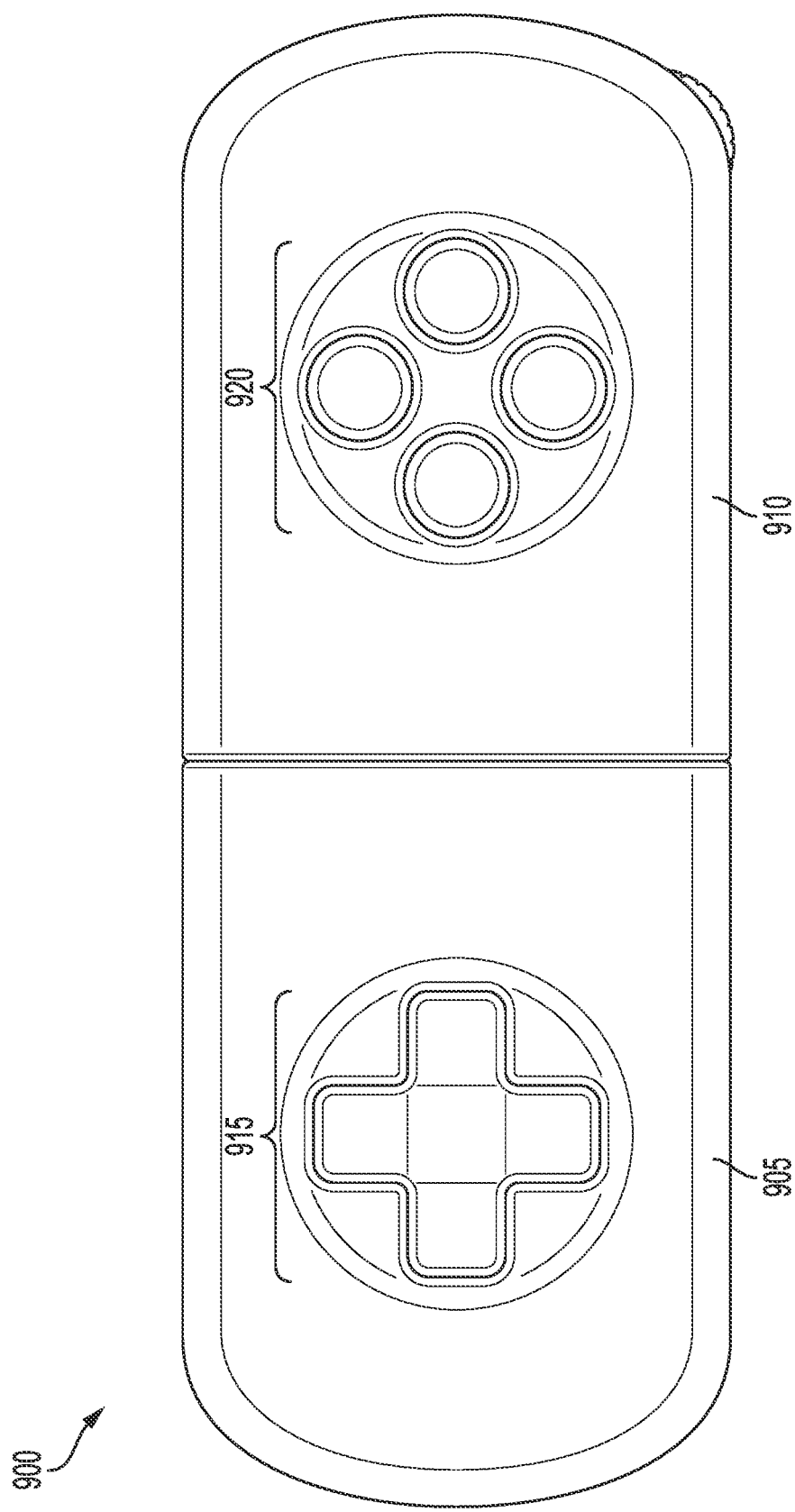

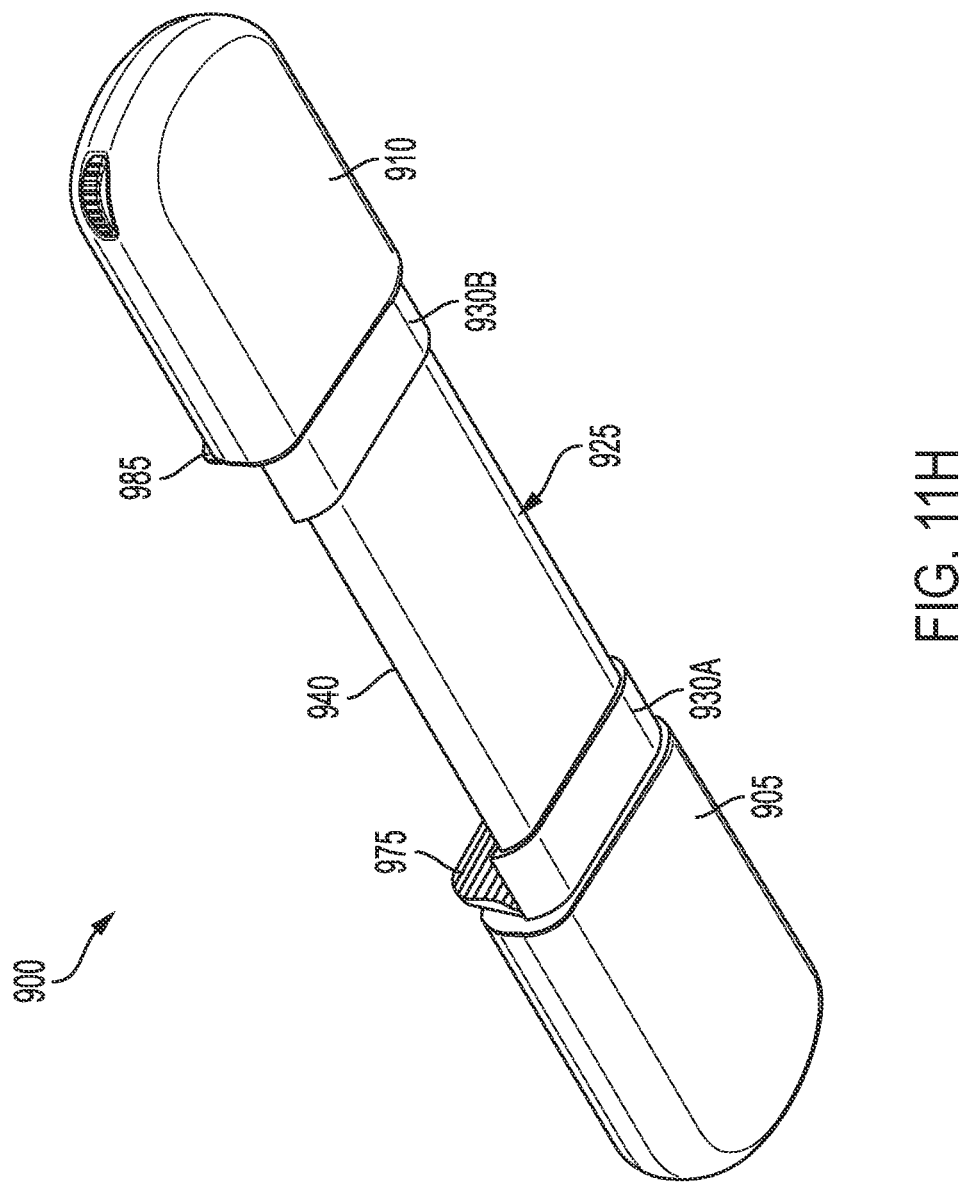

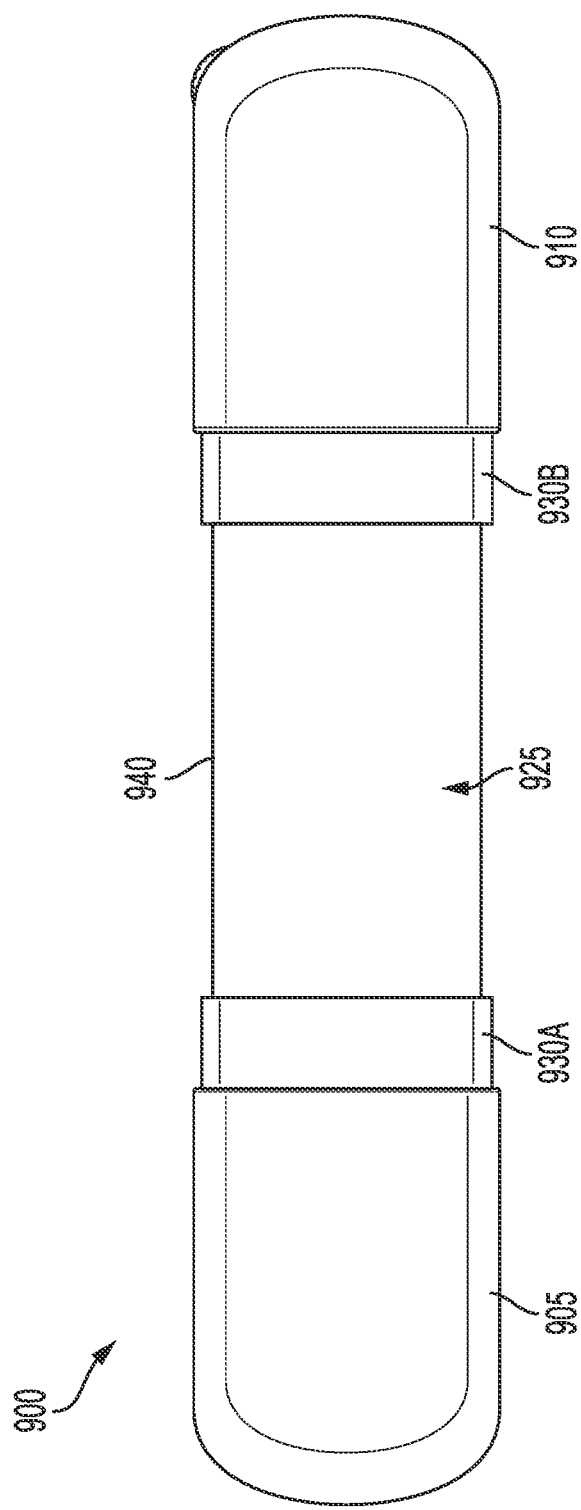

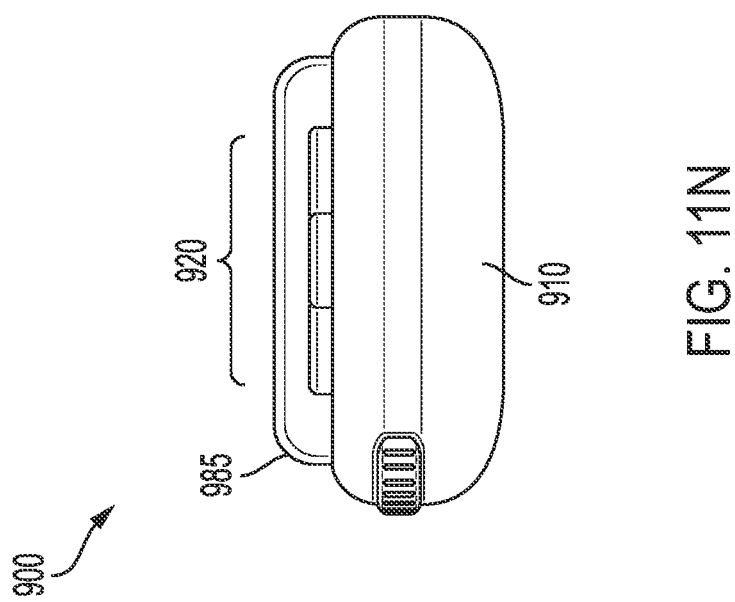

MOBILE DEVICE CONTROLLER SYSTEMS AND METHODS FOR INTERACTING WITH CLIENT APPLICATIONS

CROSS-REFERENCE TO RELATED APPLICATIONS

This application claims the benefit of U.S. Provisional Application No. 63/240,443, filed Sep. 3, 2021, and U.S. Provisional Application No. 63/364,974, filed May 19, 2022, the entire contents of each of which are hereby incorporated by reference herein.

BACKGROUND

The mobile gaming space is crowded and finding an opportunity for new, breakout content is a challenge for even the most novel of developers. Despite the race for content and the flexibility that touch interfaces provide, mobile gaming is still without significant representation from an entire genre of proven games—retro and casual arcade. Retro and casual arcade games and gaming dynamics were originally designed to be played with physical inputs. Because of the need to add additional hardware, the fragmentation in mobile handsets and the lack of vertical integration between controller manufacturers and content developers for this genre of gaming remains under-represented in the mobile space.

SUMMARY

Mobile device controller systems and methods for interacting with client applications are provided. Related systems, methods, apparatus, techniques, and articles are also described.

In an aspect, a first controller module of a mobile device controller can be engaged with a first side of a mobile device of a user. A second controller module of the mobile device controller can be engaged with a second side of the mobile device. One or more mobile device controller characteristics associated with characteristics of the mobile device controller can be transmitted from the mobile device controller to the mobile device. A client application on the mobile device can be modified by a first data processor based on the one or more mobile device controller characteristics. The modified client application can be provided by the first data processor to the user in the mobile device, and the user can interact with the modified client application using the mobile device controller.

One or more of the following features can be included in any feasible combination. For example, communication between the mobile device controller and the mobile device can be initiated. For example, the initiating can include pairing the mobile device controller with the mobile device over a wireless communication protocol. For example, the first and second sides can be located on opposing sides of the mobile device, the first controller module can be elastically coupled to the second controller module, and the mobile device controller can be in contact with the mobile device in a form-fitting configuration. For example, the engaging of the first controller module with the mobile device can include sliding the first controller module away from the second controller module. For example, the mobile device controller can include a pair of flaps configured to retain the mobile device when the first side of the mobile device is engaged by the first controller module and when the second side of the mobile device is engaged by the second controller module. For example, the mobile device can be disengaged from the first controller module and the second controller module, and the first controller module can be slid toward the second controller module. For example, the mobile device can be positioned in a portrait orientation when the first side of the mobile device is engaged by the first controller module and when the second side of the mobile device is engaged by the second controller module. For example, at least one of the first controller module and the second controller module can include at least one button disposed thereon and configured to receive a user input for controlling the client application. For example, at least one of the first controller module and the second controller module can include a directional pad button disposed thereon and configured to receive a user input for controlling the client application.

In another aspect, a mobile device controller is provide and can include a first controller module configured to engage a first side of a mobile device, a second controller module configured to engage a second side of the mobile device, the second side opposite the first side, and an expandable bridge positioned between the first controller module and the second controller module. At least one of the first controller module or the second controller module can include at least one processor and a memory storing instructions, which, when executed by the at least one processor, cause the at least one processor to perform operations that include transmitting, from the mobile device controller, one or more mobile device controller characteristics associated with characteristics of the mobile device controller to the mobile device, wherein a client application on the mobile device is modified based on the one or more mobile device controller characteristics, wherein the modified client application is provided to the user in the mobile device, and wherein the user interacts with the modified client application using the mobile device controller.

One or more of the following features can be included in any feasible combination. For example, the first controller module can be configured to receive a first user input for controlling the client application, the second controller module can be configured to receive a second user input for controlling the client application. For example, the first controller module can include a first hinge structure configured to extend from the first controller module and to engage with the first side of the mobile device when the first controller module is extended laterally away from the second controller module. For example, the second controller module can include a second hinge structure, and wherein the second hinge structure is configured to extend from the second controller module and engage with a second side of the mobile device when the second controller module is extended laterally away from the first controller module. For example, the expandable bridge can include a first elastic structure and a second elastic structure for adjusting the mobile device controller to fit mobile devices of different sizes, the first elastic structure can be coupled between the first controller module and a first end of the expandable bridge, and the second elastic structure can be coupled between the second controller module and a second end of the expandable bridge. For example, the operations can further include initiating communication between the mobile device controller and the client application executing on the mobile device. For example, the initiating can include pairing the mobile device controller with the mobile device over a wireless communication protocol. For example, the mobile device can be positioned in a portrait orientation when the first side of the mobile device is engaged by the first controller module and when the second side of the mobile device is engaged by the second controller module. For example, at least one of the first controller module and the second controller module can include at least one button disposed thereon and configured to receive a user input for controlling the client application. For example, at least one of the first controller module and the second controller module can include a directional pad button disposed thereon and configured to receive a user input for controlling the client application.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 9G is an illustration of a back left lower perspective view of the mobile device controller of FIG. 9A;

FIG. 9I is an illustration of a front left lower perspective view of the mobile device controller of FIG. 9A;

FIG. 9J is an illustration of a top side view of the mobile device controller of FIG. 9A;

FIG. 11H is an illustration of a front right lower perspective view of the mobile device controller of FIG. 11A;

FIG. 11K is an illustration of a bottom side view of the mobile device controller of FIG. 11A;

FIG. 11N is an illustration of a right side view of the mobile device controller of FIG. 11A;

FIG. 11AA is an illustration of a front side view of the mobile device controller of FIG. 11A;

FIG. 11AB is an illustration of a right side view of the mobile device controller of FIG. 11A;

FIG. 11AC is an illustration of a back side view of the mobile device controller of FIG. 11A;

DETAILED DESCRIPTION

Figure 1:
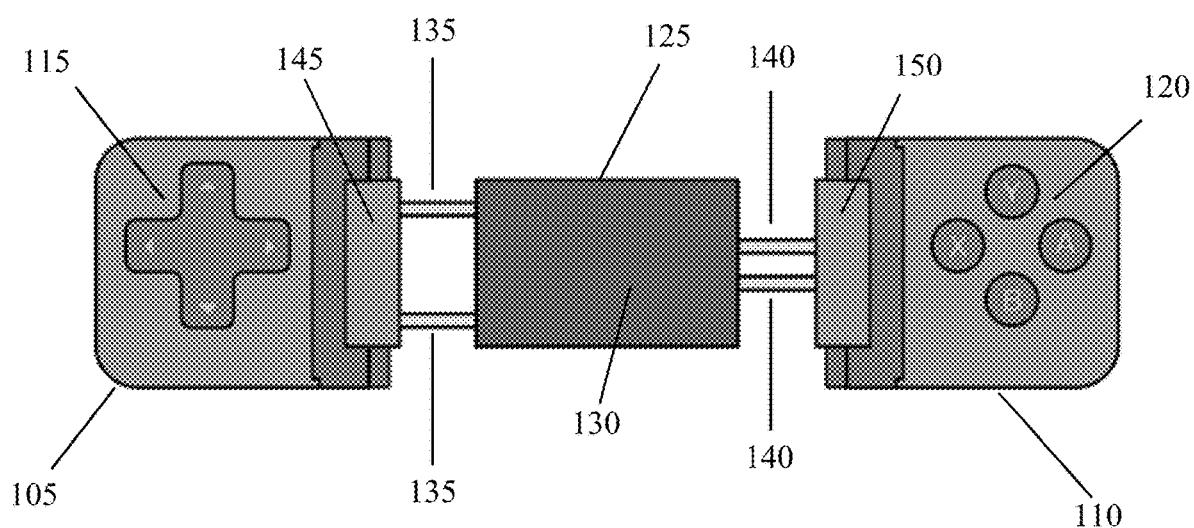
FIG. 1 is an illustration of a mobile device controller in an expanded configuration for interacting with client applications.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The present invention is directed to mobile device controller systems and methods for interacting with client applications, including the ornamental design for a mobile device controller as shown in and described with respect to the drawings. The mobile device controller can be form-fitting to the mobile device and provide physical inputs that allow the user to control, interact or otherwise engage with client applications executing on the mobile device. The mobile device controller can include right and left controller modules split so that they are positioned on either side of the mobile device. For maximum portability, the two halves of the mobile device controller can be linked by an adjustable bridge that can accommodate different sizes and orientations of mobile devices while collapsing down when not in use. In some implementations of the present invention, centered on the bridge between the two controller modules can be an inductive charging array with a magnetic alignment feature including a plurality of orientation magnetic arrays arranged, for example, circularly. The adjustable bridge mechanism can expand and contract from the center or middle of the mobile device controller (or approximately therefrom) so that the mobile device controller's inductive charging array can be maintained substantially centered in the bridge. The centering action can be used to maintain alignment between the mobile device controller and the mobile device, regardless of model and orientation. The mobile device controller can support any suitable button layout. For example, the button layout can be similar to game consoles, such as with two analog sticks, a D-pad, four right-side input buttons, four shoulder buttons and two triggers. The mobile device controller can also include menu, function, and backside paddle inputs, although other combinations of buttons, triggers, paddles, joysticks, and the like are possible.

In some implementations of the present invention, the inductive charging array with a magnetic alignment feature can address several problems found in conventional mobile device controller offerings. For example, a benefit of the present invention can be the ability to quickly and reliably attach and detach a mobile device to the mobile device controller with a single hand using the inductive charging array connection. The magnetic centering action supported by the magnetic alignment feature of the inductive charging array can bolster the ability to easily rotate the mobile device to either portrait or landscape mode when mounted in the mobile device controller. Not needing to rely on a mechanical connection to hold the mobile device to the mobile device controller can reduce the retaining mechanism's complexity, because it can accommodate different sized mobile devices without having to continually adjust through a range of dimensions. Such a benefit also allows the range of movement between the widest extension (to accommodate the largest mobile device in landscape mode) and fully collapsed to be much greater, resulting in a more compact form when not in use.

In some implementations of the present invention, the usability benefits of an inductive charging array being integrated into the mobile device controller can extend to setup and playability of the mobile device controller. For example, near field communication (NFC) or other like circuitry embedded in the inductive charging array can be used to automatically initiate the pairing of the mobile device controller over a suitable wireless communication protocol when the mobile device is physically placed in the mobile device controller. Such a feature can save the user from having to initiate pairing manually. In some implementations of the present invention, to reduce complexity and for the user to maintain the battery charge, reverse wireless charging can be used to power the mobile device controller. For example, the mobile device controller can be configured to be plugged into a power source, and the wireless charging connection can be reversed to power both the mobile device controller while also charging the mobile device for extended interaction or engagement sessions with the client application(s). Alternatively, because the mobile device controller is not electrically connected to the mobile device, the mobile device can be powered directly from an external charger plugged into the mobile device, such as when the mobile device controller is in portrait mode.

According embodiments of the present invention, the mobile device controller can be designed to address where and how to hold the mobile phone during gameplay. While some controllers, especially those repurposed for mobile use from game consoles, can leave it up to the user to find a way to prop up their mobile device while playing in a less than ideal manner, most offer a way to hold the mobile phone with the controller. There are generally two primary solutions for holding the phone—form-fitting and stand-under. Form-fitting refers to a controller that is split in half with the mobile phone placed between the two halves, usually in landscape format. The user then positions one hand on either side when playing. Form-fitting controllers can be large, support only specific mobile phone models, be expensive to manufacture, and offer compromise ergonomics relative to console-style controllers. This category of controllers is mostly powered directly from the phone (e.g., via USB, a Lightning connector, or other like connection port). Stand-under controllers can resemble those offered by game console manufacturers with a clamp mounted on the upper surface to hold the mobile phone in place. Most stand-under controllers can be wirelessly connected while others can offer direct, wired connections to the mobile phone. Such a configuration can also mean that the stand-under controller can contain its own battery power sources and require charging by the user. Because they are modeled after game console-style controllers, stand-under controllers can be larger and are not designed for portability. In both form-fitting and stand-alone controllers, mechanically holding the mobile phone to the controller can require the user to engage in a multistep process to attach and detach the controller. The bulk added by the controller can mean that using the mobile device in portrait orientation (or just about any other task outside of gaming) is not ideal. Wireless controllers must also be paired on initial use, then turned on and off manually by the user before and after subsequent gaming sessions. Embodiments of the present invention can overcome such drawbacks.

Merely for purposes of discussion and not limitation, the present disclosure will refer to a mobile digital game as an exemplary client application to illustrate various aspects of the present invention. However, the present invention can be used in and with any suitable type of client application (e.g., mobile applications or any other suitable types of client applications capable of executing on mobile devices) with which a user can interact or otherwise engage via physical inputs. Additionally, merely for purposes of discussion and not limitation, the present disclosure will refer to a mobile phone as an exemplary mobile device to illustrate various aspects of the present invention. However, the present invention can be used in and with any suitable type of mobile device, such as, for example, a smart phone, a tablet computer, or the like.

FIG. 1 is an illustration of a mobile device controller 100 in an open or expanded configuration for interacting with client applications. The mobile device controller 100 can include a first controller module 105 (e.g., a left-hand controller) and a second controller module 110 (e.g., a right-hand controller). The first and second controller modules 105 and 110 can be split so that they can be positioned on opposing sides (e.g., left and right or top and bottom, but not front and back) of the mobile device. Although illustrated as having approximately equivalent size, the first and second controller modules 105 and 110 can be of similar or different sizes, depending on the desired configuration. The first controller module 105 can include a first button layout 115. For example, the first button layout 115 can include any suitable number of arrow keys in any appropriate configuration (e.g., up, down, left, right, or the like). The second controller module 110 can include a second button layout 120. For example, the second button layout 120 can include any suitable number of buttons in any appropriate configuration (e.g., buttons A, B, X, Y, or the like). The first and second controller modules 105 and 110 can each include or otherwise support any suitable button layout. For example, the button layouts can be similar to game consoles, such as with two analog sticks, a D-pad, four right-side input buttons, four shoulder buttons and two triggers. The first and second controller modules 105 and 110 can additionally or alternatively include menu, function, and backside paddle inputs, although other combinations of buttons, triggers, paddles, joysticks, and the like are possible.

In embodiments, the mobile device controller 100 can include an adjustable bridge structure 125 that can reside between and within the first and second controller modules 105 and 110. The adjustable bridge structure 125 can include a front face 130 that can engage with and be in full contact with a back side of the mobile device. The first controller module 105 can be coupled to the adjustable bridge structure 125 via a first pair of guide rails 135. The second controller module 115 can be coupled to the adjustable bridge structure 125 via a second pair of guide rails 140. Each of the first and second pairs of guide rails 135 and 140 can be rigid, semi-rigid, or flexible, depending upon the desired configuration. The first pair of guide rails 135 can be permanently and fixedly attached to the first controller module 105 via a first anchor 145, which can form a structural component of the first controller module 105. The second pair of guide rails 140 can be permanently and fixedly attached to the second controller module 110 via a second anchor 150, which can form a structural component of the second controller module 110. The first and second pairs of guide rails 135 and 140 can be coupled to the adjustable bridge structure 125 using a suitable elastic structure (e.g., springs or the like) that can reside within the adjustable bridge structure 125. The elastic structure within the adjustable bridge structure 125 can allow the first and second controller modules 105 and 110 to be pulled apart or extended laterally, wrapped around the back side of the mobile device, and then contracted to engage with and firmly hold opposing sides of the mobile device in a form-fitting configuration. In such a configuration, the adjustable bridge structure 125 can engage with a back side of the mobile device. In this way, the mobile device controller 100 can adapt to mobile devices of different sizes and in different orientations.

In some implementations of the present invention, the first and second controller modules 105 and 110 can communicate with each other via a wired communication channel. For example, either or both of the first and second pairs of guide rails 135 and 140 can be rigid or semi-rigid hollow structures (e.g., tubes), and the wired communication channel can run within and through either or both of the guide rails of the first and second pairs of guide rails 135 and 140 and through the adjustable bridge structure 125 to allow communication between the first and second controller modules 105 and 110. In an alternative embodiment, the first and second controller modules 105 and 110 can include appropriate electronic components to support wireless communication with each other using any suitable wireless communication protocol (e.g., Bluetooth, Wi-Fi, NFC, or the like). Either or both of the first and second controller modules 105 and 110 can include suitable electronic components to support wireless communication with the mobile device using any appropriate wireless communication protocol (e.g., Bluetooth, Wi-Fi, NFC, etc.). For example, the first and second controller modules 105 and 110 can communicate wirelessly with each other and the mobile device. In an alternative embodiment, the first and second controller modules 105 and 110 can communicate with each other using either or both of the first and second pairs of guide rails 135 and 140 themselves if such rails are comprised of a solid or hollow structural material capable of carrying electrical signals (e.g., an appropriate metallic or otherwise conductive material).

Figure 2:
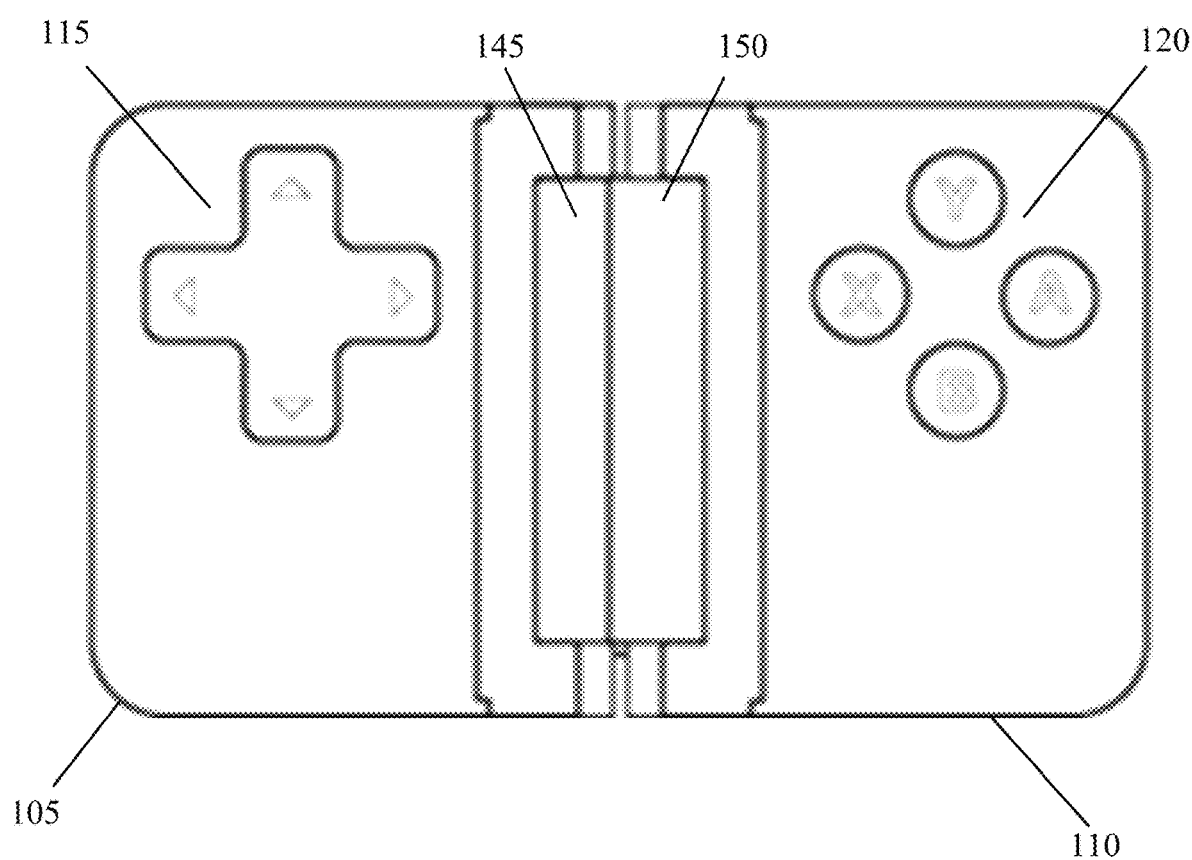
FIG. 2 is an illustration of a mobile device controller in a collapsed configuration.

FIG. 2 is an illustration of the mobile device controller 100 in a closed or collapsed configuration. When in the collapsed configuration, the first and second pairs of guide rails 135 and 140 can contract and rest or otherwise reside within the adjustable bridge structure 125 such that the first anchor 145 of the first controller module 105 can be in contact or substantial contact with the second anchor 150 of the second controller module 110. In an embodiment, the first pair of guide rails 135 can form an outer pair of guide rails, while the second pair of guide rails 140 can form an inner pair of guide rails. In such an embodiment, in the collapsed configuration, the (inner) second pair of guide rails 140 can rest between the (outer) first pair of guide rails 135 within the adjustable bridge structure 125. In an alternative embodiment, the first pair of guide rails 135 can form an inner pair of guide rails, while the second pair of guide rails 140 can form an outer pair of guide rails. In such an embodiment, in the collapsed configuration, the (inner) first pair of guide rails 135 can rest between the (outer) second pair of guide rails 140 within the adjustable bridge structure 125. In its collapsed configuration, the mobile device controller 100 can be approximately the size of a credit card or other compact configuration.

Figure 3:
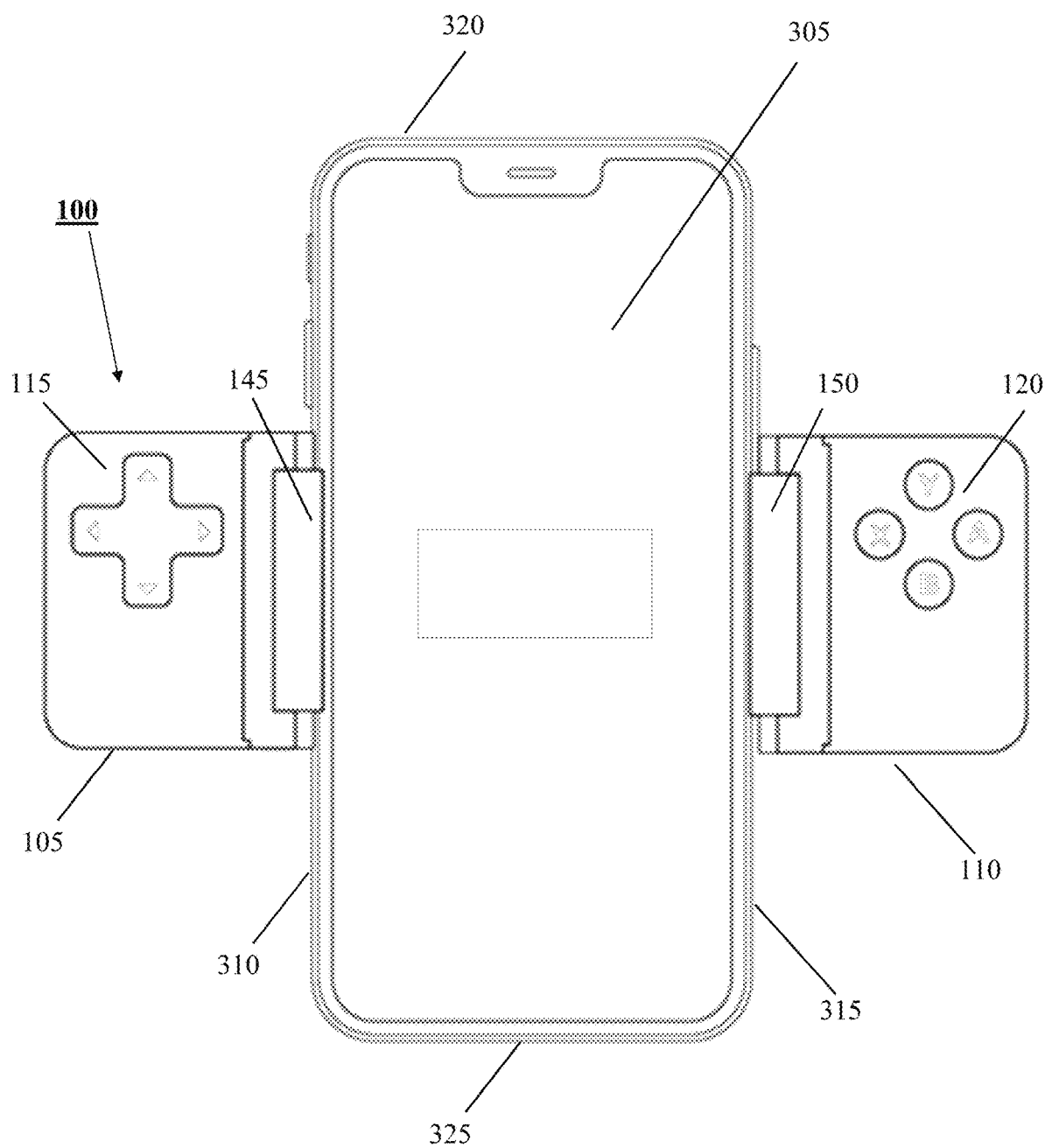
FIG. 3 is an illustration of a mobile device controller in an engaged configuration with a mobile device.

FIG. 3 is an illustration of the mobile device controller 100 in an engaged configuration with a mobile device 305. In embodiments, the mobile device controller 100 can be form-fitting to the mobile device 305 and provide physical inputs that allow the user to control, interact or otherwise engage with client applications executing on the mobile device 305. As discussed previously, the elastic structure within the adjustable bridge structure 125 can allow the first and second controller modules 105 and 110 to be pulled apart or extended laterally, wrapped around the backside of the mobile device 305, and then contracted to engage with and firmly hold opposing sides of the mobile device in a form-fitting configuration. For example, the first anchor 145 can contact and firmly engage a first side 310 of the mobile device 305, while the second anchor 150 can contact and firmly engage a second side 315 of the mobile device 305. The mobile device 305 is illustrated in a portrait orientation. If the mobile device is in a landscape orientation, the first anchor 145 can contact and firmly engage, for example, a third side 320 of the mobile device 305, while the second anchor 150 can contact and firmly engage, for example, a fourth side 325 of the mobile device 305. In either configuration, the adjustable bridge structure 125 can engage with a back side of the mobile device 305. In this way, the mobile device controller 100 can adapt to mobile devices of different sizes and in different orientations.

In FIG. 1, in some implementations of the present invention, the first and second controller modules 105 and 110 can include suitable electronic components to support wireless communication with at least the mobile device and control of the client application executing on the mobile device through the physical inputs provided by the user when interacting with the first and second button layouts 115 and 120. In such a configuration, either or both of the first and second controller modules 105 and 110 can include battery components to provide power for the mobile device controller 100. For example, if one of the first and second controller modules 105 and 110 includes a battery component, the controller module with the battery component can supply power to the other controller module through a power communication channel that can run within and through either or both of the first and second pairs of guide rails 135 and 140 and through the adjustable bridge structure 125. Additionally or alternatively, the adjustable bridge structure 125 can include suitable electronic and/or power components to support some or all of such functionality. For example, the adjustable bridge structure 125 can include either or both of electronic and power components (e.g., battery or the like) to manage and power either or both of the first and second controller modules 105 and 110 and control the client application executing on the mobile device (e.g., via the physical inputs provided by the user when interacting with the first and second button layouts 115 and 120). In such a configuration, the adjustable bridge structure 125 can manage and supply power to the first and second controller modules 105 and 110 through combined or separate control and power communication channels that can run within and through either or both of the first and second pairs of guide rails 135 and 140. In an alternative embodiment, the control and/or power signals can be communicated using either or both of the first and second pairs of guide rails 135 and 140 themselves if such rails are comprised of a material capable of carrying electrical signals (e.g., an appropriate metallic or otherwise conductive material).

In some implementations of the present invention, the adjustable bridge structure 125 can include an inductive charging array with a magnetic alignment feature or other suitable electronic circuitry. The adjustable bridge structure 125 can expand and contract from a center or middle of the mobile device controller 100 (or approximately therefrom) so that the inductive charging array of the mobile device controller 100 can be maintained substantially centered in the mobile device controller 100. Such a centering action can be used to maintain alignment between the mobile device controller 100 and the mobile device, regardless of model and orientation. Merely for purposes of illustration and not limitation, MagSafe® is technology from Apple Inc. that provides a combination of magnetic mounting, wireless charging and NFC. From a charging perspective, MagSafe can be used to address an alignment problem encountered with wireless chargers where efficiency drops off due to misalignment of the mobile device to the charger. To secure and orient accessories properly to the mobile device, MagSafe can employ an array of magnets (e.g., 18) arranged in a circle hidden under the surface of the mobile device with additional line magnets that can come vertically off the circle at the 6-o'clock position. Such an arrangement can allow accessories to perfectly or nearly perfectly align with the charging coils and securely hold accessories in a specific orientation. The MagSafe magnetic array can allow relatively small magnets to attract accessories with similar configurations at close distances where a single large magnet would tend to attract and affect other objects in undesirable ways at greater distances. For example, Apple has employed NFC in their MagSafe accessories to help the mobile device identify what is being connected, even if the object is passive. NFC can also offer an advantage when pairing Bluetooth devices. For example, instead of having to initiate pairing, select a device from the mobile device and enter a PIN to pair a device, the user can simply bring their mobile device in close proximity to initiate pairing.

In some implementations of the present invention, additional setup and playability features of the mobile device controller 100 can be supported with an inductive charging array integrated into the adjustable bridge structure 125. For example, on initial setup, the mobile device controller 100 can use NFC or the like to initiate the pairing of the mobile device controller 100 over a suitable wireless communication protocol (e.g., Bluetooth, Wi-Fi, or the like), which can be performed automatically when the mobile device is physically placed in the mobile device controller 100. Such a feature can save the user from having to initiate pairing manually. In an embodiment, to reduce complexity and for the user to maintain the battery charge for use with an additional mobile device, reverse wireless charging can be used to power the mobile device controller 100. For example, the mobile device controller 100 can be configured to be plugged into a power source (e.g., via a USB-C or like port). For example, either or both of the first and second controller modules 105 and 110 can include a suitable port to support charging from a power source. Once plugged in, the wireless charging connection can be reversed to power the mobile device controller 100 while charging the mobile device for extended interaction or engagement sessions with the client application executing on the mobile device. Alternatively, because the mobile device controller 100 is not physically connected to a port of the mobile device, the mobile device can be powered directly from an external charger plugged into the mobile device, such as when the mobile device controller is in portrait mode.

In an embodiment, the mobile device controller 100 can use NFC or the like to control various aspects of the mobile device and/or one or more client applications executing on the mobile device. For example, on initial setup, the mobile device controller 100 can use NFC or the like to communicate commands to the mobile device to display a list of recommended client applications to the user, such as a list of digital games that can be used with the mobile device controller 100. The mobile device controller 100 can be equipped with different layouts of the first and second button layouts 115 and 120. In an embodiment, depending on the particular button layout for a particular mobile device controller 100, the mobile device controller 100 can use NFC or the like to communicate commands to the mobile device to display a list of recommended client applications that are suited for use with that particular configuration of the mobile device controller 100. For example, if the first and second button layouts 115 and 120 are configured in a manner similar to a game console controller, then the mobile device controller 100 can use the NFC or the like to communicate commands to the mobile device to display a list of recommended digital games that are similar to game console games. In an embodiment, the mobile device controller 100 can maintain such a list and communicate the list to the mobile device for display.

In an alternative embodiment, one or more client applications and/or a suitable support application can be installed on the mobile device that can be configured to support the mobile device controller 100 to control various aspects of the mobile device, the client application or support application itself, and/or one or more other client applications executing on the mobile device. In such an alternative embodiment, the mobile device controller 100 can use the NFC or the like to communicate appropriate information (e.g., an identifier or other identifying information) to the client application and/or support application executing on the mobile device. Upon receipt of such information, the client application and/or support application can use the received information to generate and display a recommendations list (e.g., by accessing the list through a look-up table or key-value pairs stored in the client application and/or support application that is referenced or otherwise accessed based on the received information). Consequently, the mobile device controller 100 in conjunction with such a client application and/or support application can tailor the user experience on the mobile device in any suitable manner. For example, if user identification information is stored or otherwise maintained in the mobile device controller 100, such user identification information can be communicated to the client application and/or support application, which can tailor or otherwise customize the user experience on the mobile device to the user's preferences. Merely for purposes of illustration and not limitation, the graphical user interface of a digital game can be personalized to display, for example, player incentives, special offers, advertisements or the like to the player inside or within the digital game. In embodiments, different player incentives, special offers, advertisements, or the like can be displayed to a player in the digital game based on, for example, the characteristics associated with the mobile device controller 100, such as its type and/or configuration, although other characteristics are possible. Additionally or alternatively, the digital game can personalize, for example, prizes, rewards, and/or gifts displayed or presented to a player in an associated gift store of the digital game. For example, a player using one type of mobile device controller 100 can be presented with prizes/rewards/gifts that are different from prizes/rewards/gifts that can be presented to another player using a different type of mobile device controller 100. In this manner, the menu or list of prizes, rewards, and/or gifts can be tailored to each or any player in the associated gift store displayed in the digital game. Additionally or alternatively, the digital game can personalize, for example, graphical information displayed to the user outside of the digital game, such as ads or offers surfaced to the player on their mobile device outside of the digital game. Other personalizations and customizations, such as other appropriate modifications to the graphical user interface inside or outside of the digital game, are possible.

In an embodiment, the client application and/or support application can be configured to support account profiles. The user can create an account profile in the client application and/or support application, which can be used to store user preferences, such as preferred client applications, whether or not the user wants to be presented with recommendations and, if so, what types and kinds of recommendations, and the like. Upon connection, the mobile device controller 100 can use NFC or the like to communicate commands to the client application and/or support application to present those personalizations, customizations, preferences, and the like to the user. For example, the client application and/or support application can maintain a record of the last client application used by the user. Accordingly, the mobile device controller 100 can use NFC or the like to communicate one or more commands to the client application and/or support application to initiate execution of one or more other client applications on the mobile device, such as the last digital game played by the user or a digital game that was most previously played by the user. Such control by the mobile device controller 100 can occur at initial setup or at any appropriate time while the mobile device controller 100 is being used with the mobile device.

The mobile device controller 100 can be considered a type of human interface device (HID). A HID is a type of device that takes input from or provides output to users. HID can also refer to the HID protocol, a standard for bi-directional communication between a host and a device that is designed to simplify the installation procedure. Although the HID protocol was originally developed for USB devices, it has since been implemented over many other protocols, including Bluetooth. A HID report is a binary data packet communicated between the host and the device. Input reports are sent from the device to the host, output reports are sent from the host to the device, and feature reports may be sent in either direction. The format of HID reports is device-specific. A HID report descriptor can be requested by the host during device enumeration. The HID report descriptor describes the binary format of reports supported by a device. For purposes of illustration and not limitation, the HID report descriptor for the mobile device controller 100 could declare that it is a device of type "controller" (or the like), with a certain number of buttons, joysticks, triggers, etc. for the inputs, and even certain outputs (e.g., LEDs). Each time there is a button press on the mobile phone controller 100, the mobile phone controller 100 can send a HID report to the host describing which buttons are currently pressed. In some implementations of the present invention, HID reports can be used to pair the mobile device controller 100 over a wireless link. Such a process can require a native application on the host side to initiate the process. To compensate for multiple different operating systems, slight differences in the firmware of the mobile phone controller 100 would be needed to provide the correct HID report. These different firmware can be maintained and stored within the mobile device controller 100. However, the different firmware could require users to, for example, press a combination of buttons to connect to a specific (host) profile when pairing. In some implementations of the present invention, the mobile device controller 100 can support a custom Bluetooth Low Energy (BLE) service to facilitate easier pairing between the mobile device controller 100 and the mobile device that does not require (or only minimally requires) user input. In some implementations of the present invention, the client application and/or the suitable support application installed on the mobile device can be configured to write appropriate information to the custom BLE service on the mobile device controller 100 to signal which operating system the mobile device uses so that an appropriate HID report can be sent from the mobile device controller 100. In such a manner, the mobile device controller 100 can be automatically configured and paired with the mobile device, without requiring additional input from the user, when the mobile device controller 100 is engaged with or otherwise fitted to the mobile device.

In an embodiment, the mobile device controller 100 can use the one or more client applications and/or the suitable support application installed on the mobile device to communicate with one or more remote servers, such as a remote game server, databases, and the like. For example, the mobile device controller 100 can communicate any suitable type of information to the one or more remote servers, such as when and which mobile device controller 100 is being used by the user, which client application(s) the user is interacting or engaging with using the mobile device controller 100, the length of time a user uses the mobile device controller 100, the length of time a user interacts or engages with a client application via the mobile device controller 100, the results or outcomes of the user interactions with the client application(s) via the mobile device controller 100 (e.g., to determine a skill rating of the user), and other like information that can be collected from the user and processed by the one or more remote servers to improve the user experience by tracking metrics of, for example, engagement and fairness. In an embodiment, for competitive, skill-based digital games, such information can be used to match players who are using mobile device controllers against other players who are also using mobile device controllers to assist in ensuring fairness in the competitions and/or to enforce anti-fraud/anti-cheat measures. For instance, one player using a mobile device controller 100 may have an unfair advantage in the competition against another player who is not using a mobile device controller 100. In an embodiment, players in the competition can be matched based on characteristics associated with the mobile device controller 100, such as, for instance, the type of mobile device controller 100 being used, the configuration (e.g., button layout) of the mobile device controller 100 being used, or even simply the fact that a mobile device controller 100 is being used by the player, although other characteristics of the mobile device controller 100, the player, the client applications, and the like can be used for the purpose of matching players in a digital game competition or the like. Additionally or alternatively, suitable machine learning/artificial intelligence techniques can be used to match players. For example, a machine learning model can be trained based on data from all players in the mobile game. The machine learning model can then be used to dynamically match players for a competition or tournament. The machine learning model can be updated or otherwise adapted as the characteristics of players evolve over time (e.g., changing usage patterns for the mobile device controller 100, changing win/loss ratios and experience levels, preferences for certain games and not others, and the like).

Figure 4:
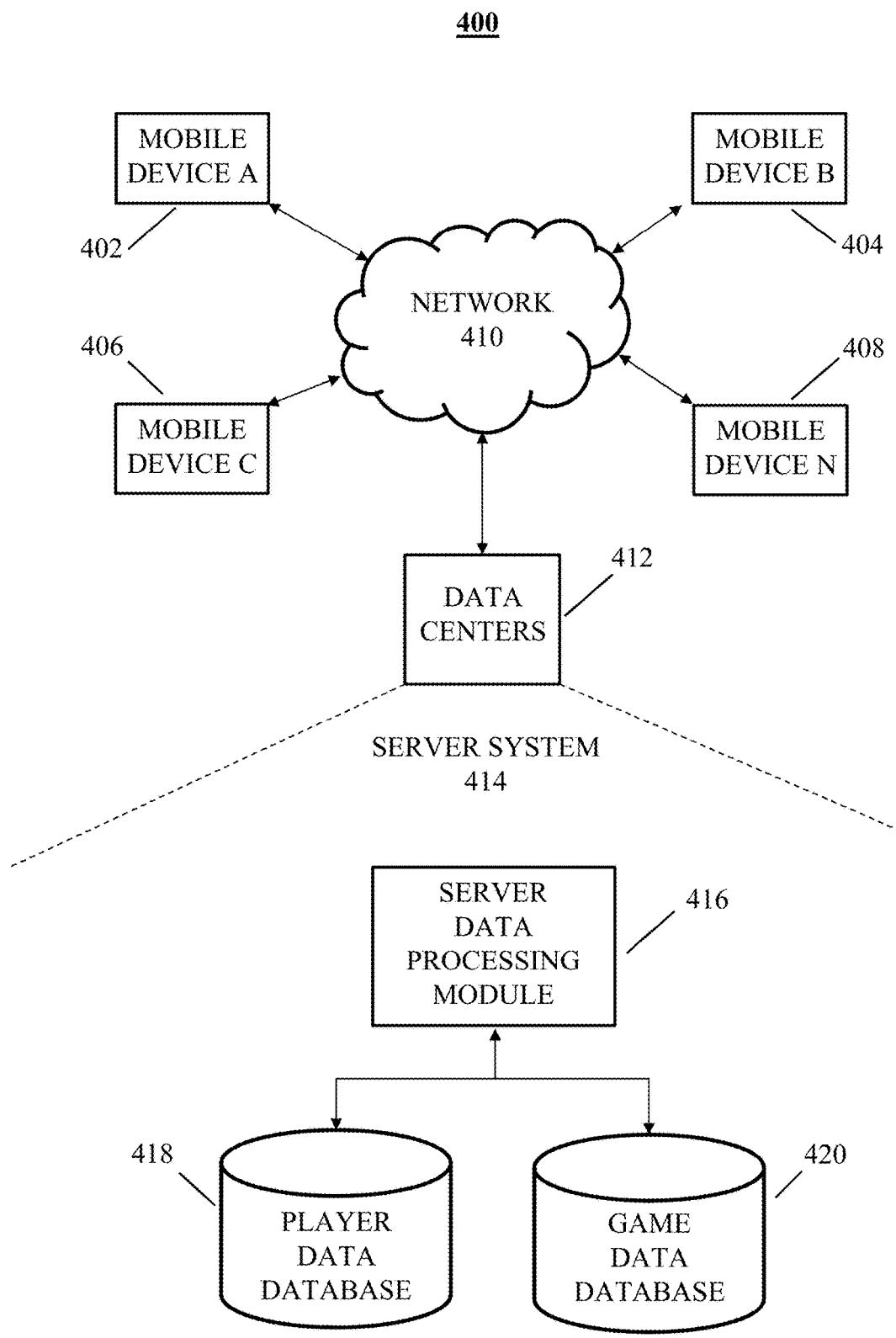
FIG. 4 is a block diagram illustrating an example system for interacting with one or more client applications.

FIG. 4 is a block diagram illustrating an example system 400 for interacting with one or more client applications, such as, for example, a digital game. A server system 414 can provide functionality for collecting data associated with game play of players in a digital game. The server system 414 can include software components and databases that can be deployed at one or more data centers 412 in, for example, one or more geographic locations. The software components of the server system 414 can include a server data processing module 416. The software components can include subcomponents that can execute on the same or on different individual data processing apparatus. The databases of the server system 414 can include, for example, a player data database 418 and a game data database 420, although other databases are possible. The databases can reside in one or more physical storage systems or be cloud-based. The software components and data will be further described below.

As illustrated in FIG. 4, the server data processing module 416 can communicate with the player data database 418 and the game data database 420. The player data database 418 can include, for example, any suitable information related to one or more players of digital games and the interactions between those players and the digital games, such as, for example, whether a player is playing one or more digital games using a mobile device controller and, if so, which digital games and when and for how long, the type/configuration of the mobile device controller(s) used by the player, player game history (e.g., which digital games were played, number of games won in each digital game, number of games lost in each digital game, number of games played for each digital game, scores in each digital game, time played for each digital game, etc.), player identifying information (e.g., usernames), a history of player connections to the system 400, player purchases, player accomplishments, player tasks, player interactions with other users (e.g., chats), player purchases, player deposits/withdrawals, player virtual item acquisition or usage, other conditions in the digital games, and other like information. The game data database 420 can include, for example, information related to the digital games implemented using the system 400. The game data database 420 can include information related to each digital game, such as, for example, a virtual environment for each digital game, image, video and/or audio data for each digital game, event data corresponding to previous, current or future events, game state data defining a current state of each digital game, and/or the like.

A software application, such as, for example, a digital game or other web-based or suitable client application, can be provided as an end-user client application to allow users to interact with the server system 414. The software application can relate to and/or provide a wide variety of functions and information, including, for example, entertainment (e.g., a game, music, videos, etc.), business (e.g., word processing, accounting, spreadsheets, etc.), news, weather, finance, sports, etc. In certain instances, the software application can provide a digital game. The digital game can be or include, for example, a sports game, an adventure game, a virtual playing card game, a virtual board game, a puzzle game, a racing game, or any other appropriate type of digital game. In an embodiment, the digital game can be an asynchronous competitive skill-based game, in which players can compete against each other in the digital game, but do not have to play the digital game at the same time. In an alternative embodiment, the digital game can be a synchronous competitive skill-based game, in which players can play the digital game at the same time and can compete against each other in the digital game in real-time. Other suitable digital games and software applications are possible.

The software application or components thereof can be accessed through a network 410 (e.g., the Internet) by users of client devices, such as mobile device A 402, mobile device B 404, mobile device C 406, ..., mobile device N 408, where N can be any suitable natural number. Each of the mobile devices can be any appropriate type of mobile electronic device that is capable of executing the software application and communicating with the server system 414 through the network 410, such as, for example, a smart phone, a tablet computer, or the like. Other mobile devices are possible. One or more of the mobile devices can be used with a mobile device controller, and the same or different types and configurations of the mobile device controller can be used with each, all, or any combination of mobile devices. In an alternative embodiment, the player data database 418, the game data database 420, or any portions thereof can be stored on one or more mobile devices. Additionally or alternatively, software components for the system 400 (e.g., the server data processing module 416) or any portions thereof can reside on or be used to perform operations on one or more mobile devices.

Figure 5:
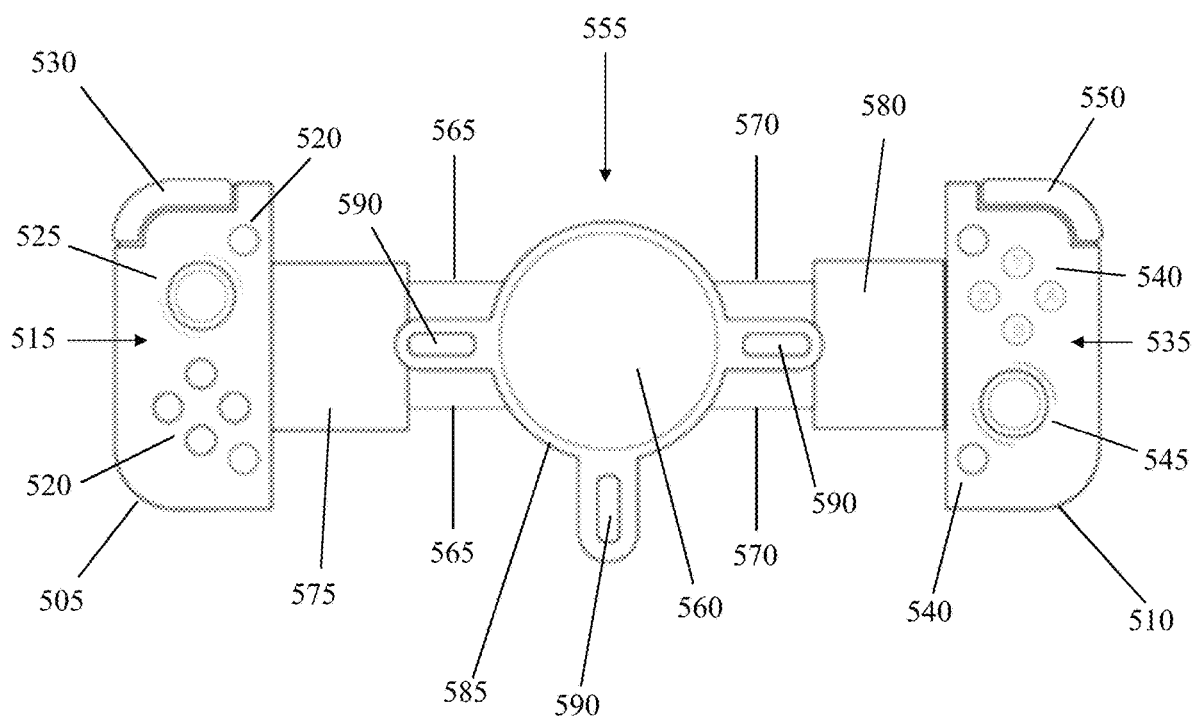
FIG. 5 is an illustration of an alternative mobile device controller in an expanded configuration for interacting with client applications.

FIG. 5 is an illustration of an alternative mobile device controller 500 in an open or expanded configuration for interacting with client applications. The mobile device controller 500 can include a first controller module 505 (e.g., a left-hand controller) and a second controller module 510 (e.g., a right-hand controller). The first and second controller modules 505 and 510 can be split so that they can be positioned on opposing sides (e.g., left and right or top and bottom, but not front and back) of the mobile device. Although illustrated as having approximately equivalent size, the first and second controller modules 505 and 510 can be of similar or different sizes, depending on the desired configuration. The first controller module 505 can include a first button layout 515. For example, the first button layout 515 can include any suitable number and combination of buttons 520 in any appropriate configuration, one or more joysticks 525, one or more paddles 530, and the like. The second controller module 510 can include a second button layout 535. For example, the second button layout 535 can include any suitable number and combination of buttons 540 in any appropriate configuration, one or more joysticks 545, one or more paddles 550, and the like. The first and second controller modules 505 and 510 can each include or otherwise support any suitable button layout. For example, the button layouts can be similar to game consoles, such as with two analog sticks, a D-pad, four right-side input buttons, four shoulder buttons and two triggers. The first and second controller modules 505 and 510 can additionally or alternatively include menu, function, and backside paddle inputs, although other combinations of buttons, triggers, paddles, joysticks, and the like are possible.

In embodiments, the mobile device controller 500 can include an adjustable bridge structure 555 that can reside between and within the first and second controller modules 505 and 510. The adjustable bridge structure 555 can include a front face 560 that can engage with and be in full contact with a back side of a mobile device. The first controller module 505 can be coupled to the adjustable bridge structure 555 via a first set of guide rails 565. The second controller module 510 can be coupled to the adjustable bridge structure 555 via a second set of guide rails 570. Each of the first and second sets of guide rails 565 and 570 can be comprised of one or more guide rails, such as, for example, a single guide rail structure or two (or more) separate guide rails. Each of the first and second sets of guide rails 565 and 570 can be rigid, semi-rigid, or flexible, depending upon the desired configuration. The first set of guide rails 565 can be permanently and fixedly attached to the first controller module 505 via a first anchor 575, which can form a structural component of the first controller module 505. The second set of guide rails 570 can be permanently and fixedly attached to the second controller module 510 via a second anchor 580, which can form a structural component of the second controller module 510. In some implementations of the present invention, the first and second anchors 575 and 580 can retract (fully or partially) and rest within the first and second controller modules 505 and 510, respectively (e.g., using a suitable elastic structure). The first and second sets of guide rails 565 and 570 can be coupled to the adjustable bridge structure 555 using a suitable elastic structure (e.g., springs or the like) that can reside within the adjustable bridge structure 555. The elastic structure within the adjustable bridge structure 555 can allow the first and second controller modules 505 and 510 to be pulled apart or extended laterally, wrapped around the backside of the mobile device, and then contracted to engage with and firmly hold opposing sides of the mobile device in a form-fitting configuration. In such a configuration, the adjustable bridge structure 555 can engage with a back side of the mobile device. In this way, the mobile device controller 500 can adapt to mobile devices of different sizes and in different orientations.

In an embodiment, the first and second controller modules 505 and 510 can communicate with each other via a wired communication channel. For example, either or both of the first and second sets of guide rails 565 and 570 can be rigid or semi-rigid hollow structures (e.g., tubes or the like), and the wired communication channel can run within either or both of the guide rails of the first and second sets of guide rails 565 and 575 and through the adjustable bridge structure 555 to allow communication between the first and second controller modules 505 and 510. In an alternative embodiment, the first and second controller modules 505 and 510 can include appropriate electronic components to support communication with each other using any suitable wireless communication protocol (e.g., Bluetooth, Wi-Fi, NFC, or the like). Either or both of the first and second controller modules 505 and 510 can include suitable electronic components to support wireless communication with the mobile device using any appropriate wireless communication protocol (e.g., Bluetooth, Wi-Fi, NFC, etc.). For example, the first and second controller modules 505 and 510 can communicate wirelessly with each other and the mobile device. In an alternative embodiment, the first and second controller modules 505 and 510 can communicate with each other using either or both of the first and second sets of guide rails 565 and 570 themselves if such rails are comprised of a solid or hollow structural material capable of carrying electrical signals (e.g., an appropriate metallic or otherwise conductive material).

The first and second controller modules 505 and 510 can include suitable electronic components to support wireless communication with at least the mobile device and control of the client application executing on the mobile device through the physical inputs provided by the user when interacting with first and second button layouts 515 and 535. In such a configuration, either or both of the first and second controller modules 505 and 510 can include battery components to provide power for the mobile device controller 500. For example, if one of the first and second controller modules 505 and 510 includes a battery component, the controller module with the battery component can supply power to the other controller module through a power communication channel that can run within either or both of the first and second sets of guide rails 565 and 570 and through the adjustable bridge structure 555. Additionally or alternatively, the adjustable bridge structure 555 can include suitable electronic and/or power components to support some or all of such functionality. For example, the adjustable bridge structure 555 can include either or both of electronic and power components (e.g., battery or the like) to manage and power either or both of the first and second controller modules 505 and 510 and control the client application executing on the mobile device (e.g., via the physical inputs provided by the user when interacting with the first and second button layouts 515 and 535). In such a configuration, the adjustable bridge structure 555 can manage and supply power to the first and second controller modules 505 and 510 through combined or separate control and power communication channels that can run within either or both of the first and second sets of guide rails 565 and 570. In an alternative embodiment, the control and/or power signals can be communicated using either or both of the first and second sets of guide rails 565 and 570 themselves if such rails are comprised of a material capable of carrying electrical signals (e.g., an appropriate metallic or otherwise conductive material).

In some implementations of the present invention, centered or substantially centered on the adjustable bridge structure 555 between the first and second controller modules 505 and 510 can be an inductive charging array 585 with a magnetic alignment feature (e.g., MagSafe or the like or other suitable electronic circuitry) including a plurality (e.g., three or more) of orientation magnetics 590 arranged, for example, circularly, such as at the 3, 6 and 9 o'clock positions, although any suitable number, configuration and arrangement of the orientation magnets 590 are possible. The adjustable bridge structure 555 can expand and contract from the center or middle of the mobile device controller 500 (or approximately therefrom) so that the inductive charging array 585 of the mobile device controller 500 can be maintained substantially centered in the mobile device controller 500. Such a centering action can be used to maintain alignment between the mobile device controller 500 and the mobile device, regardless of model and orientation. The inductive charging array 585 can also be used to support the additional setup and playability features and functionality similar or identical to that described above with respect to the inductive charging array integrated into the adjustable bridge structure 125 of mobile device controller 100.

Figure 6:
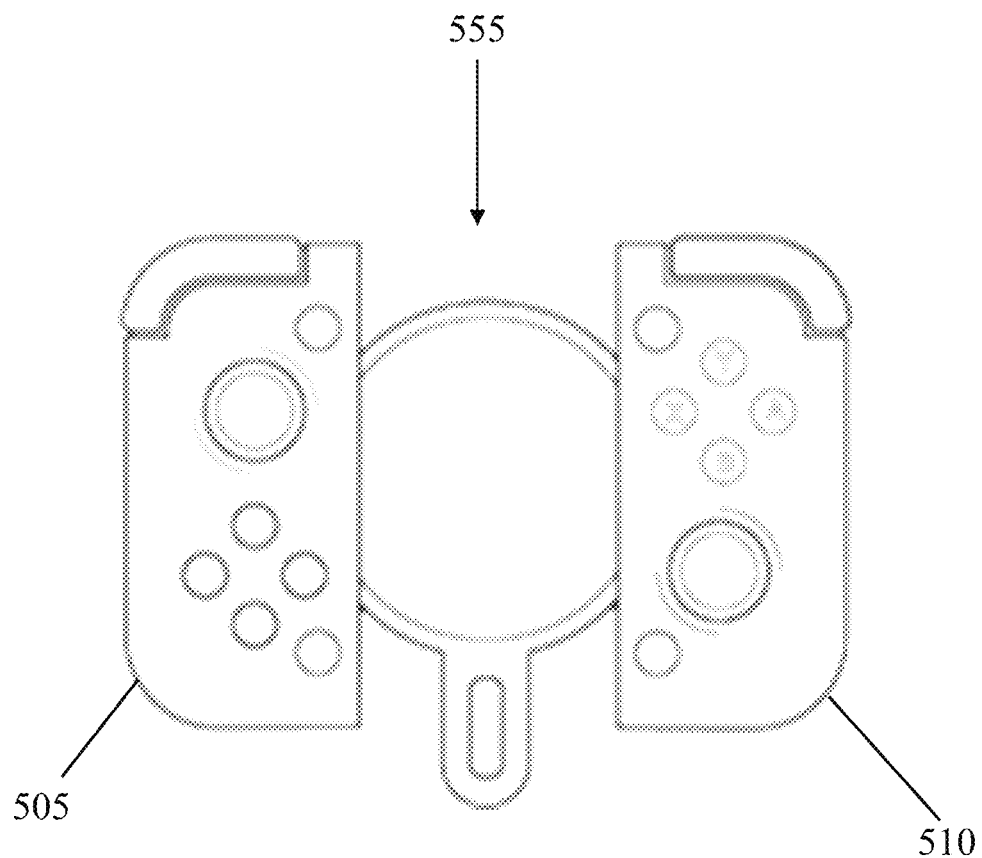
FIG. 6 is an illustration of an alternative mobile device controller in a partially closed or collapsed configuration.

FIG. 6 is an illustration of the alternative mobile device controller 500 in a partially closed or collapsed configuration. When in the collapsed configuration, the first and second sets of guide rails 565 and 570 can contract and rest or otherwise reside within the adjustable bridge structure 555 such that the first anchor 575 of the first controller module 505 can be in contact or substantial contact with the second anchor 580 of the second controller module 510. In an embodiment, the first set of guide rails 565 can form an outer set of guide rails, while the second set of guide rails 570 can form an inner set of guide rails. In such an embodiment, in the collapsed configuration, the (inner) second set of guide rails 570 can rest between the (outer) first set of guide rails 565 within the adjustable bridge structure 555. In an alternative embodiment, the first set of guide rails 565 can form an inner set of guide rails, while the second set of guide rails 570 can form an outer set of guide rails. In such an embodiment, in the collapsed configuration, the (inner) first set of guide rails 565 can rest between the (outer) second set of guide rails 570 within the adjustable bridge structure 555. In its collapsed configuration, the mobile device controller 500 can be approximately the size of a credit card or the like. In an alternative embodiment, if each of the first and second sets of guide rails 565 and 570 comprises a single guide rail structure, the first set of guide rails 565 can retract and rest within the first anchor 575 within the first controller module 505, while the second set of guide rails 570 can retract and rest within the second anchor 580 within the second controller module 510.

Figure 7:
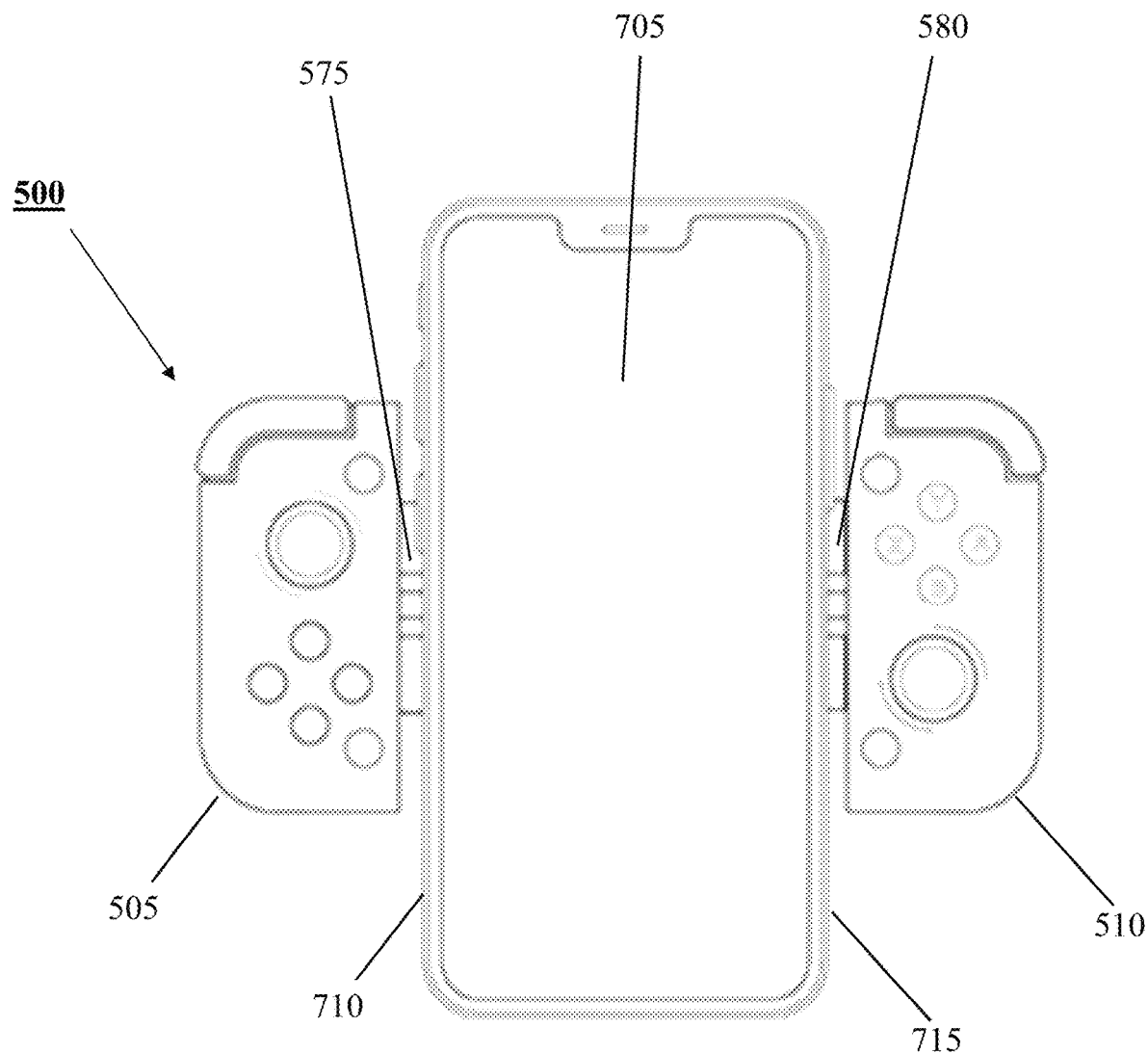
FIG. 7 is an illustration of an alternative mobile device controller in an engaged configuration with a mobile device in a portrait orientation.

FIG. 7 is an illustration of the alternative mobile device controller 500 in an engaged configuration with a mobile device 705 in a portrait orientation. In embodiments, the mobile device controller 500 can be form-fitting to the mobile device 705 and provide physical inputs that allow the user to control, interact or otherwise engage with client applications executing on the mobile device 705. As discussed previously, the elastic structure within the adjustable bridge structure 555 can allow the first and second controller modules 505 and 510 to be pulled apart or extended laterally, wrapped around the back side of the mobile device 705, and then contracted to engage with and firmly hold opposing sides of the mobile device in a form-fitting configuration. For example, the first anchor 575 can contact and firmly engage a first side 710 of the mobile device 705, while the second anchor 580 can contact and firmly engage a second side 715 of the mobile device 705. The adjustable bridge structure 555 can engage with a back side of the mobile device 705.

Figure 8:
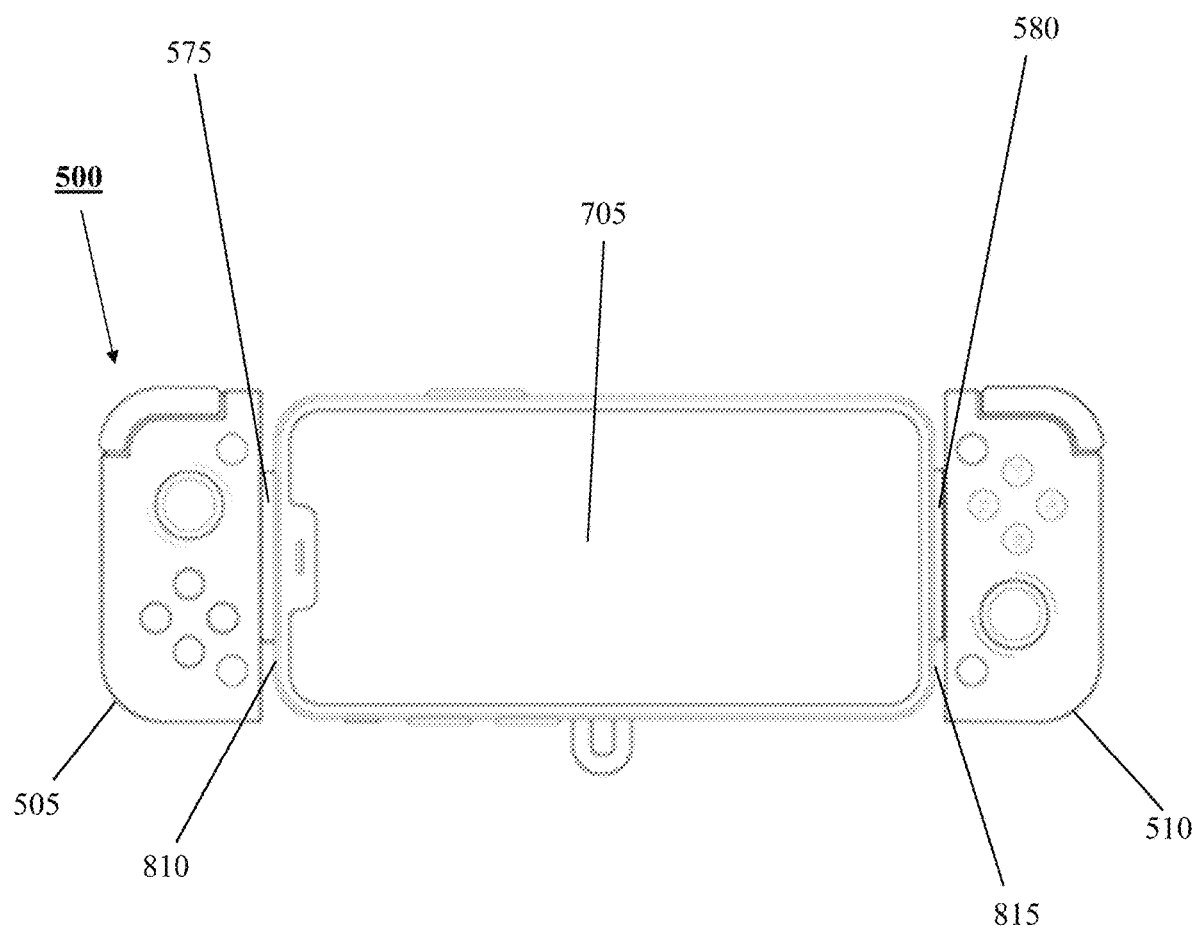
FIG. 8 is an illustration of an alternative mobile device controller in an engaged configuration with a mobile device in a landscape orientation.

FIG. 8 is an illustration of the alternative mobile device controller 500 in an engaged configuration with the mobile device 705 in a landscape orientation. If the mobile device 705 is in the landscape orientation, the first anchor 575 can contact and firmly engage a third side 810 of the mobile device 705, while the second anchor 580 can contact and firmly engage a fourth side 815 of the mobile device 705. The adjustable bridge structure 555 can engage with a back side of the mobile device 705. Consequently, the mobile device controller 500 can adapt to mobile devices of different sizes and in different orientations.

Figure 9A:
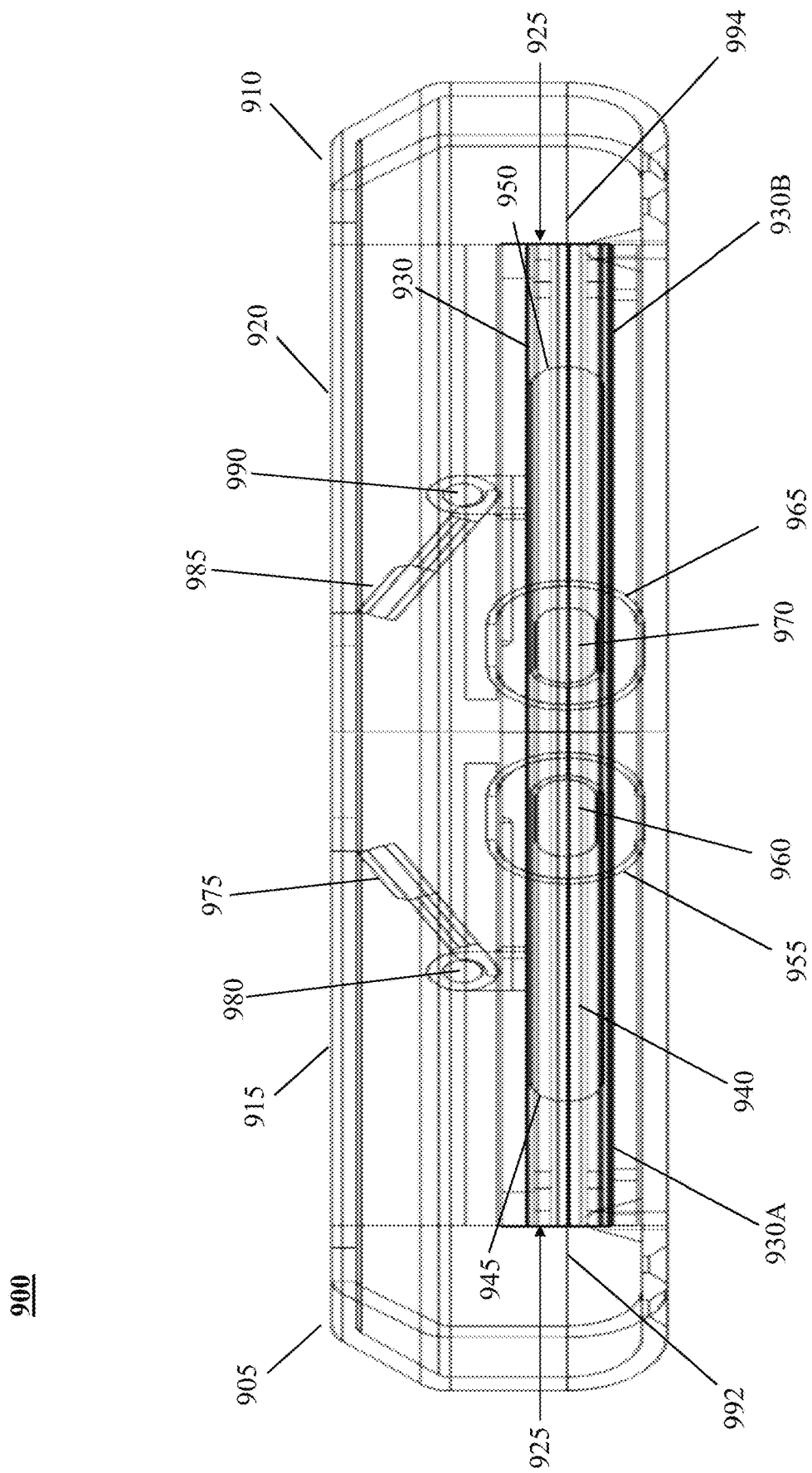
FIG. 9A is an illustration of a side view of an alternative mobile device controller in a closed or collapsed configuration for interacting with client applications.
Figure 9B:
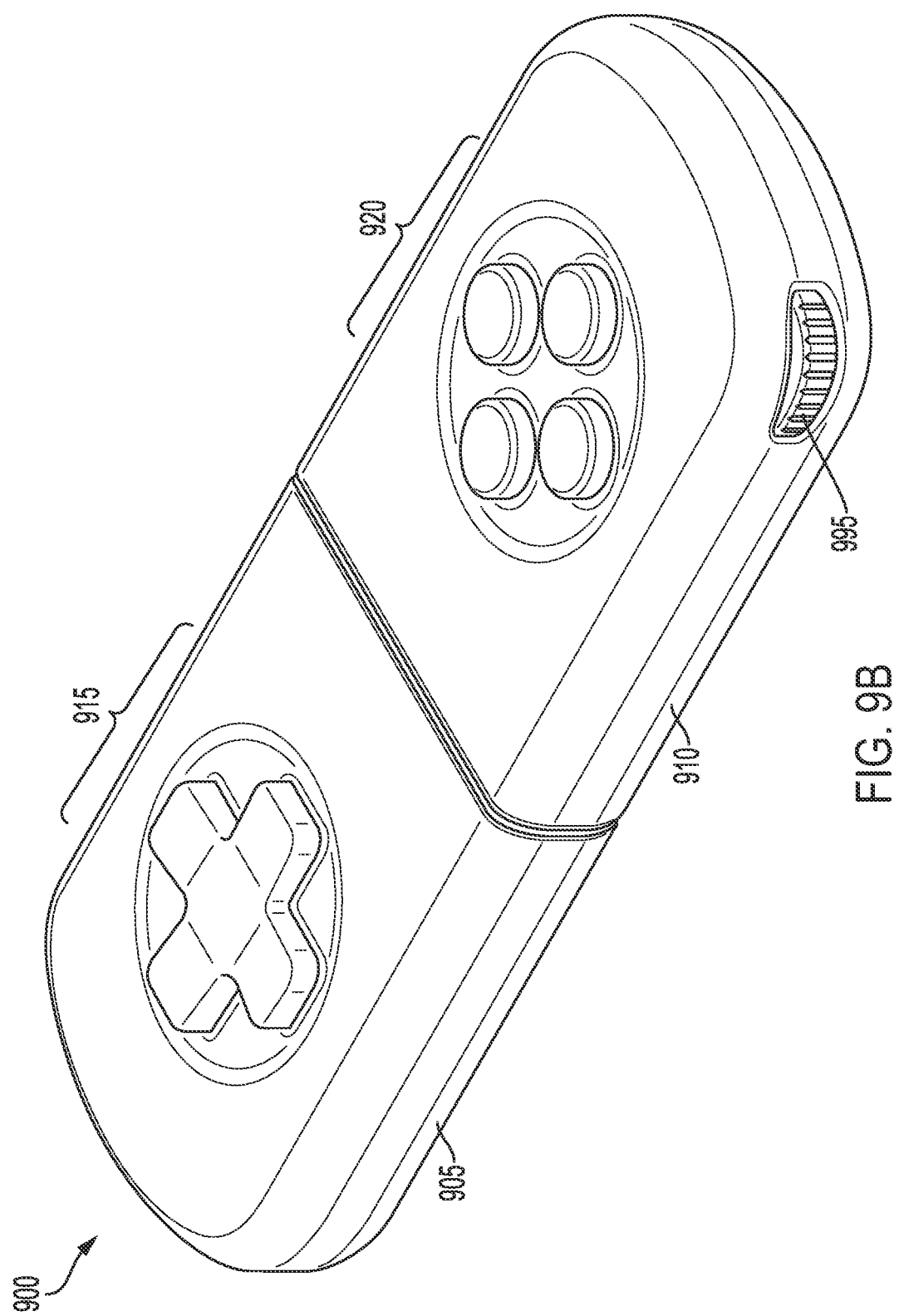
FIG. 9B is an illustration of a front right upper perspective view of the mobile device controller of FIG. 9A.
Figure 9C:
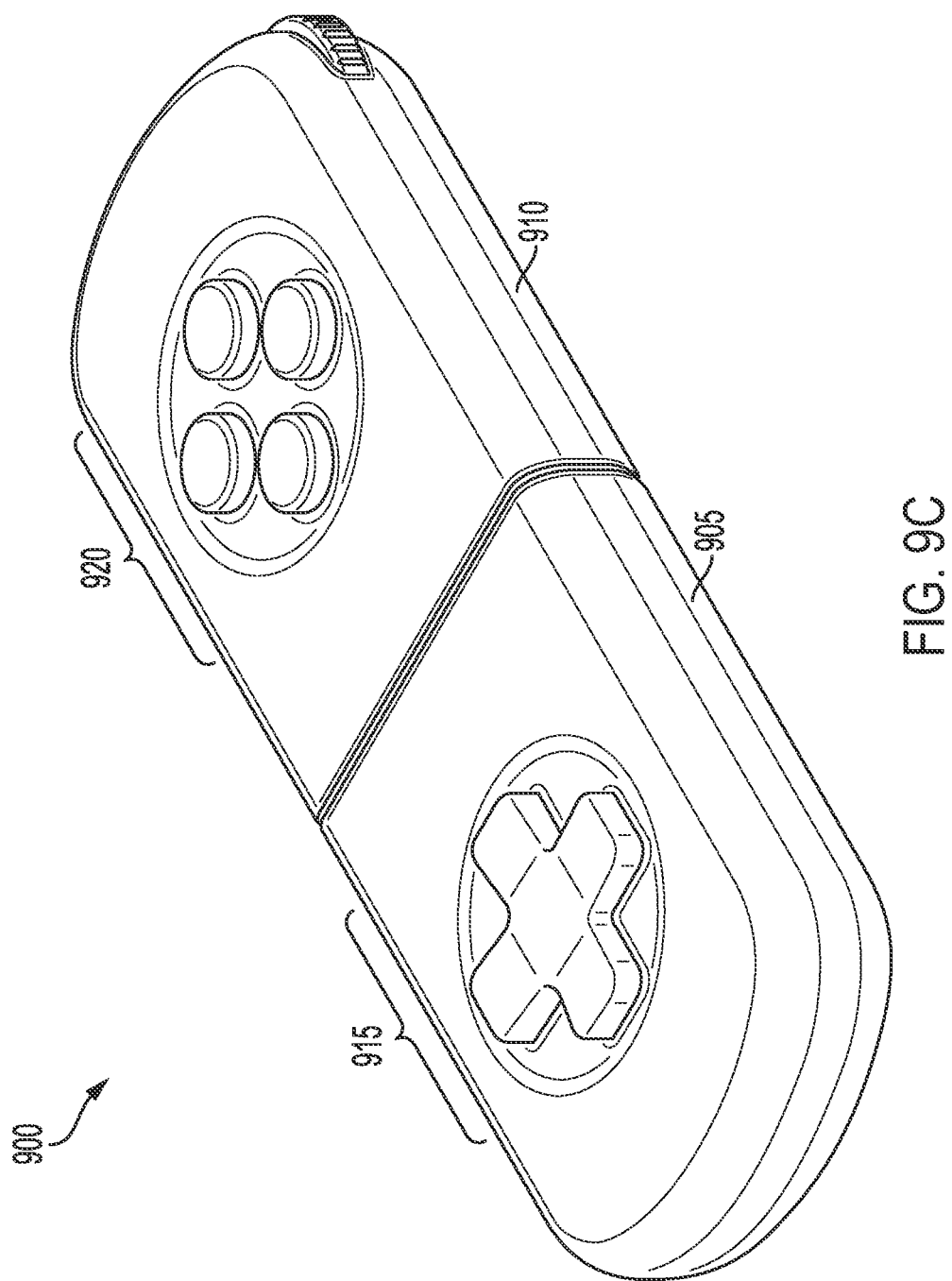
FIG. 9C is an illustration of a front left upper perspective view of the mobile device controller of FIG. 9A.
Figure 9D:
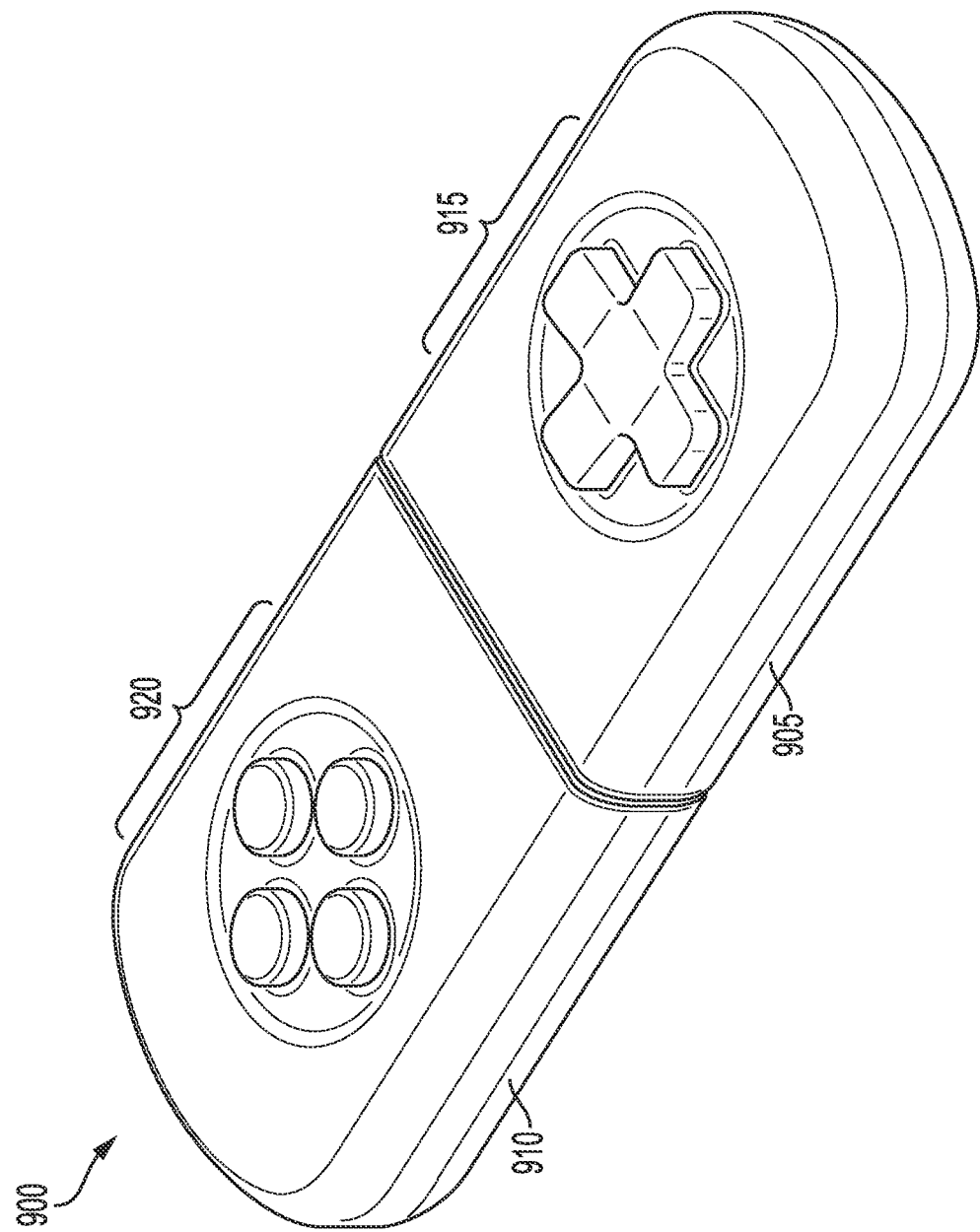
FIG. 9D is an illustration of a back left upper perspective view of the mobile device controller of FIG. 9A.
Figure 9E:
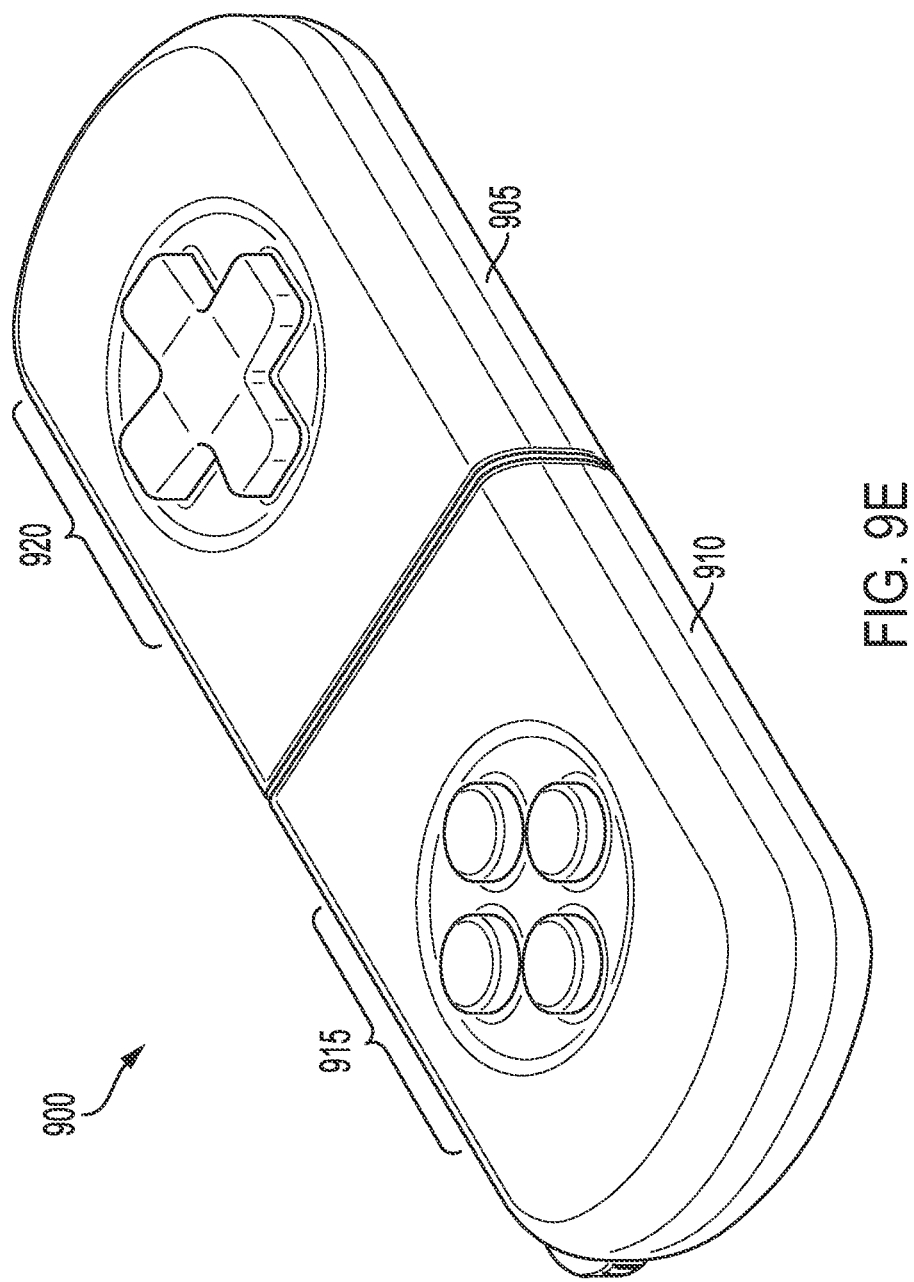
FIG. 9E is an illustration of a back right upper perspective view of the mobile device controller of FIG. 9A.
Figure 9F:
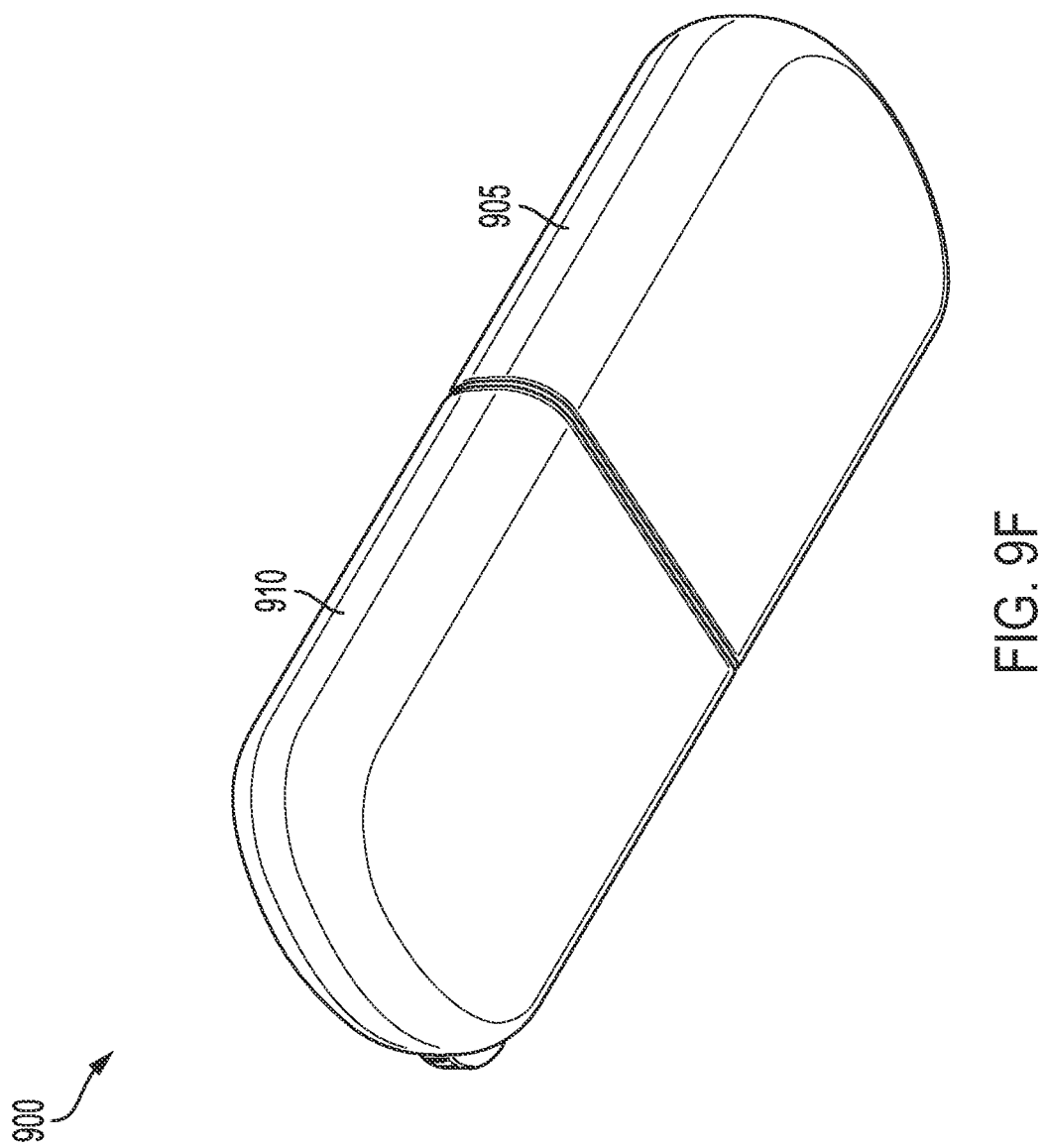
FIG. 9F is an illustration of a back right lower perspective view of the mobile device controller of FIG. 9A.
Figure 9H:
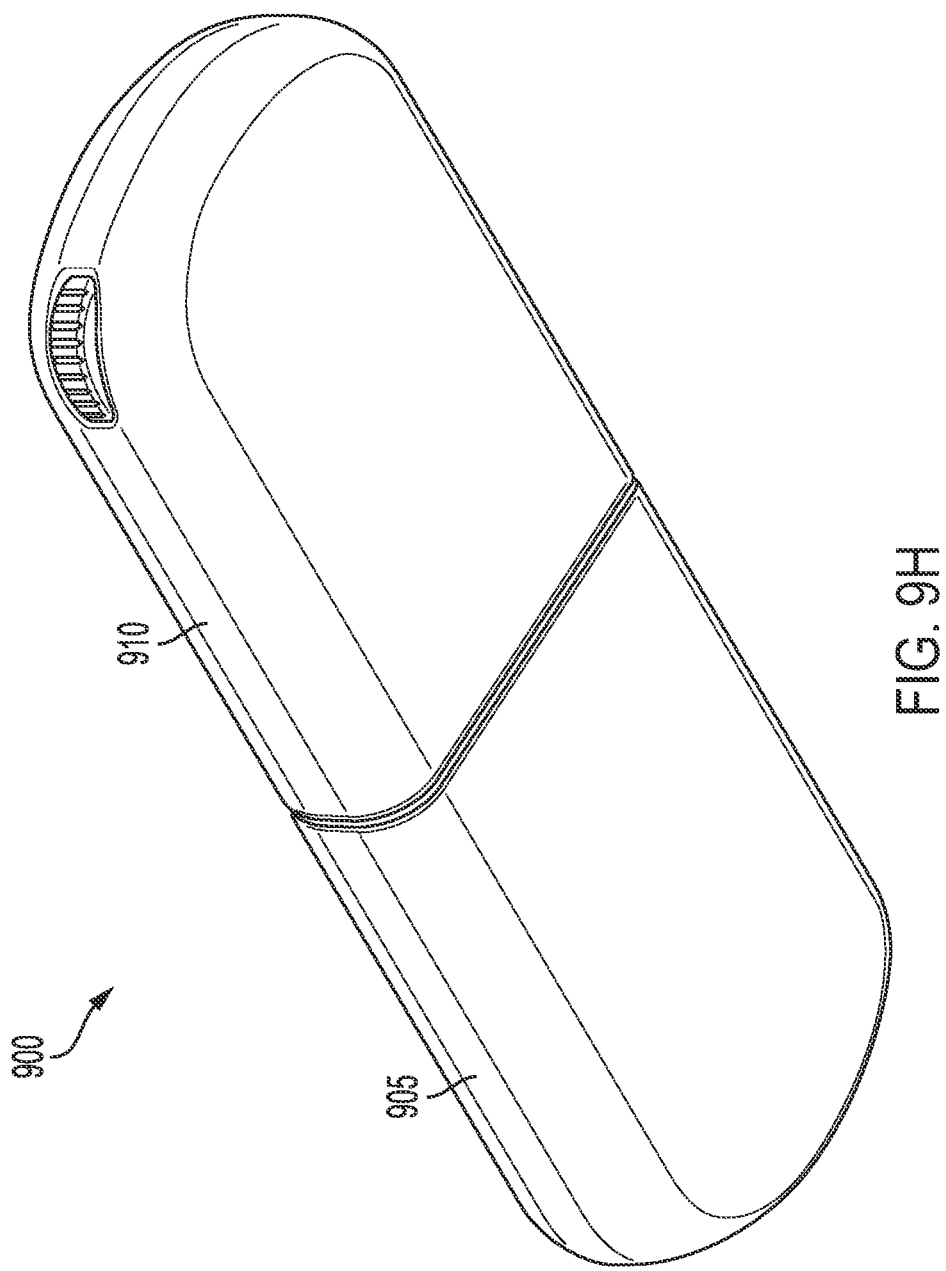
FIG. 9H is an illustration of a front right lower perspective view of the mobile device controller of FIG. 9A.
Figure 91:
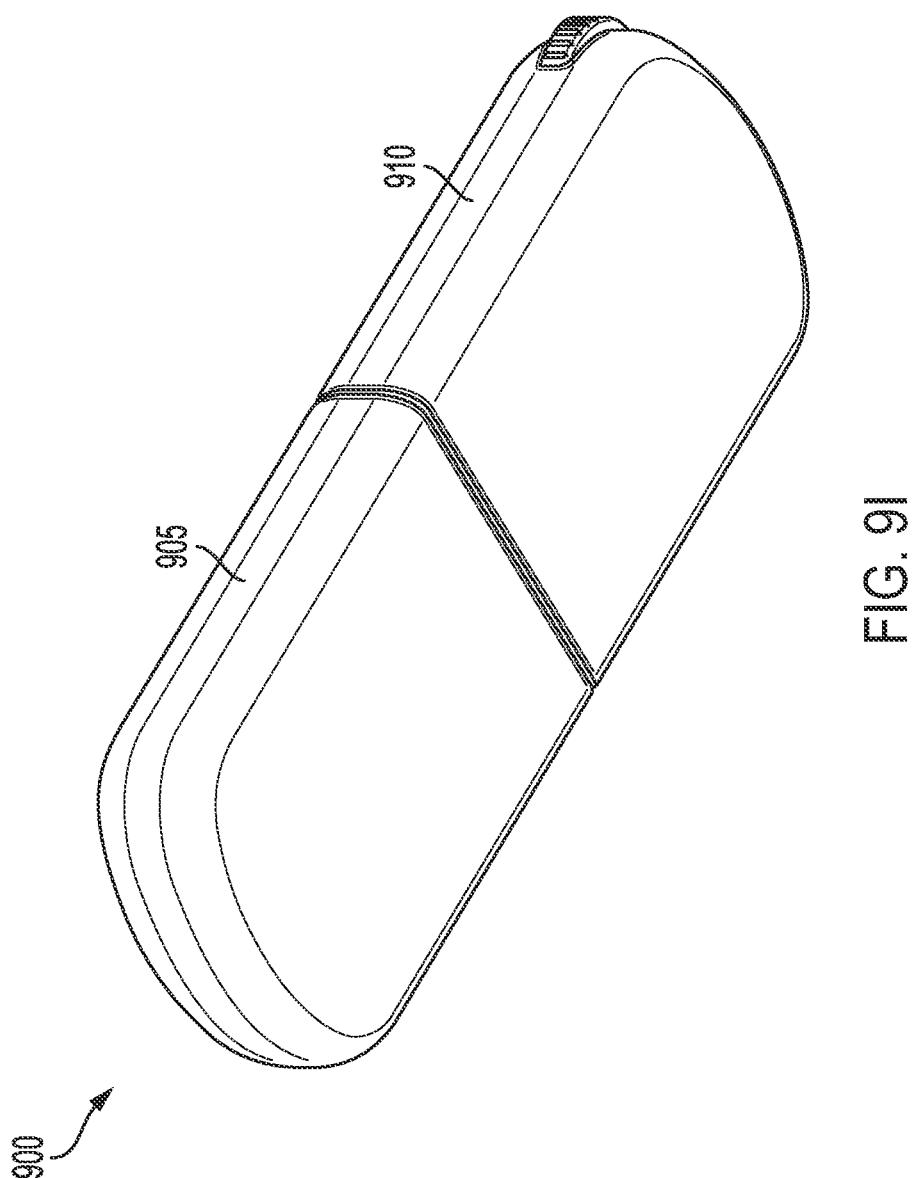
Figure 9K:
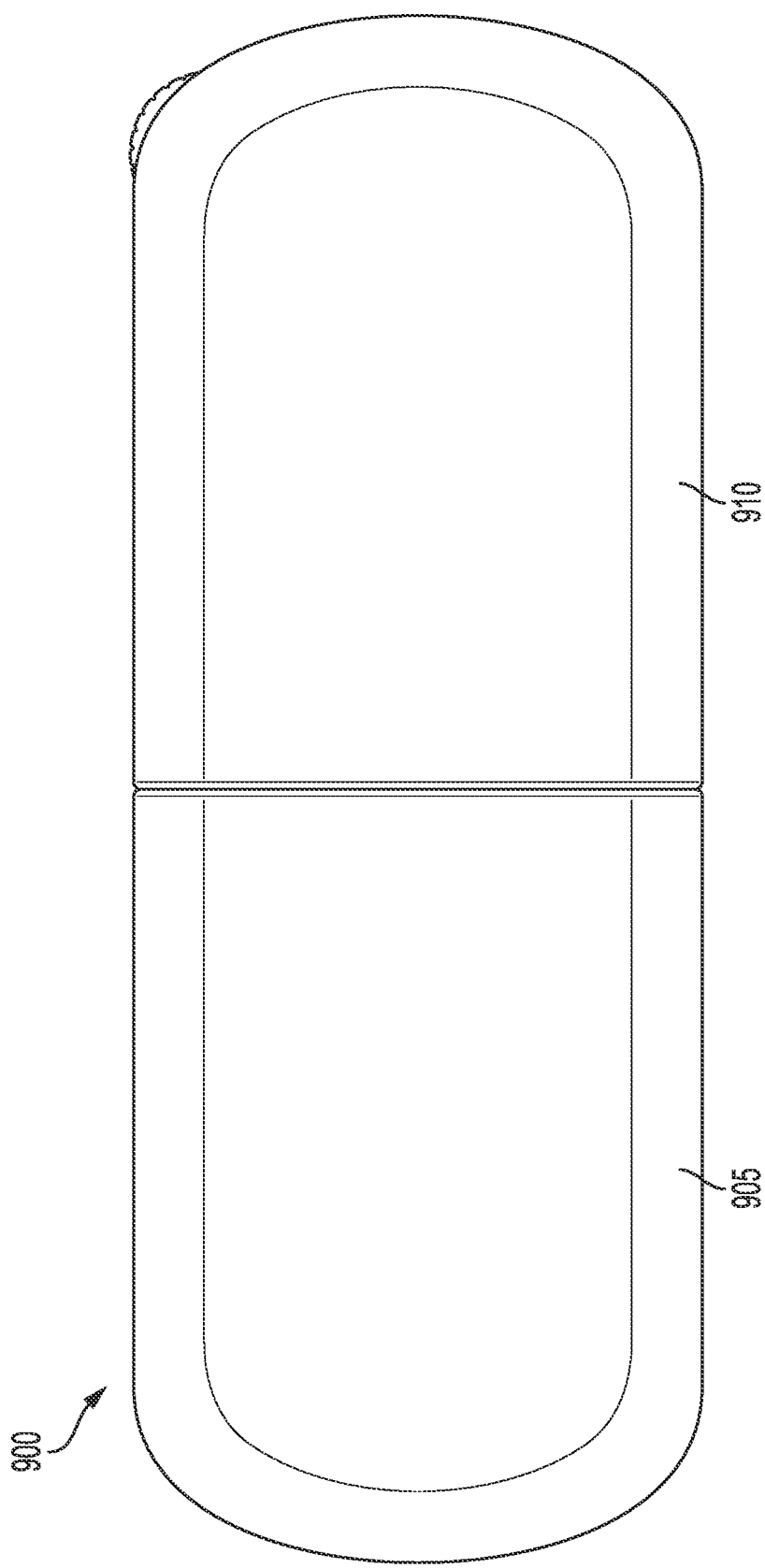
FIG. 9K is an illustration of a bottom side view of the mobile device controller of FIG. 9A.
Figure 9L:
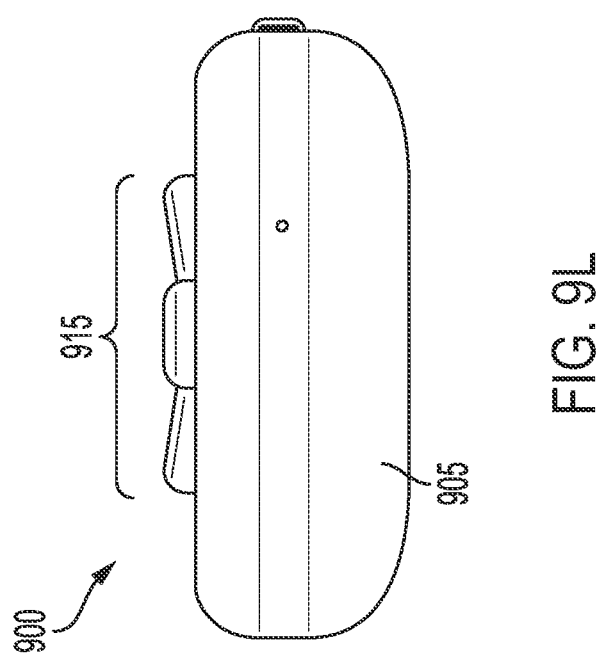
FIG. 9L is an illustration of a left perspective view of the mobile device controller of FIG. 9A.
Figure 9M:
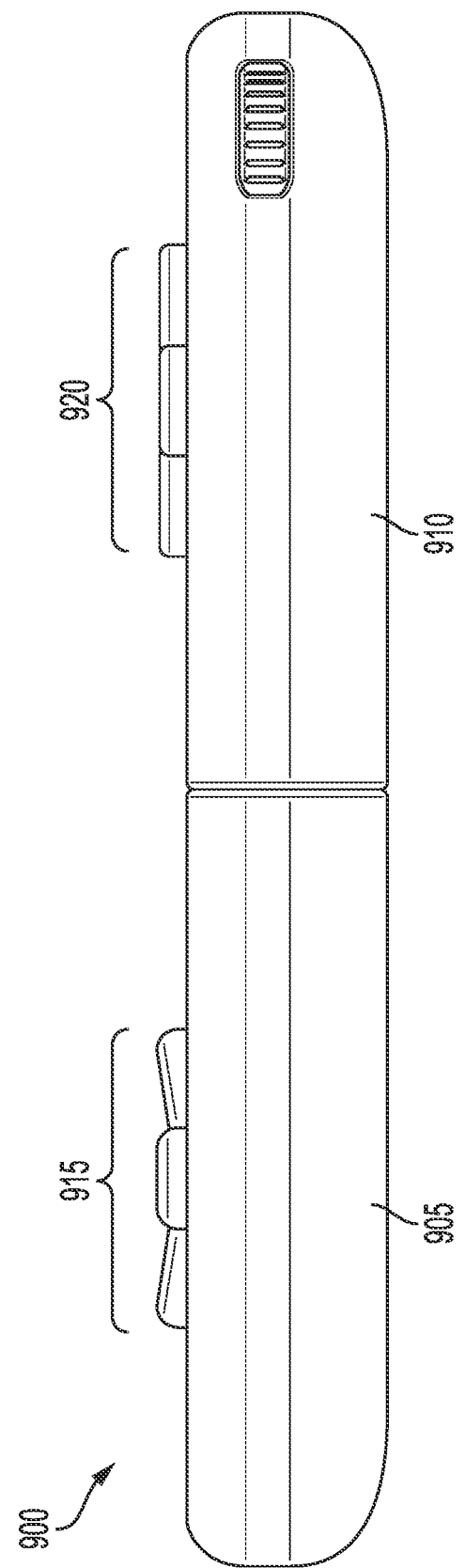
FIG. 9M is an illustration of a front perspective view of the mobile device controller of FIG. 9A.
Figure 9N:
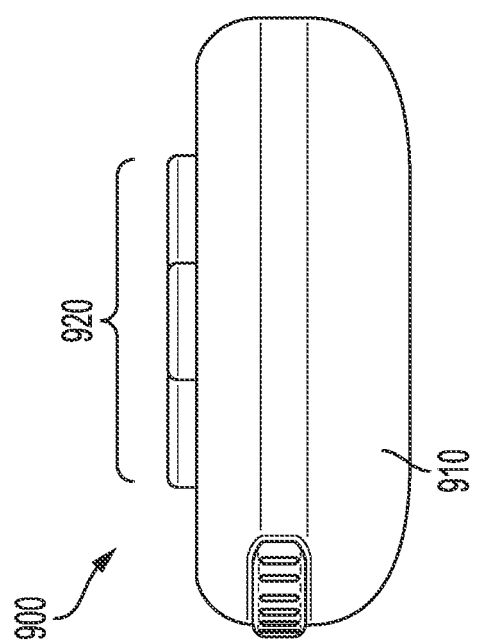
FIG. 9N is an illustration of a right perspective view of the mobile device controller of FIG. 9A.
Figure 9O:
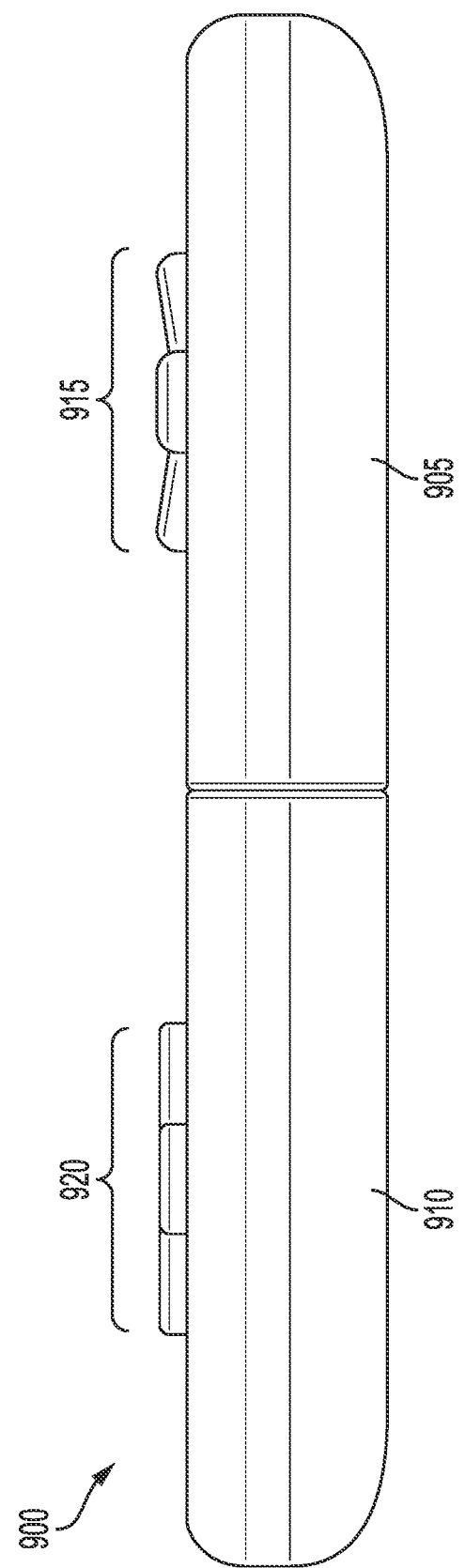
FIG. 9O is an illustration of a back perspective view of the mobile device controller of FIG. 9A.

FIGS. 9A-9O are illustrations of multiple views of an alternative mobile device controller 900 in a closed or collapsed configuration for interacting with client applications. The mobile device controller 900 can be form-fitting to a mobile device and provide the physical inputs that allow the user to control, interact or otherwise engage with client applications executing on the mobile device. In embodiments, the mobile device controller 900 can comprise a linear expansion or slide mechanism for use with mobile devices. The mobile device controller 900 can include a first controller module 905 (e.g., a left-hand controller) and a second controller module 910 (e.g., a right-hand controller). The first and second controller modules 905 and 910 can be split so that they can be positioned on opposing sides (e.g., left and right or top and bottom, but not front and back) of the mobile device. Although illustrated as having approximately equivalent size, the first and second controller modules 905 and 910 can be of similar or different sizes, depending on the desired configuration. The first controller module 905 can include a first button layout 915 on a first (e.g., upper) surface of the first controller module 905. For example, the first button layout 915 can include any suitable number of buttons or keys in any appropriate configuration (e.g., buttons for A, B, X, Y, and/or arrows for up, down, left, right, or the like). The second controller module 910 can include a second button layout 920 on a second (e.g., upper) surface of the second controller module 910. For example, the second button layout 920 can include any suitable number of buttons or keys in any appropriate configuration (e.g., buttons for A, B, X, Y, and/or arrows for up, down, left, right, or the like). The first and second controller modules 905 and 910 can each include or otherwise support any suitable button and/or key layout. For example, the button layouts can be similar to game consoles, such as with two analog sticks, a D-pad, four right-side input buttons, four shoulder buttons and two triggers. The first and second controller modules 905 and 910 can additionally or alternatively include menu, function, and backside paddle inputs, although other combinations of buttons, triggers, paddles, joysticks, and the like are possible.

In embodiments, the mobile device controller 900 can include an expandible bridge structure 925 that can reside between and within the first and second controller modules 905 and 910. The expandible bridge structure 925 can include an outer expansion structure 930 that can include two separate sections or portions—a first outer expansion portion 930A residing within the first controller module 905 and a second outer expansion portion 930B residing within the second controller module 910. An inner expansion structure 940 can reside within the outer expansion structure 935 and between the first outer expansion portion 930A and the second outer expansion portion 930B. The outer expansion structure 930 and the inner expansion structure 940 can comprise two linear stages to allow expansion of the mobile device controller 900 to fit a variety of mobile device sizes or orientations. The first outer expansion portion 930A can include a pair of first grooves 945 (each located on opposing sides of the first outer expansion portion 930A) to support lateral movement of the first outer expansion portion 930A. The second outer expansion portion 930B can include a pair of second grooves 950 (each located on opposing sides the second outer expansion portion 930B) to support lateral movement of the second outer expansion portion 930B. The first controller module 905 can include a pair of first guide anchors 955 (each located on opposing inner sides of the first controller module 905). Each of the pair of first guide anchors 955 can include a first protuberance 960 of appropriate height and width to engage in and with a respective groove of the pair of first grooves 945 to support lateral movement of the first outer expansion portion 930A. In some implementations of the present invention, each of the first protuberances 960 can be any suitable elliptical or circular shape with a diameter that is equal to or slightly less than the width of the corresponding first groove 945 to promote the free lateral movement of the first outer expansion portion 930A. The second controller module 910 can include a pair of second guide anchors 965. Each of the pair of second guide anchors 965 can include a second protuberance 970 of appropriate height and width to engage in and with a respective groove of the pair of second grooves 950 to support lateral movement of the second outer expansion portion 930B. In some implementations of the present invention, each of the second protuberances 970 can be any suitable elliptical or circular shape with a diameter that is equal to or slightly less than the width of the corresponding second groove 950 to promote the free lateral movement of the second outer expansion portion 930B.

In some implementations of the present invention, the mobile device controller 900 can include a pair of flappers (or flaps) or grippers (or grips) for grasping and holding mobile devices and which allow the mobile device controller 900 to be a more compact size and a thinner design. For example, the flappers can reside within the body of the mobile device controller 900 and be preloaded to allow them to automatically raise when the first and second controller modules 905 and 910 are expanded apart and automatically lower and retract back into the body when the first and second controller modules 905 and 910 are contracted back together. According to an embodiment of the present invention, the first controller module 905 can include a first flapper hinge 975 for engaging a first side of a mobile device. The first flapper hinge 975 can be of any appropriate width between opposing inner sides of the first controller module 905 and any appropriate height and thickness, depending on, for example, the thickness of mobile devices to be grasped, the desired amount of extension outside of the first controller module 905 when in the fully engaged position, and the like. The first flapper hinge 975 can be coupled to an inner side of the first controller module 905 via a pair of first pivot joints 980 (each located on opposing inner sides of the first controller module 905) to allow the first flapper hinge 975 to rotate. In an embodiment, each or both of the pair of first pivot joints 980 can comprise a spring-loaded configuration to allow the first flapper hinge 975 to raise as the first controller module 905 is expanded laterally and to lower as the first controller module 905 is contracted laterally. The second controller module 910 can include a second flapper hinge 985 for engaging a second side of a mobile device. The second flapper hinge 985 can be of any appropriate width between opposing inner sides of the second controller module 910 and any appropriate height and thickness, depending on, for example, the thickness of mobile devices to be grasped, the desired amount of extension outside of the second controller module 910 when in the fully engaged position, and the like. In an embodiment, the first flapper hinge 975 and the second flapper hinge 985 can be similar or identical in size and shape. In an alternative embodiment, the first flapper hinge 975 and the second flapper hinge 985 can each be a different size and shape. The second flapper hinge 985 can be coupled to an inner side of the second controller module 910 via a pair of second pivot joints 990 (each located on opposing inner sides of the second controller module 910) to allow the second flapper hinge 985 to rotate. In an embodiment, each or both of the pair of second pivot joints 985 can comprise a spring-loaded configuration to allow the second flapper hinge 985 to raise as the second controller module 910 is expanded laterally and to lower as the second controller module 910 is contracted laterally.

In some implementations of the present invention, to support the expansion and contraction of the mobile device controller 900, the expandible bridge structure 925 can be coupled to the respective the first and second controller modules 905 and 910 using a suitable elastic structure (e.g., springs or the like). The elastic structure can be coupled to respective ends of the expandable bridge structure 925. Alternatively, the elastic structure can reside within and extend through the expandable bridge structure 925. For example, the elastic structure can be attached or otherwise anchored to a first end 992 inside the casing of the first controller module 905 and attached or otherwise anchored to a second end 994 inside the casing of the second controller module 910. In an embodiment, the elastic structure can comprise one or more internal springs that extend through or are attached at respective ends of the expandable bridge structure 925. In an alternative embodiment, the elastic structure can comprise a spring-loaded reel that is fastened or otherwise anchored to one end inside the casing of the mobile device controller 900 (e.g., at first end 992 of first controller module 905). An end of the cord or line of the spring-loaded reel can extend through the expandable bridge structure 925 and be fastened or otherwise anchored to the opposing end inside the casing of the mobile device controller 900 (e.g., at second end 994 of the second controller module 910). Alternatively, each of the first and second controller modules 905 and 910 can include a spring-loaded reel that are attached or otherwise anchored inside the respective casings of the first and second controller modules 905 and 910 on both ends of the mobile device controller 900. The end of the cord or line of the respective spring-loaded reels can be attached or otherwise anchored to a respective end of the first and second outer expansion portions 930A and 930B. The elastic structure for the expandable bridge structure 925 can allow the first and second controller modules 905 and 910 to be pulled apart or expanded laterally, wrapped around the back side of the mobile device, and then contracted to engage with and firmly hold opposing sides of the mobile device (e.g., using the first and second flapper hinges 975 and 985) in a form-fitting configuration. In such a configuration, the expandable bridge structure 925 can engage with a back side of the mobile device. In this way, the mobile device controller 900 can adapt to mobile devices of different sizes and in different orientations.

The first and second controller modules 905 and 910 can include suitable electronic components to support wireless communication with at least the mobile device and control of the client application executing on the mobile device through the physical inputs provided by the user when interacting with first and second button layouts 915 and 920. In such a configuration, either or both of the first and second controller modules 905 and 910 can include battery components to provide power for the mobile device controller 900. For example, if one of the first and second controller modules 905 and 910 includes a battery component, the controller module with the battery component can supply power to the other controller module through a power communication channel that can run within and through the expandable bridge structure 925. In some implementations of the present invention, either or both of the first and second controller modules 905 and 910 can include a suitable switch (e.g., toggle, push-button, selector, joystick, rotary, slide, etc.) to, for example, turn power on and off to the mobile device controller 900, initiate pairing between the mobile device controller 900 and the mobile device, disconnect the mobile device controller 900 from the mobile device, switch or otherwise cycle through client applications that the user is interacting with on the mobile device, or provide other like functionality. Merely for purposes of illustration and not limitation, the second controller module 910 can include a switch 995 as illustrated in FIG. 9B, although the switch 995 can be additionally or alternatively located on the first controller module 905. In some implementations of the present invention, the expandable bridge structure 925 can include suitable electronic and/or power components to support some or all of such functionality. For example, the expandable bridge structure 925 can include an inductive charging array with a magnetic alignment feature (e.g., MagSafe or the like) or other suitable electronic circuitry. The expandable bridge structure 925 can expand and contract from a center or middle of the mobile device controller 900 (or approximately therefrom) so that the inductive charging array of the mobile device controller 900 can be maintained substantially centered in the mobile device controller 900. Such a centering action can be used to maintain alignment between the mobile device controller 900 and the mobile device, regardless of model and orientation. Such an inductive charging array can also be used to support additional setup and playability features and functionality that are similar or identical to that described above with respect to the inductive charging array integrated into the adjustable bridge structure 125 of mobile device controller 100 of FIG. 1. In an embodiment, the first and second controller modules 905 and 910 can communicate with each other via a wired communication channel. For example, a wired communication channel can run within and through the expandable bridge structure 925 to allow communication between the first and second controller modules 905 and 910. In an alternative embodiment, the first and second controller modules 905 and 910 can include appropriate electronic components to support communication with each other using any suitable wireless communication protocol (e.g., Bluetooth, Wi-Fi, NFC, or the like). Either or both of the first and second controller modules 905 and 910 can include suitable electronic components to support wireless communication with the mobile device using any appropriate wireless communication protocol (e.g., Bluetooth, Wi-Fi, NFC, etc.). For example, the first and second controller modules 905 and 910 can communicate wirelessly with each other and the mobile device.

Figure 10:
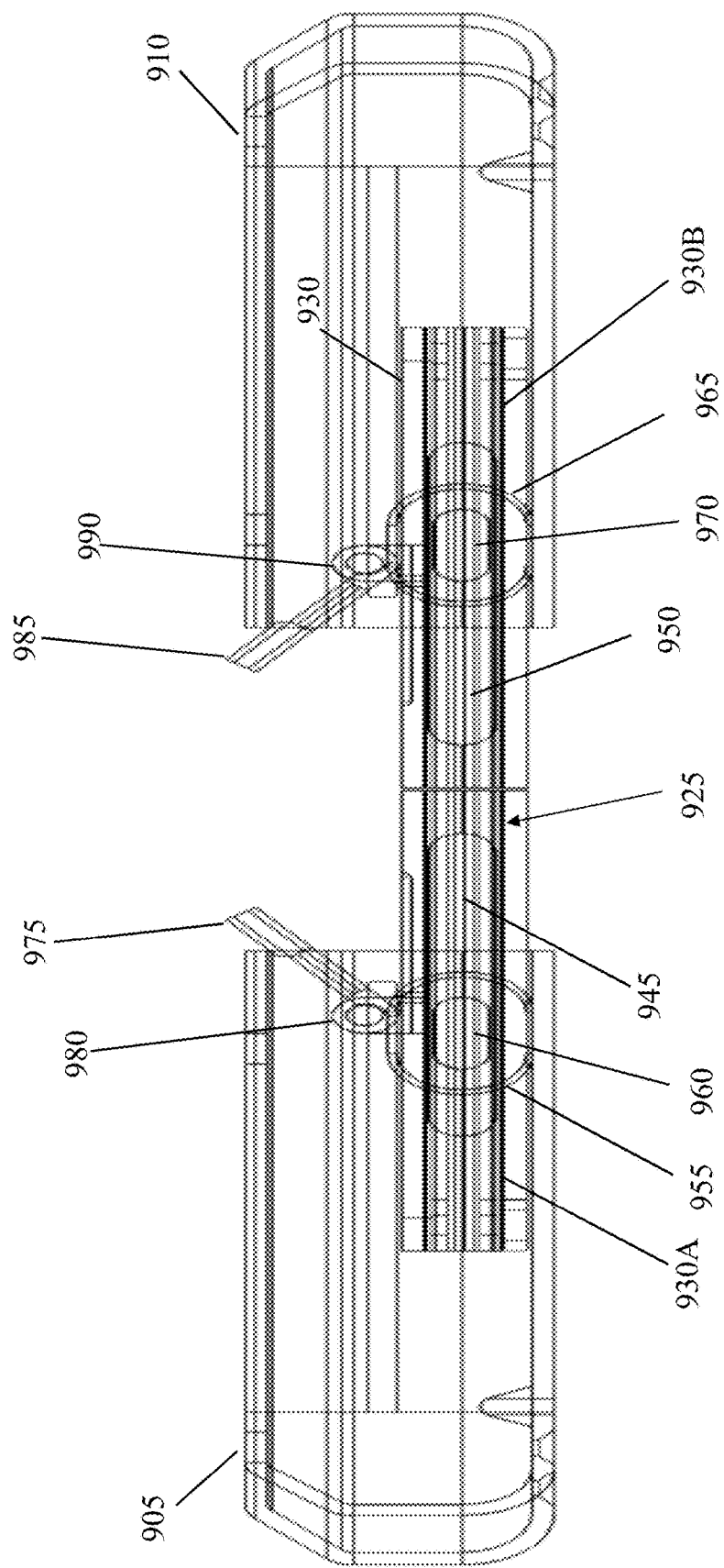
FIG. 10 is an illustration of an alternative mobile device controller in a partially open configuration.

FIG. 10 is an illustration of the mobile device controller 900 in a partially open configuration. In FIG. 10, the first and second controller modules 905 and 910 have been expanded laterally from each other, partially exposing the outer expansion structure 930 of the expandable bridge structure 925. As the user pulls apart the first and second controller modules 905 and 910, the first and second outer expansion portions 930A and 930B of the expandable bridge structure 925 begin extending out of the casings of the first and second controller modules 905 and 910, respectively, guided by the pairs of first and second protuberances 960 and 970 of the pairs of first and second guide anchors 955 and 965, respectively, along the pairs of first and second grooves 945 and 950, respectively. Additionally, the first and second flapper hinges 975 and 985 have been exposed. As discussed above, the first and second flapper hinges 975 and 985 can be preloaded to allow them to pop up and retract automatically (e.g., using spring-loaded pairs of first and second pivot joints 980 and 990).

Figure 11A:
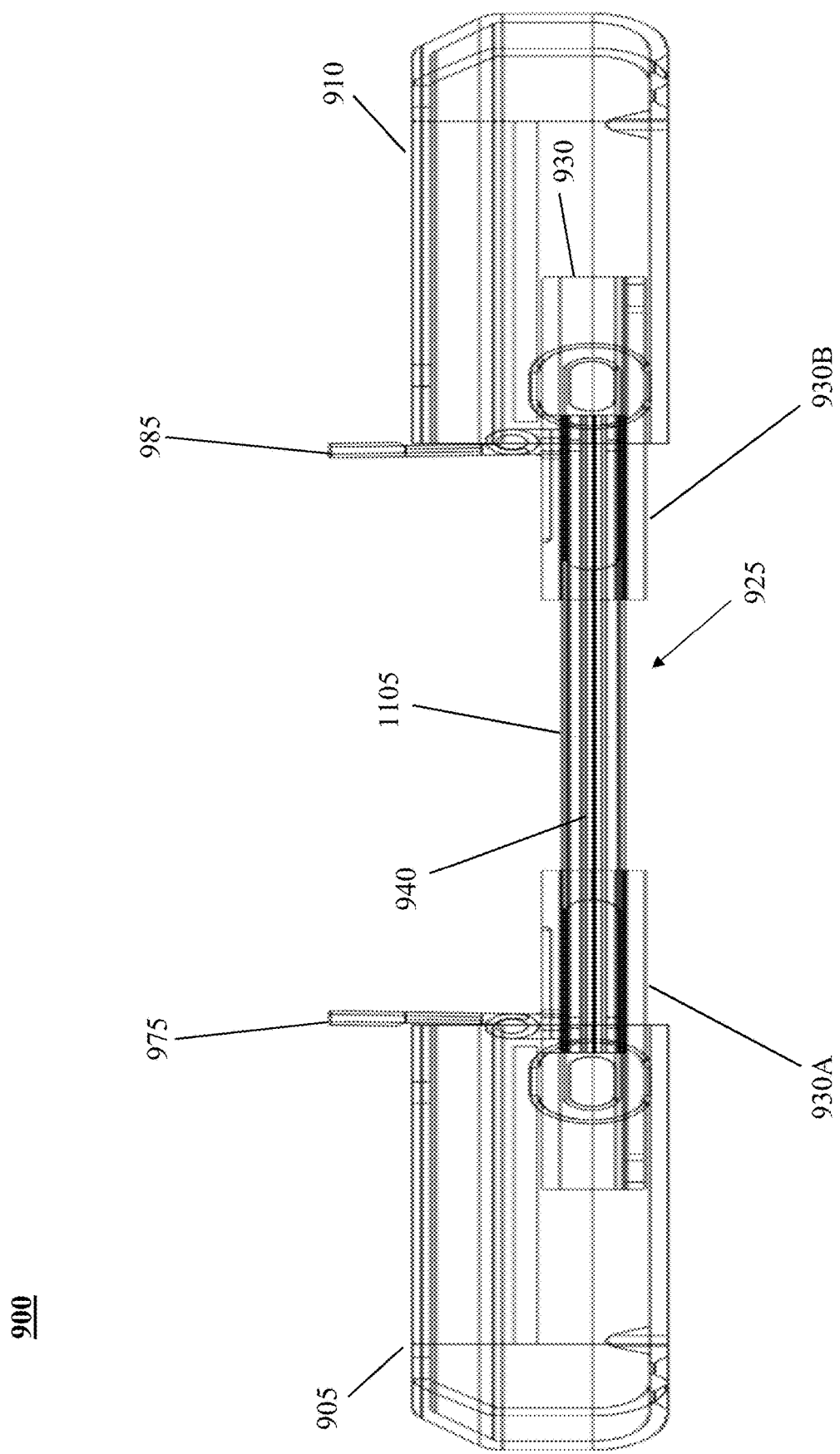
FIG. 11A is an illustration of an alternative mobile device controller in a fully expanded configuration.
Figure 11B:
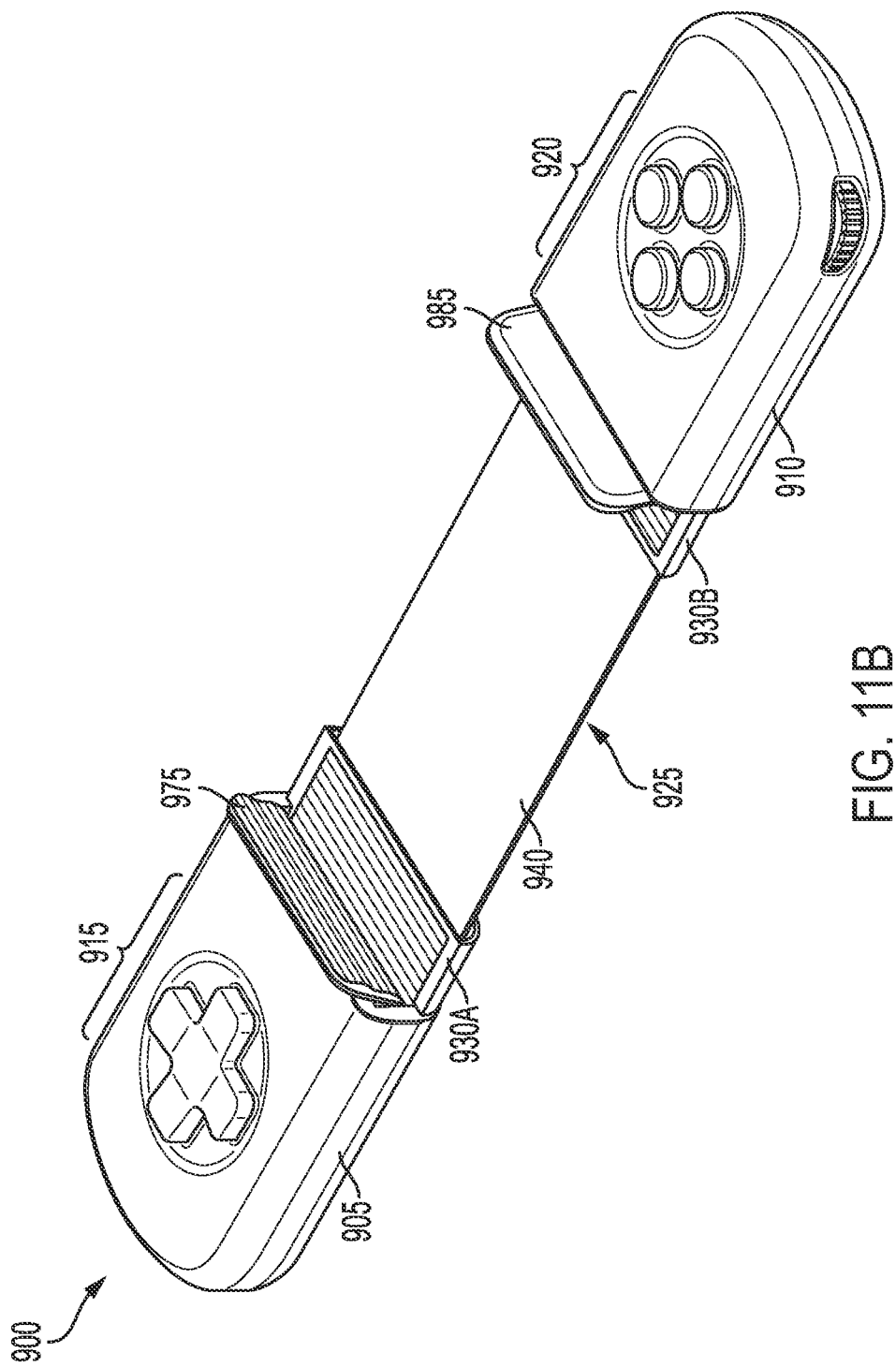
FIG. 11B is an illustration of a front right upper perspective view of the mobile device controller of FIG. 11A.
Figure 11C:
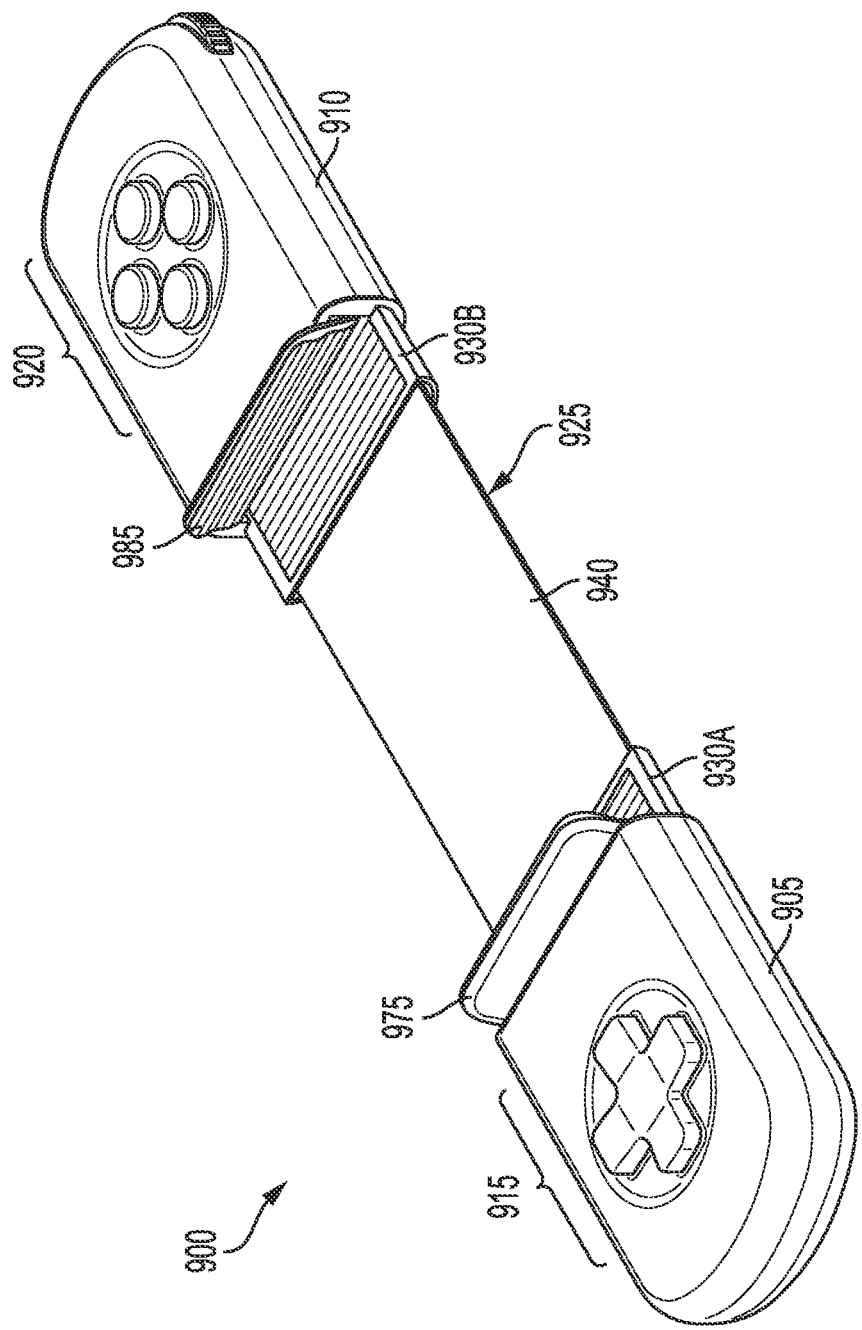
FIG. 11C is an illustration of a front left upper perspective view of the mobile device controller of FIG. 11A.
Figure 11D:
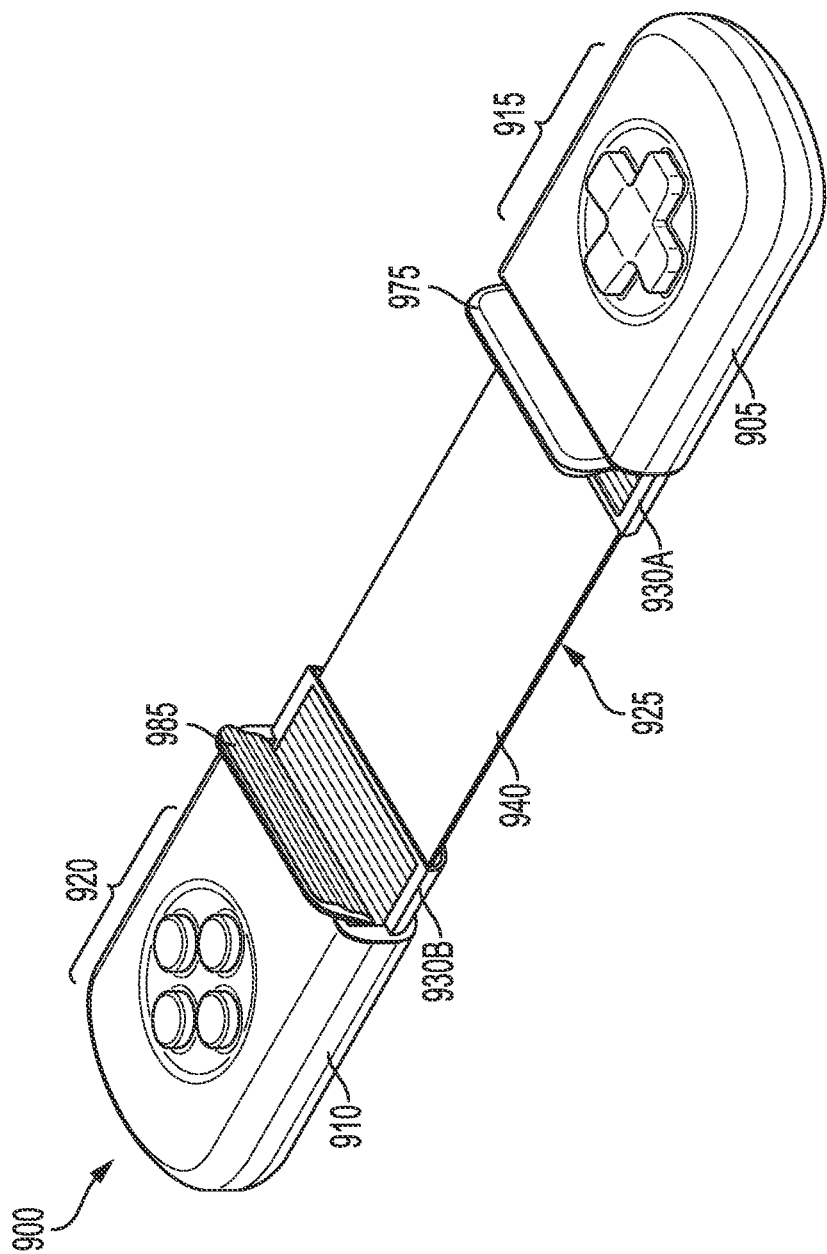
FIG. 11D is an illustration of a back left upper perspective view of the mobile device controller of FIG. 11A.
Figure 11E:
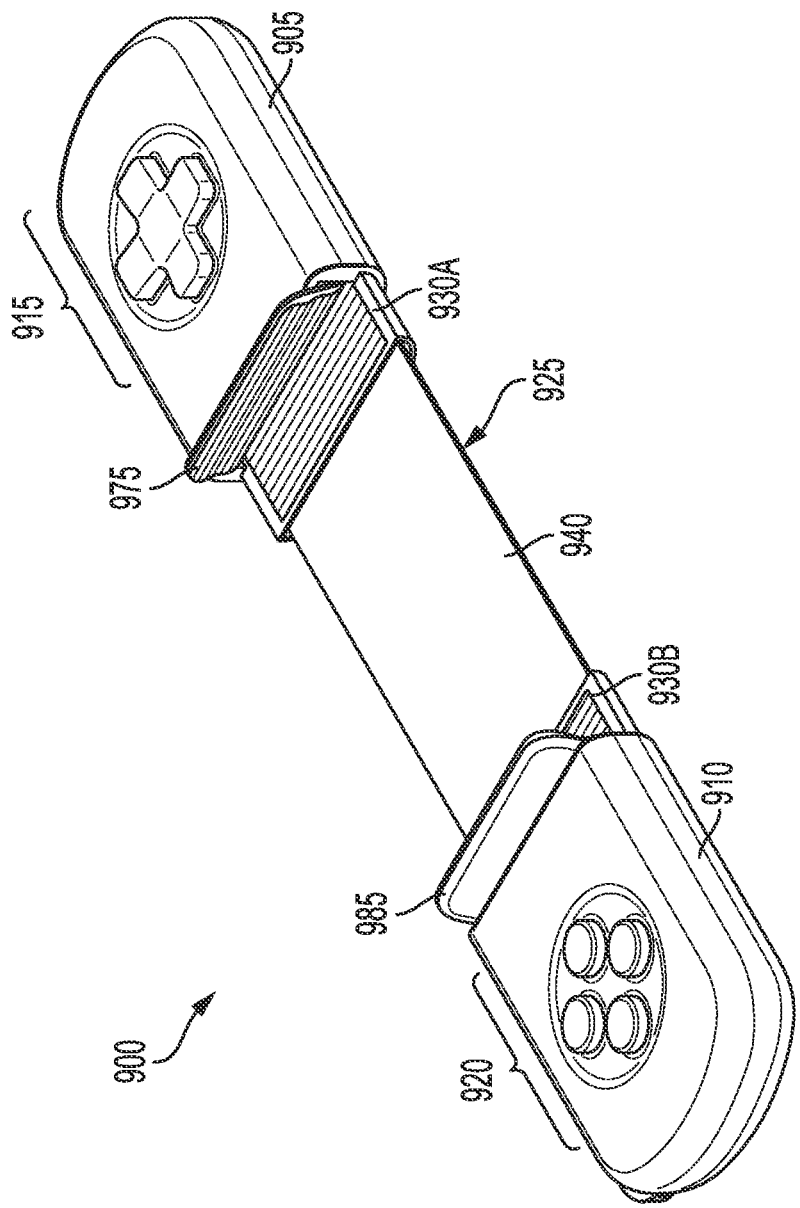
FIG. 11E is an illustration of a back right upper perspective view of the mobile device controller of FIG. 11A.
Figure 11F:
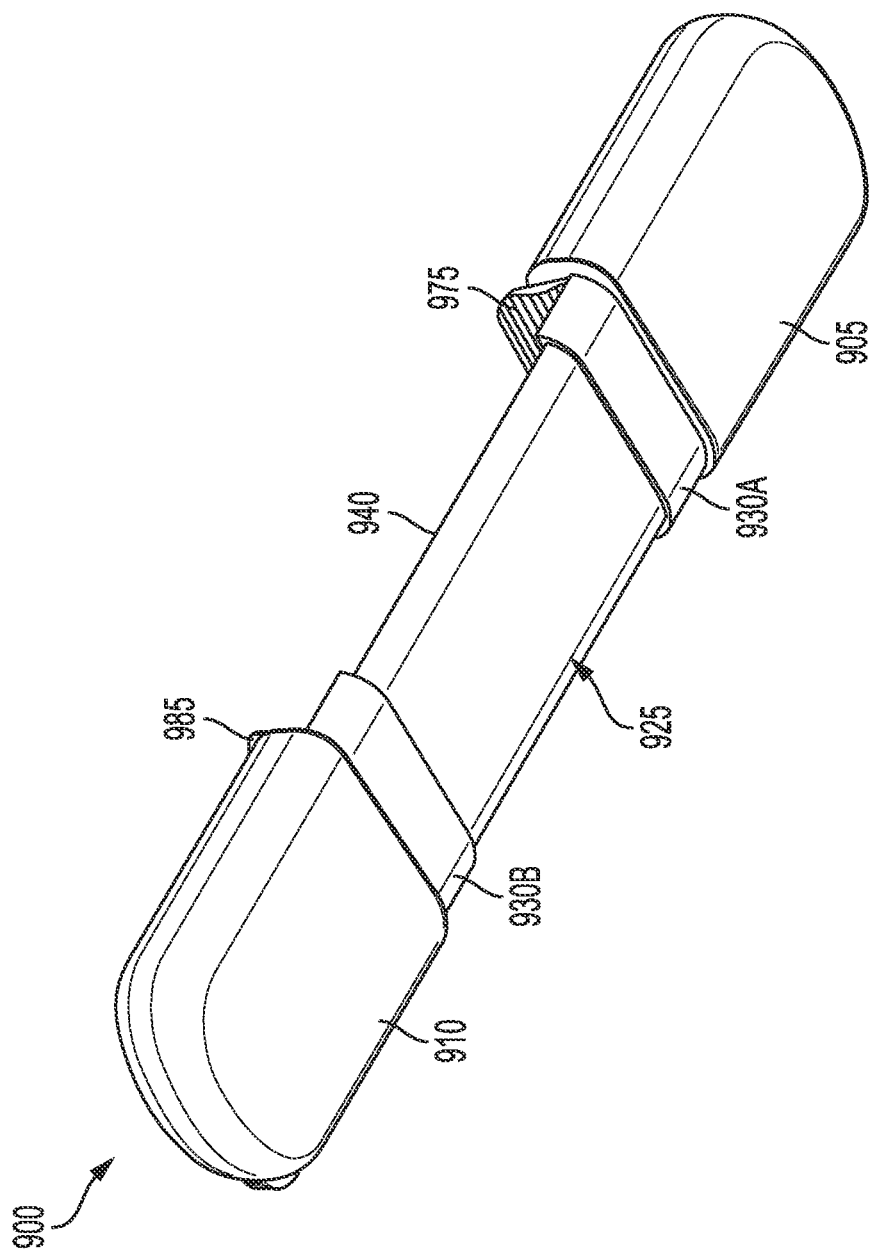
FIG. 11F is an illustration of a back right lower perspective view of the mobile device controller of FIG. 11A.
Figure 11G:
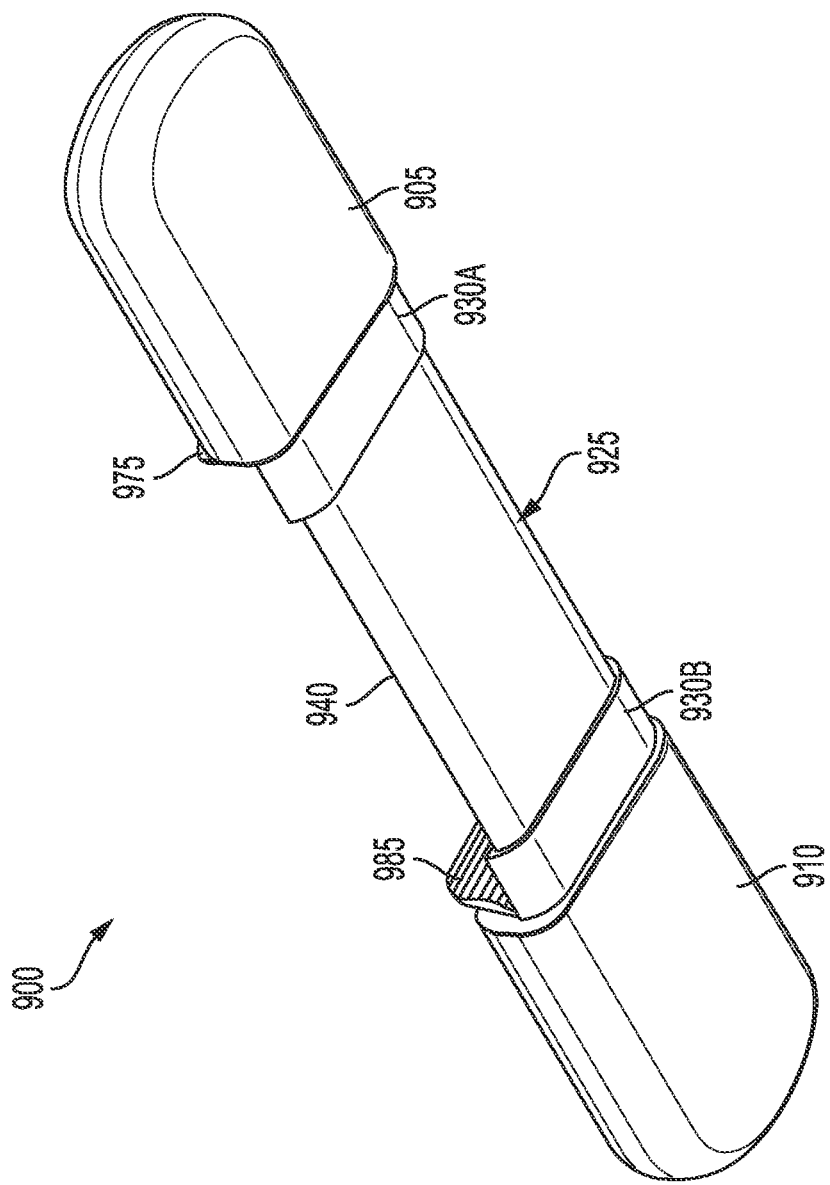
FIG. 11G is an illustration of a back left lower perspective view of the mobile device controller of FIG. 11A.
Figure 11I:
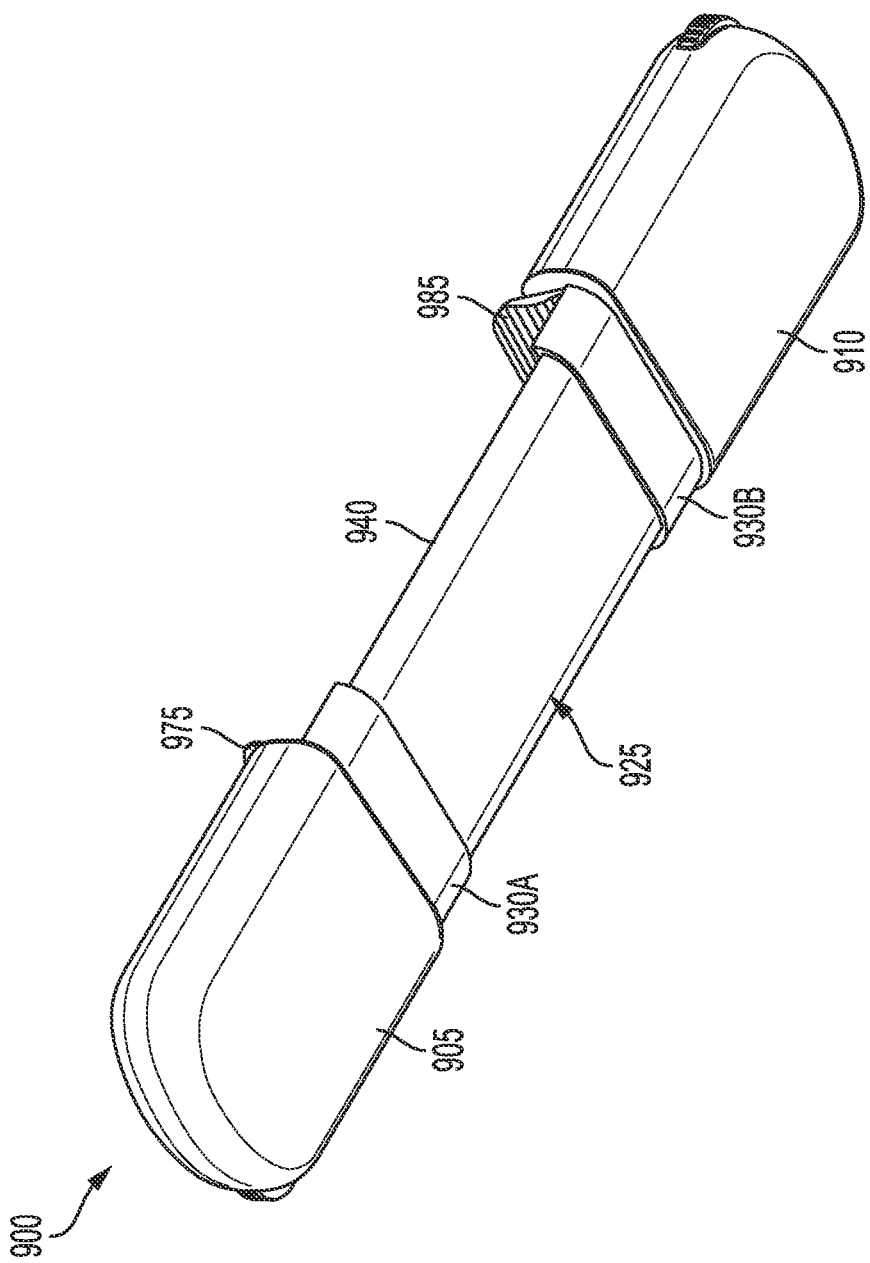
FIG. 11I is an illustration of a front left lower perspective view of the mobile device controller of FIG. 11A.
Figure 11J:
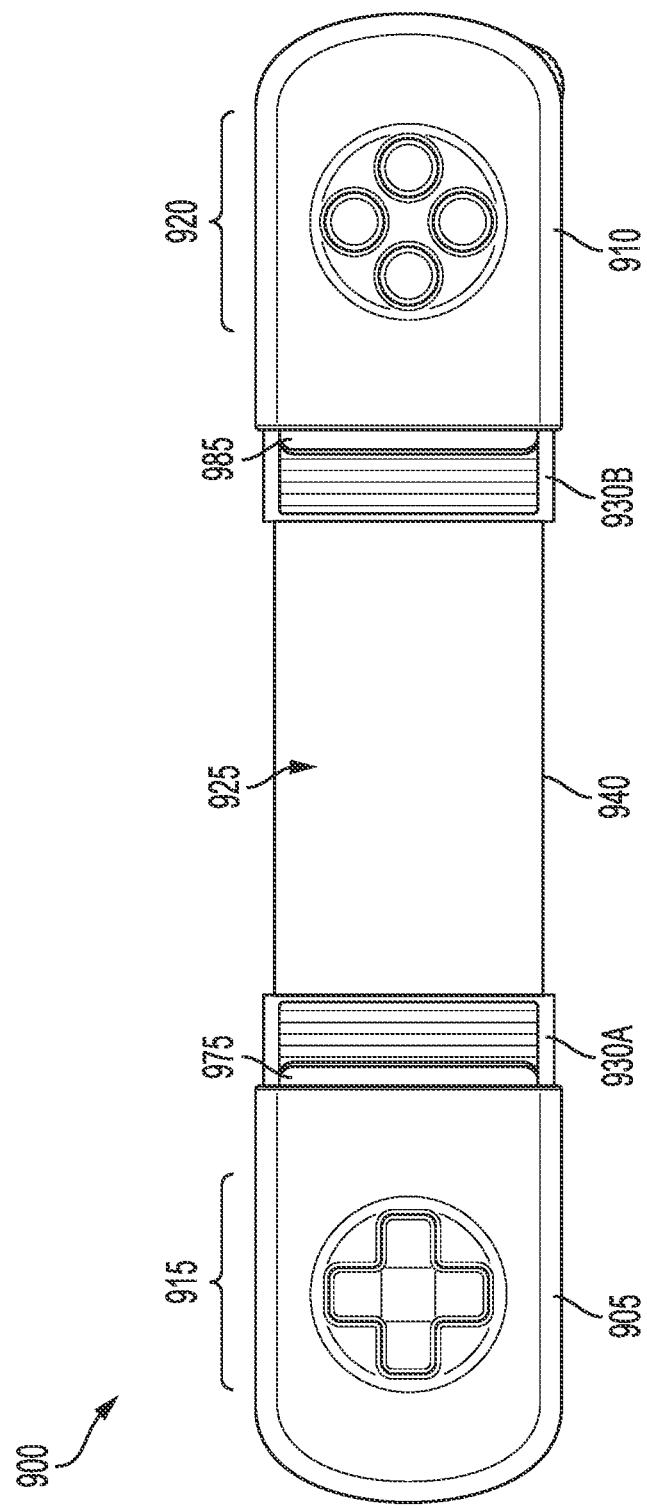
FIG. 11J is an illustration of a top side view of the mobile device controller of FIG. 11A.
Figure 11L:
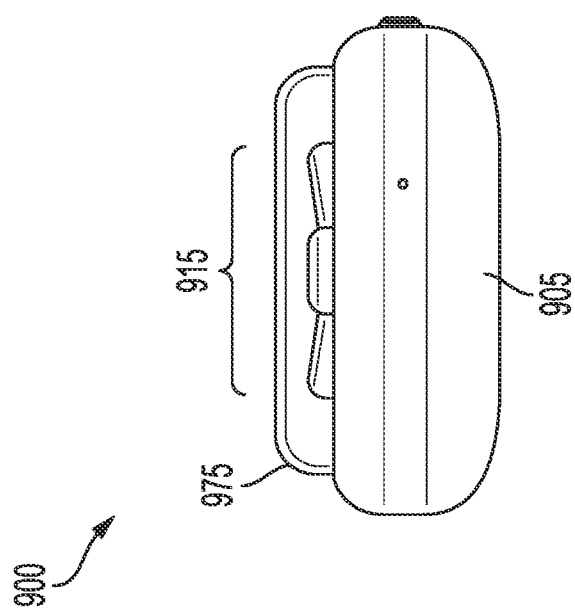
FIG. 11L is an illustration of a left side view of the mobile device controller of FIG. 11A.
Figure 11M:
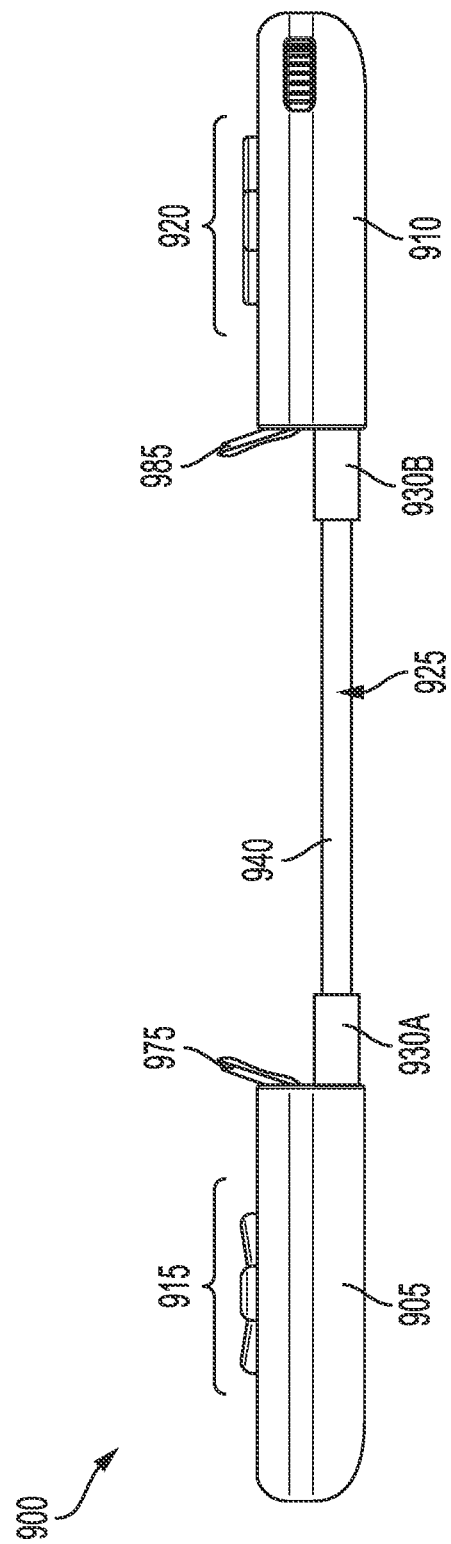
FIG. 11M is an illustration of a front side view of the mobile device controller of FIG. 11A.
Figure 11O:
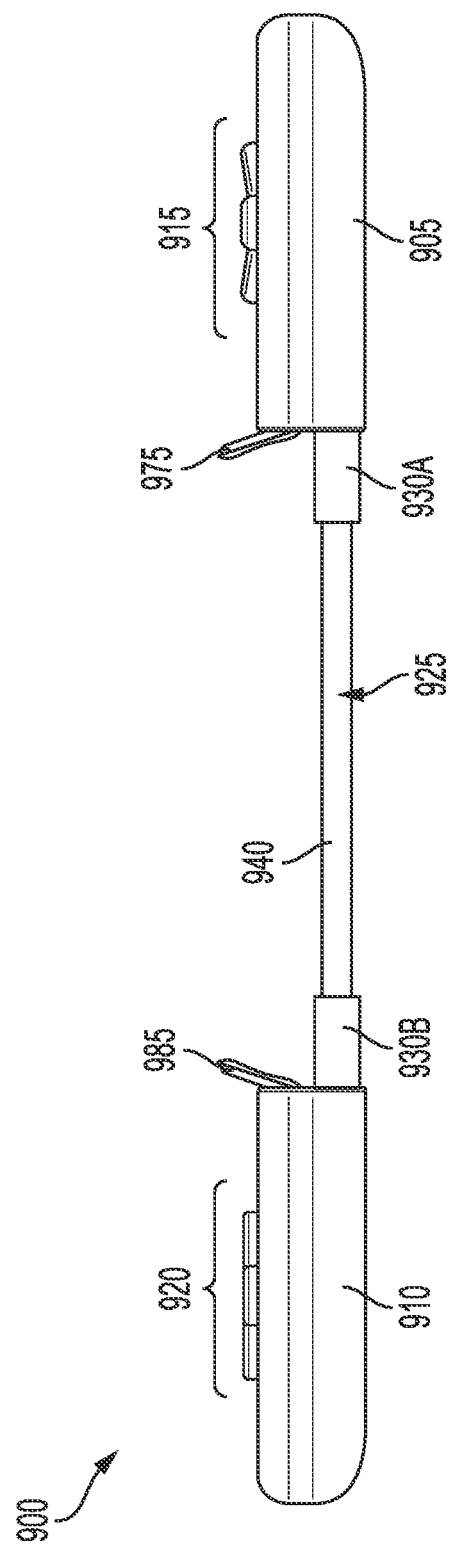
FIG. 11O is an illustration of a back side view of the mobile device controller of FIG. 11A.
Figure 11P:
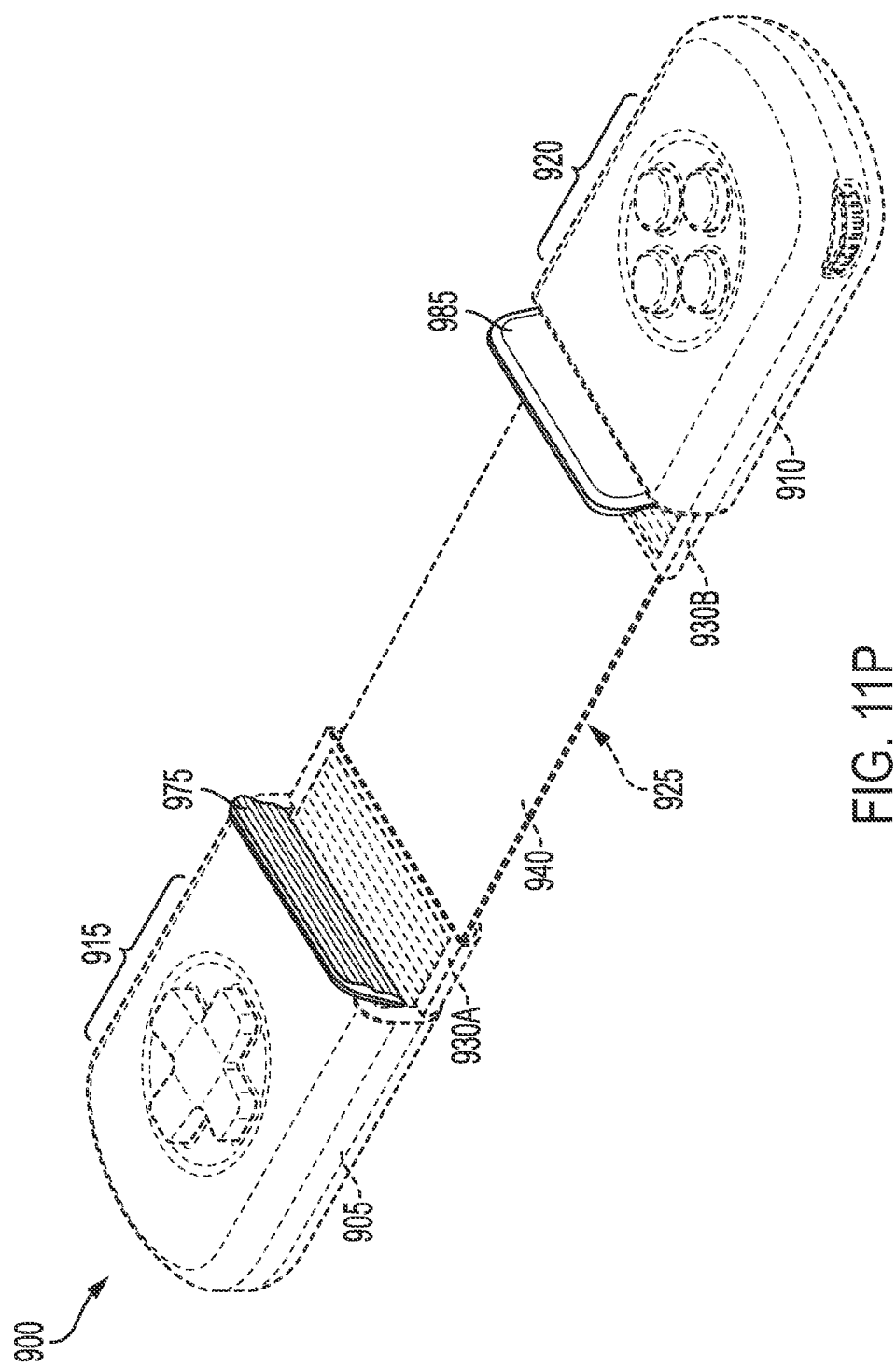
FIG. 11P is an illustration of a front right upper perspective view of the mobile device controller of FIG. 11A.
Figure 11Q:
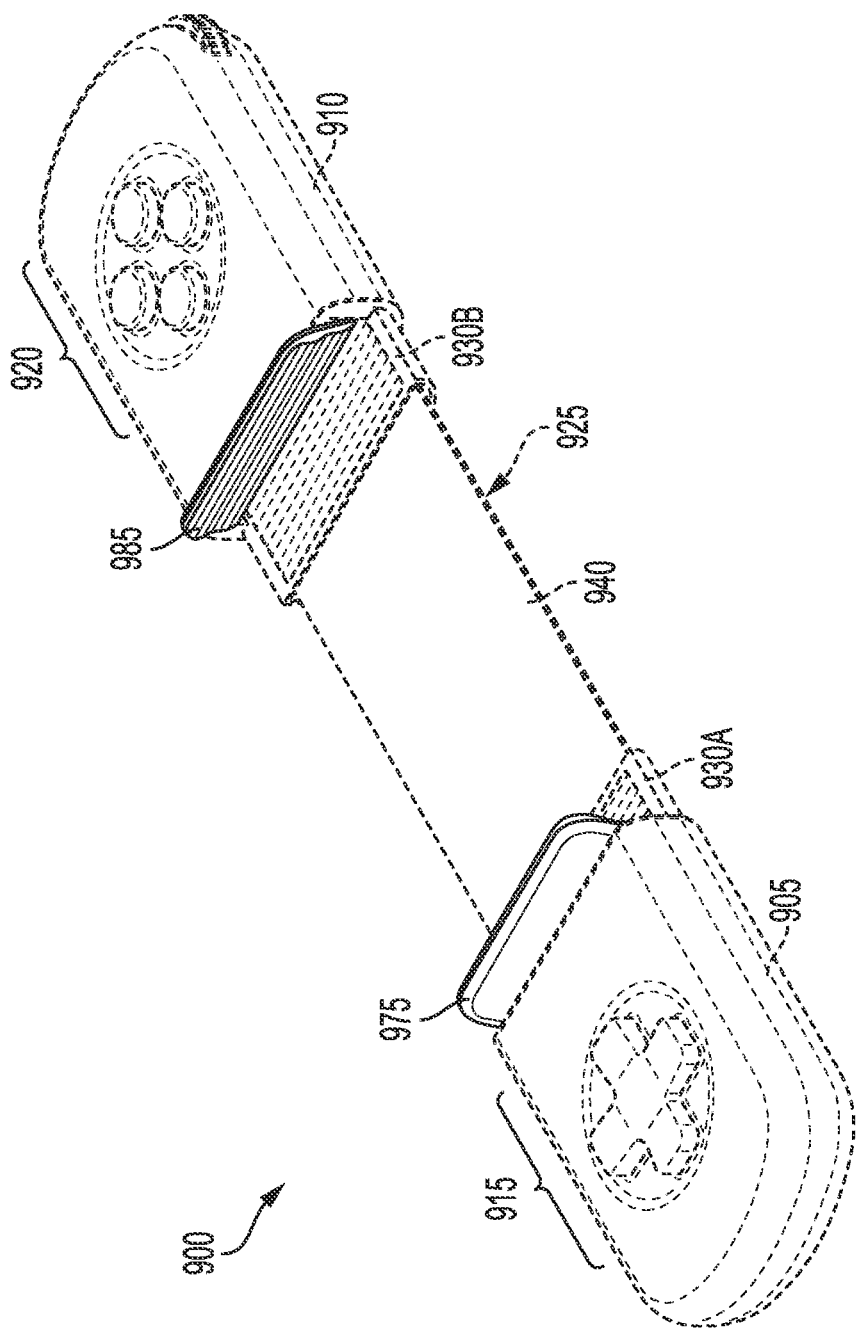
FIG. 11Q is an illustration of a front left upper perspective view of the mobile device controller of FIG. 11A.
Figure 11R:
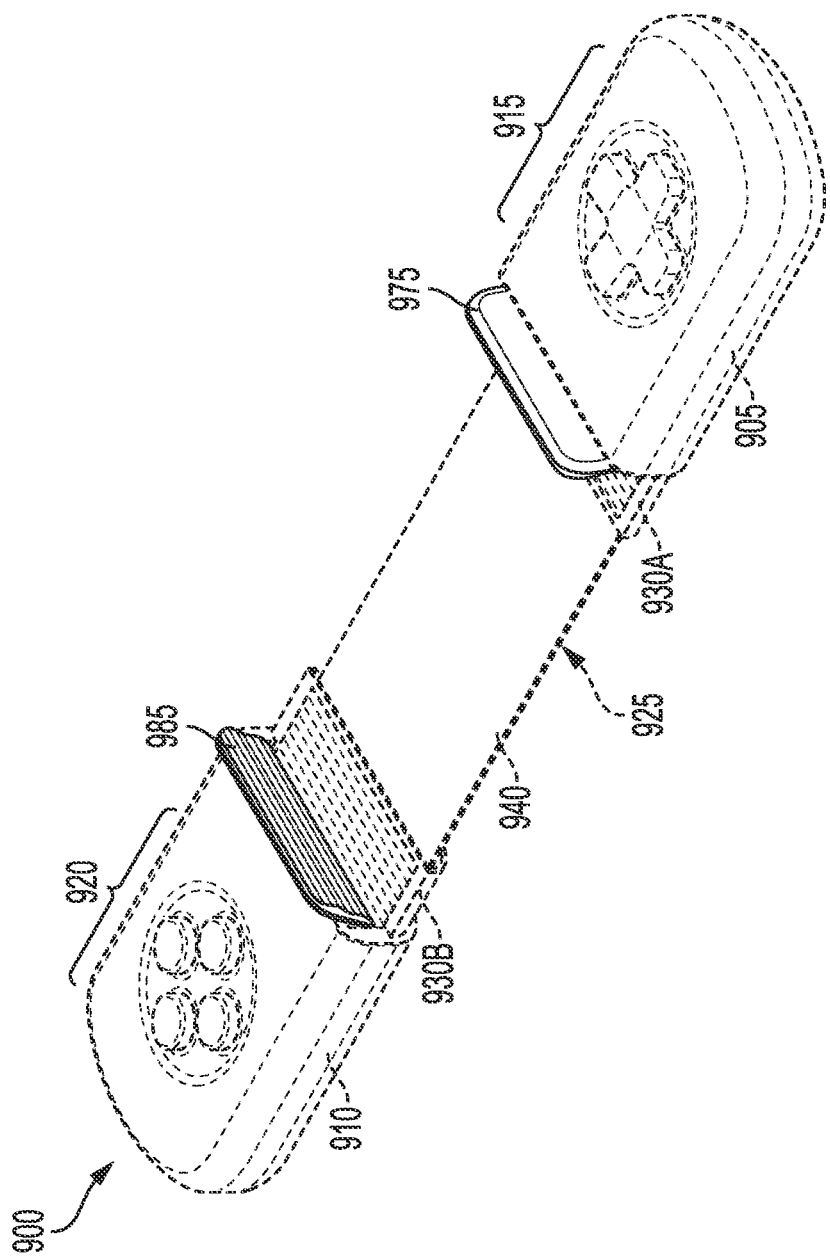
FIG. 11R is an illustration of a back left upper perspective view of the mobile device controller of FIG. 11A.
Figure 11S:
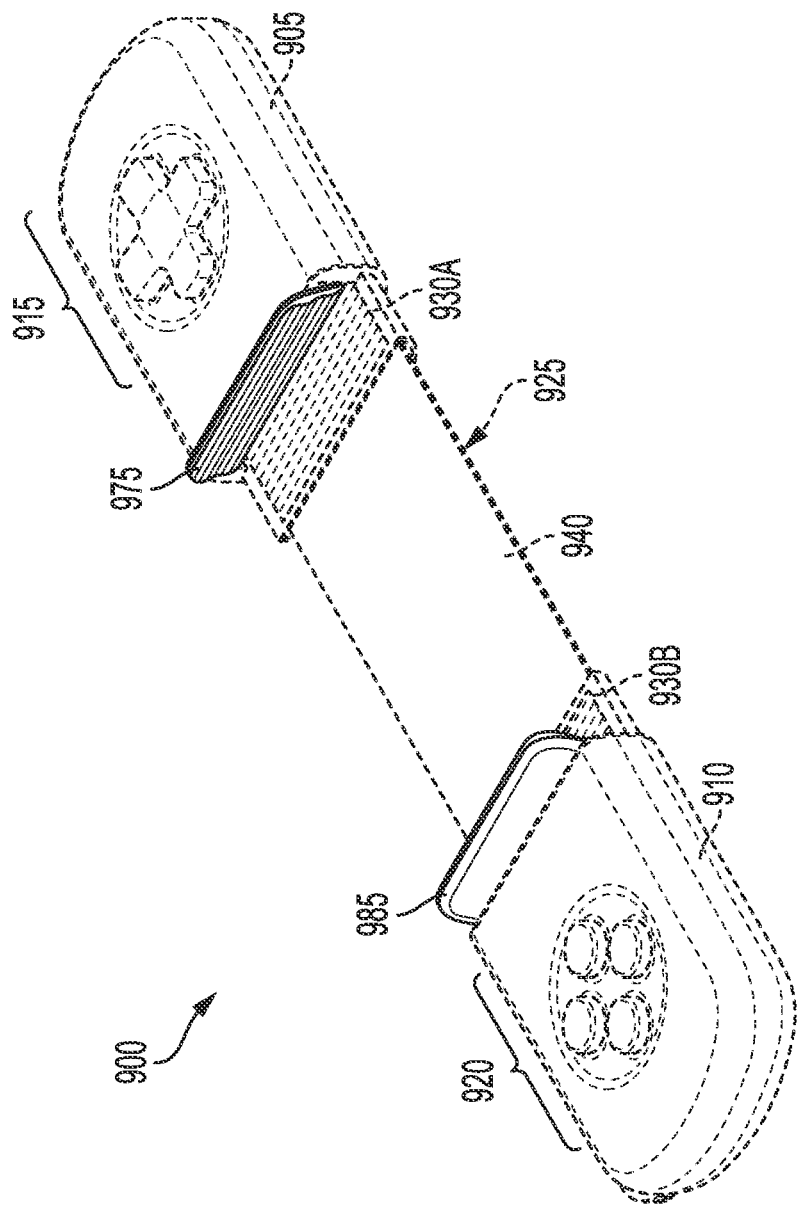
FIG. 11S is an illustration of a back right upper perspective view of the mobile device controller of FIG. 11A.
Figure 11T:
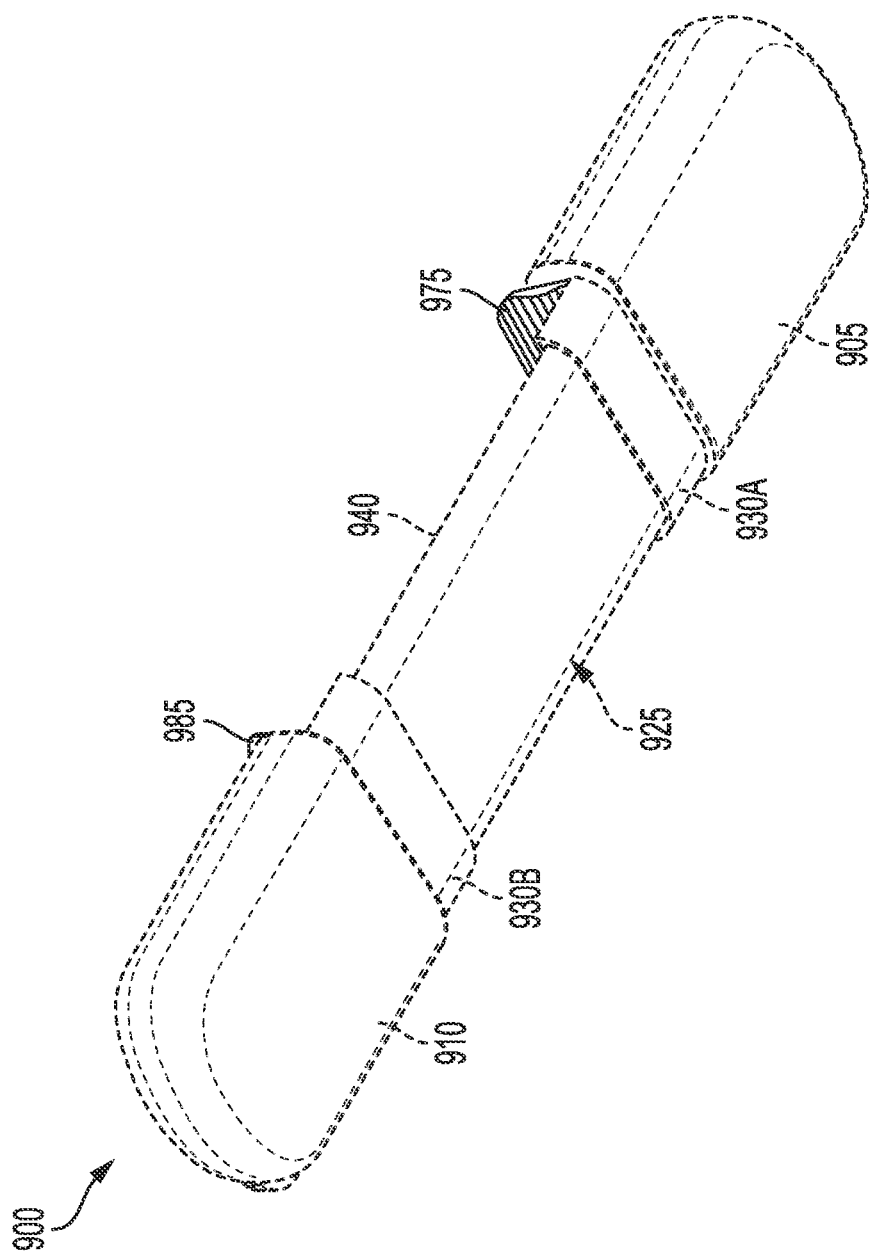
FIG. 11T is an illustration of a back right lower perspective view of the mobile device controller of FIG. 11A.
Figure 11U:
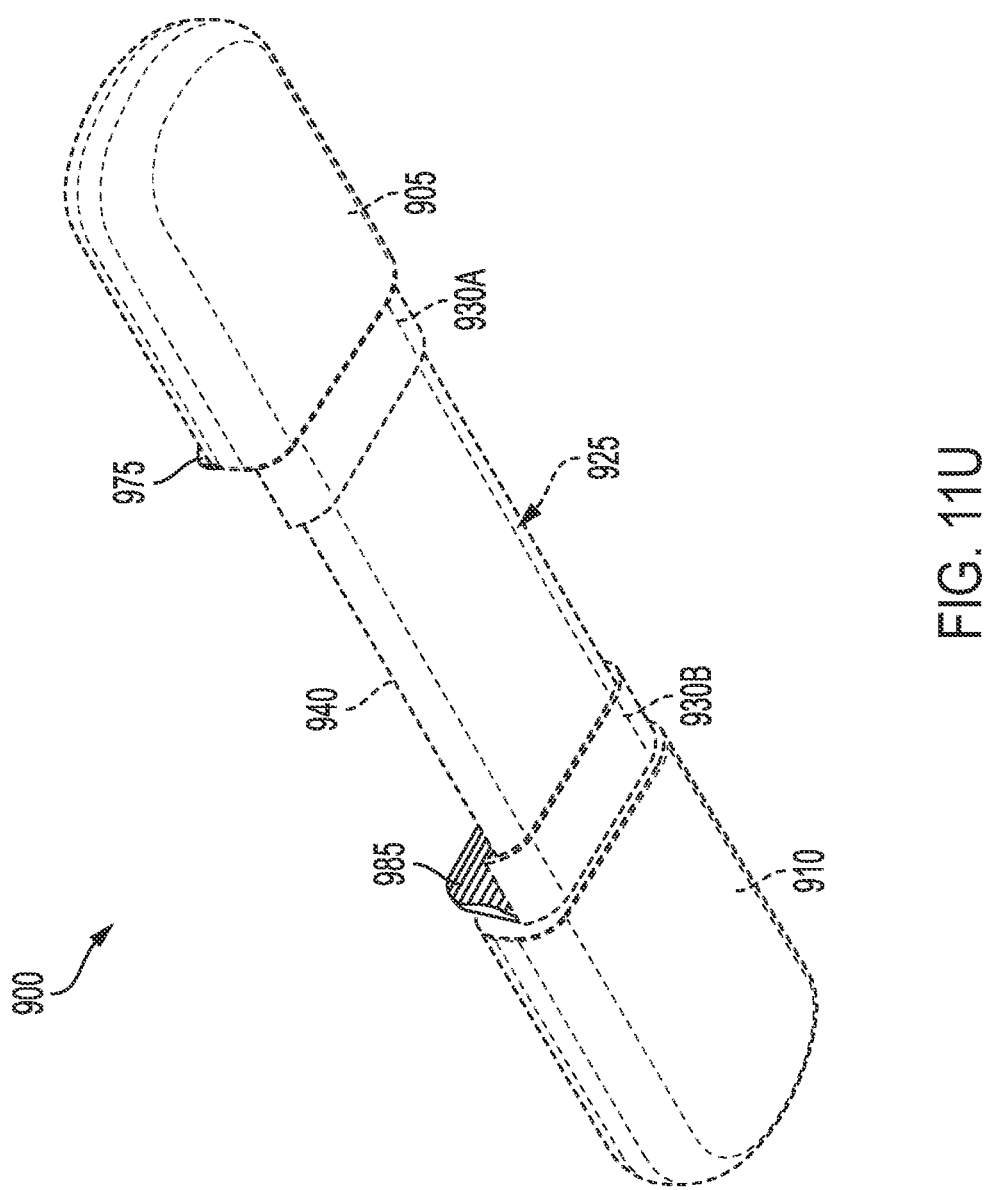
FIG. 11U is an illustration of a back left lower perspective view of the mobile device controller of FIG. 11A.
Figure 11V:
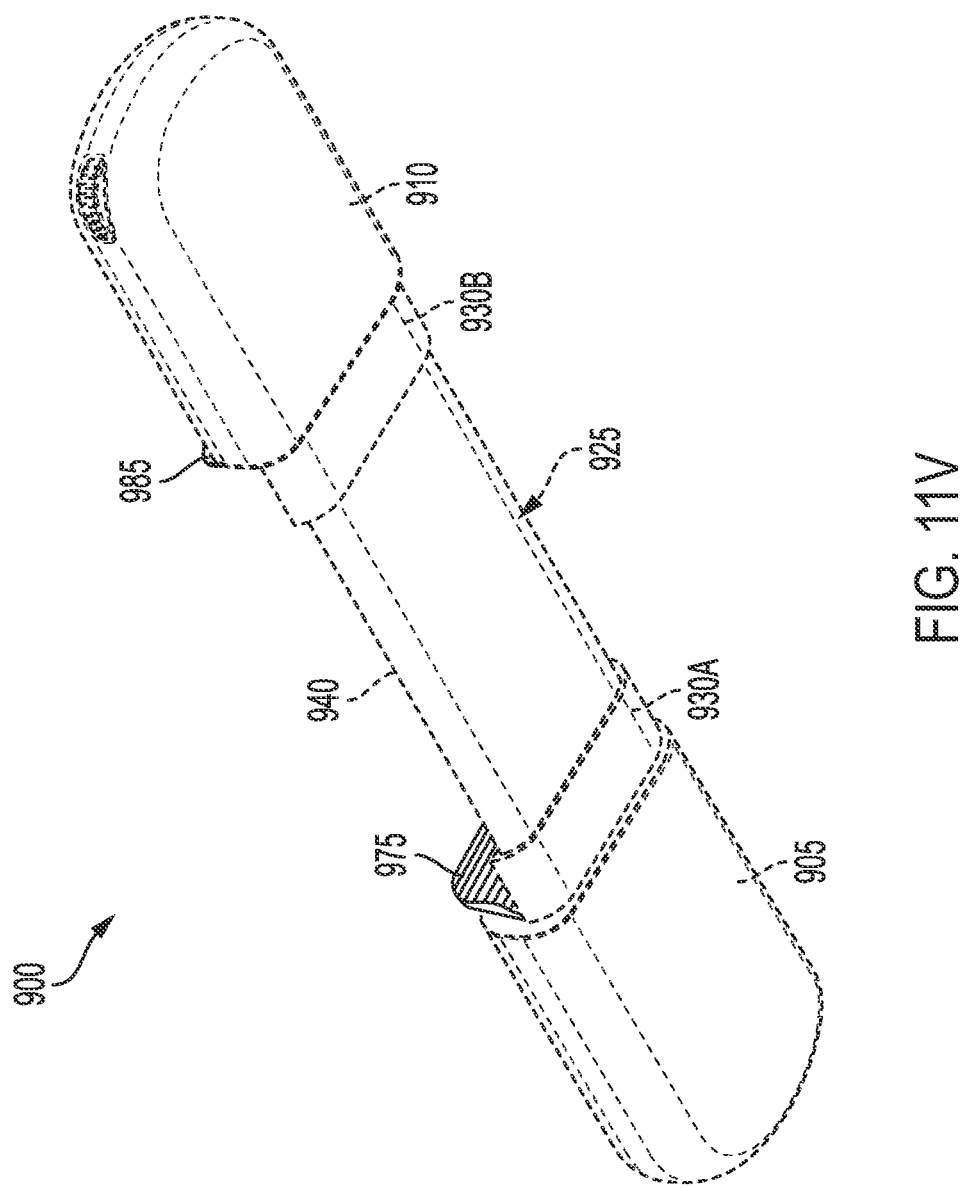
FIG. 11V is an illustration of a front right lower perspective view of the mobile device controller of FIG. 11A.
Figure 11W:
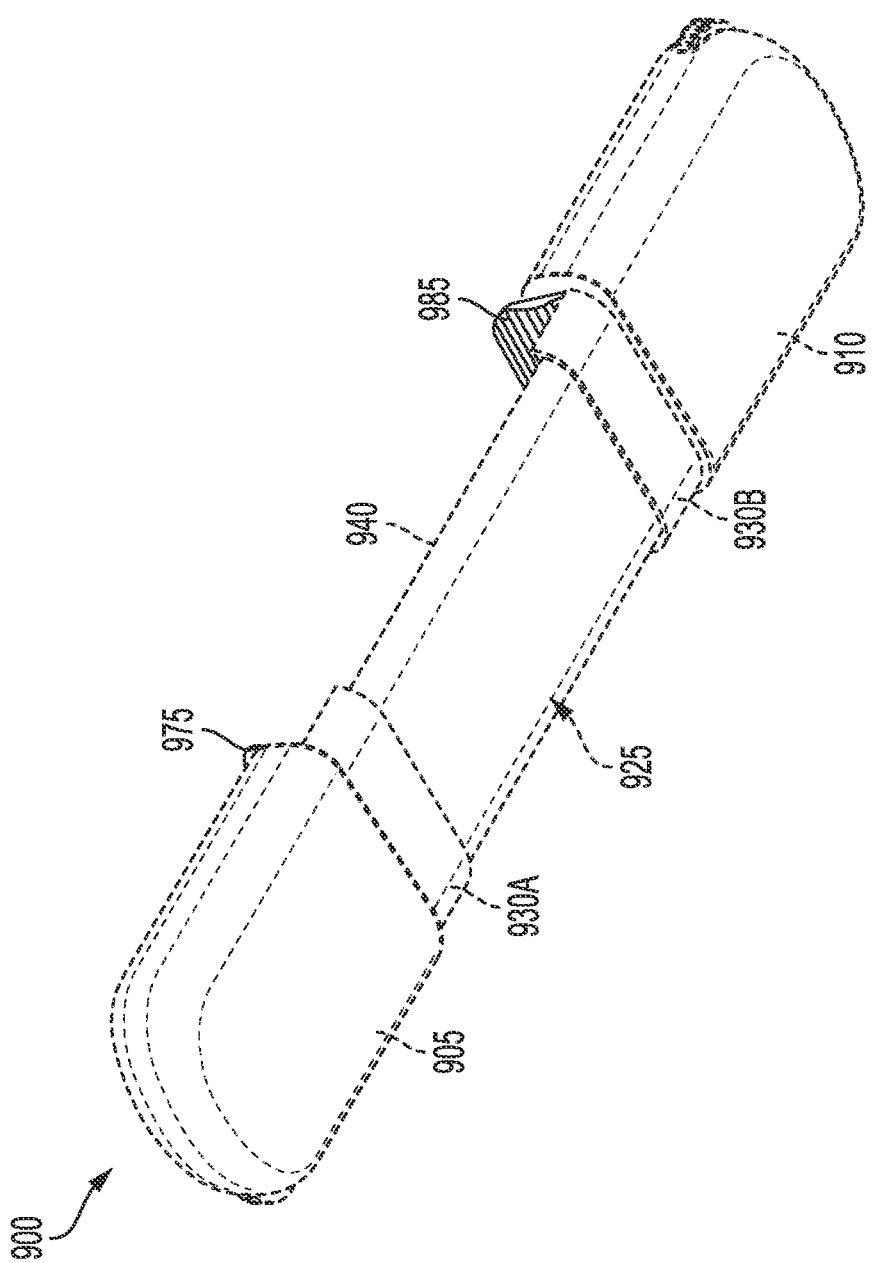
FIG. 11W is an illustration of a front left lower perspective view of the mobile device controller of FIG. 11A.
Figure 11X:
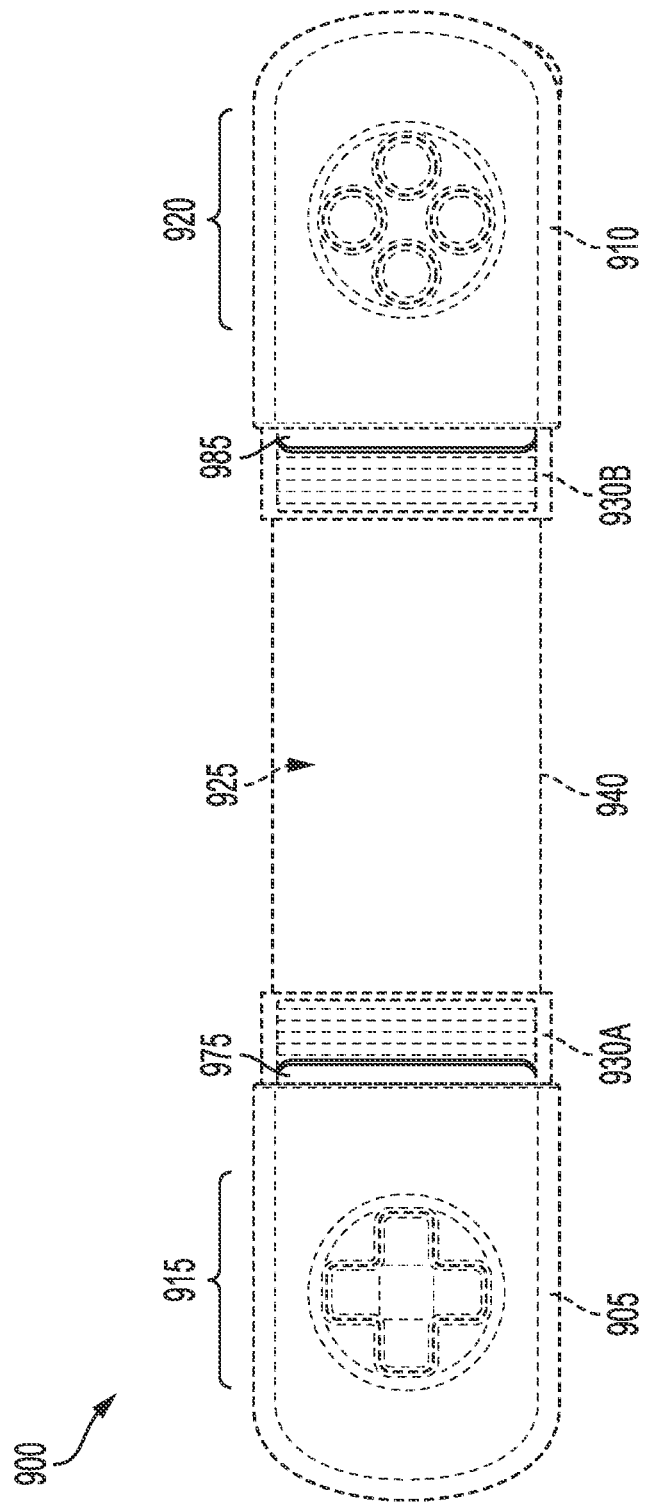
FIG. 11X is an illustration of a top side view of the mobile device controller of FIG. 11A.
Figure 11Y:
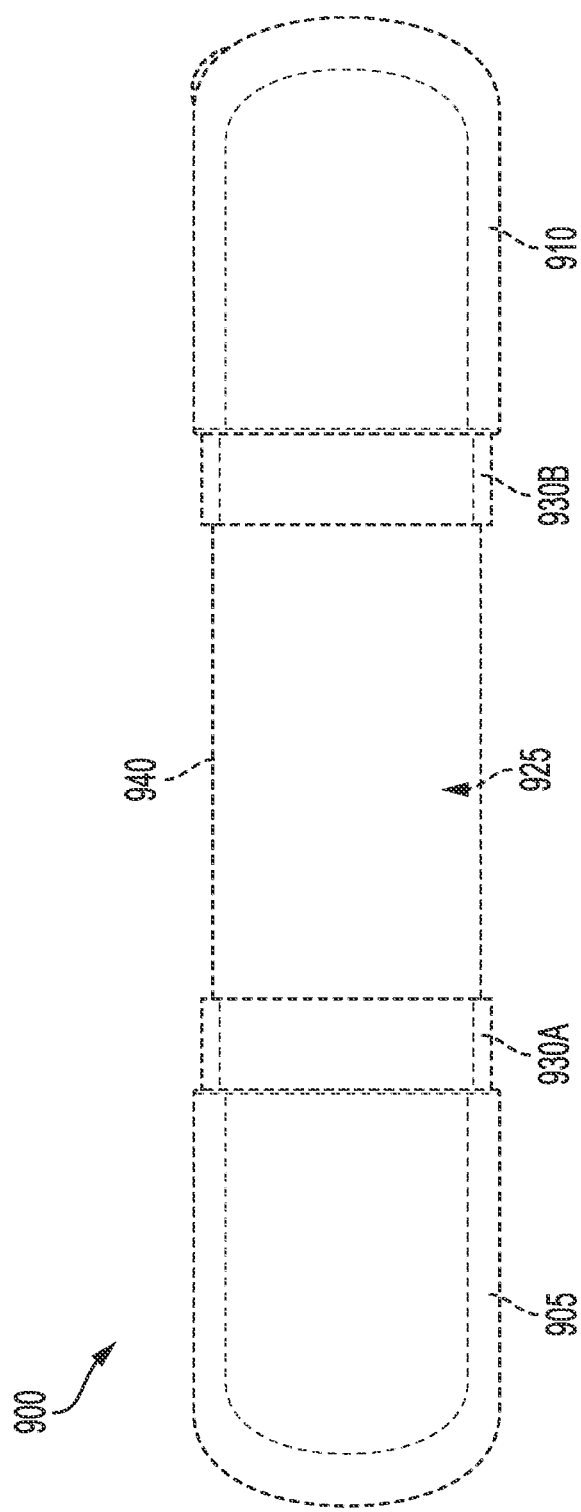
FIG. 11Y is an illustration of a bottom side view of the mobile device controller of FIG. 11A.
Figure 11Z:
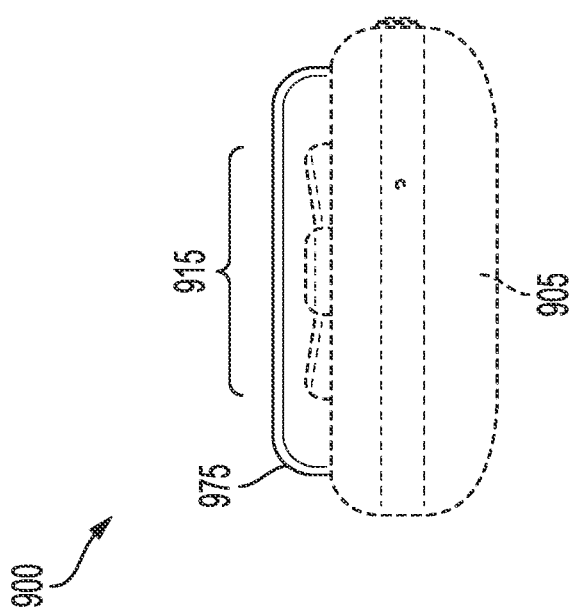
FIG. 11Z is an illustration of a left side view of the mobile device controller of FIG. 11A.
Figure 11A:
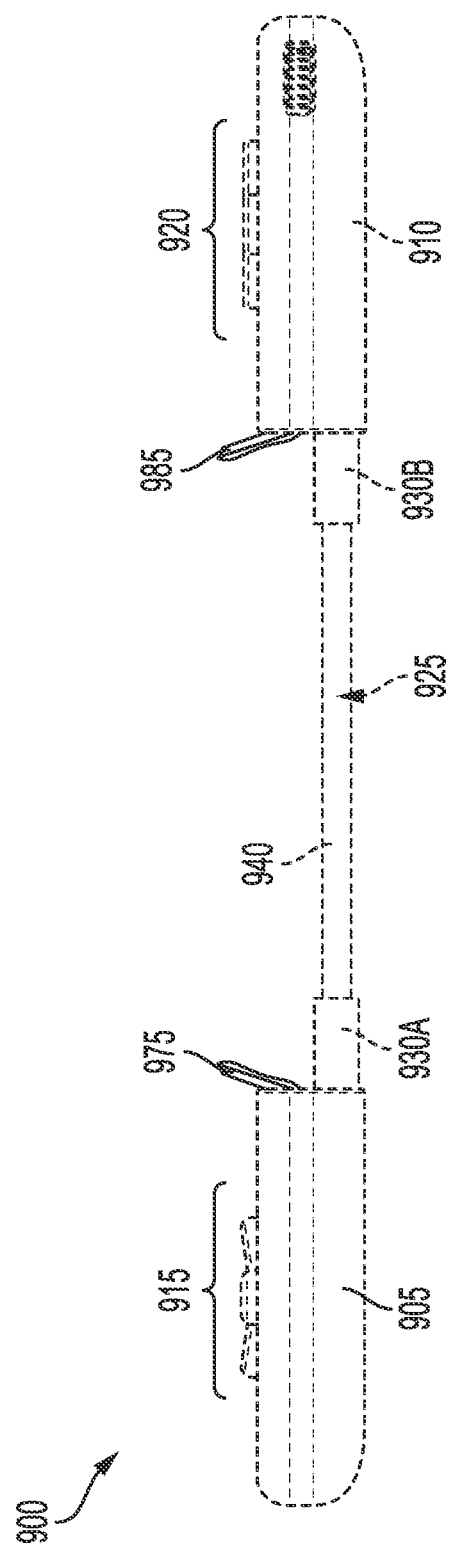
Figure 11A:
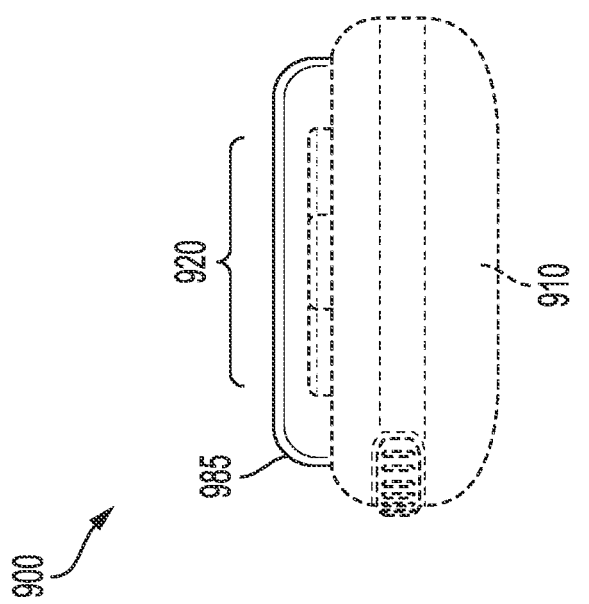
Figure 11A:
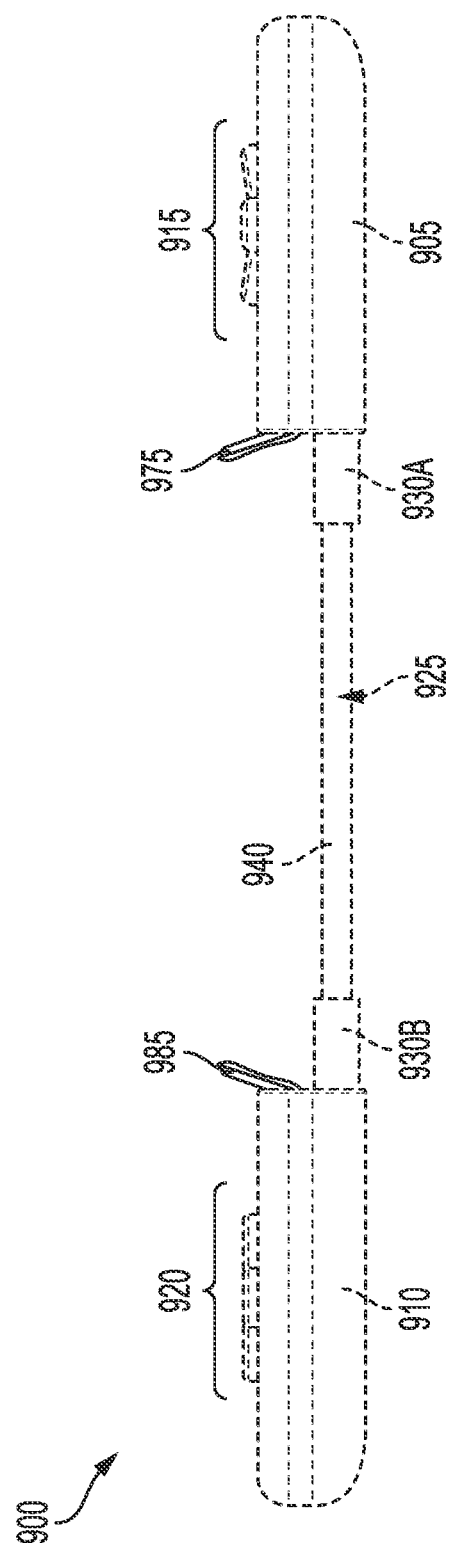

FIGS. 11A-11AC are illustrations of multiple views of the mobile device controller 900 in a fully expanded configuration. In FIGS. 11A-11AC, the first and second controller modules 905 and 910 have been fully expanded laterally. Consequently, the first and second outer expansion portions 930A and 930B of the expandable bridge structure 925 have been extended out of the casings of the first and second controller modules 905 and 910, respectively. The inner expansion portion 940 of the expandable bridge structure

925 has also been exposed. In some implementations of the present invention, the expandable bridge structure 925 can include an inductive charging array with a magnetic alignment feature or other suitable electronic circuitry. In an embodiment, the inductive charging array can be arranged in a first surface 1105 of the inner expansion portion 940 that will engage with or otherwise be in contact with or close to the back side of the mobile device. Additionally, the first and second flapper hinges 975 and 985 are fully open and upright and extend substantially perpendicular to the expandable bridge structure 925. In such a fully expanded configuration, a mobile device is ready to be loaded or otherwise inserted into the mobile device controller 900. The mobile device controller 900 can then be contracted to engage with and firmly hold opposing sides of the mobile device in a form-fitting configuration. In this way, the mobile device controller 900 can adapt to mobile devices of different sizes and in different orientations.

Figure 12:
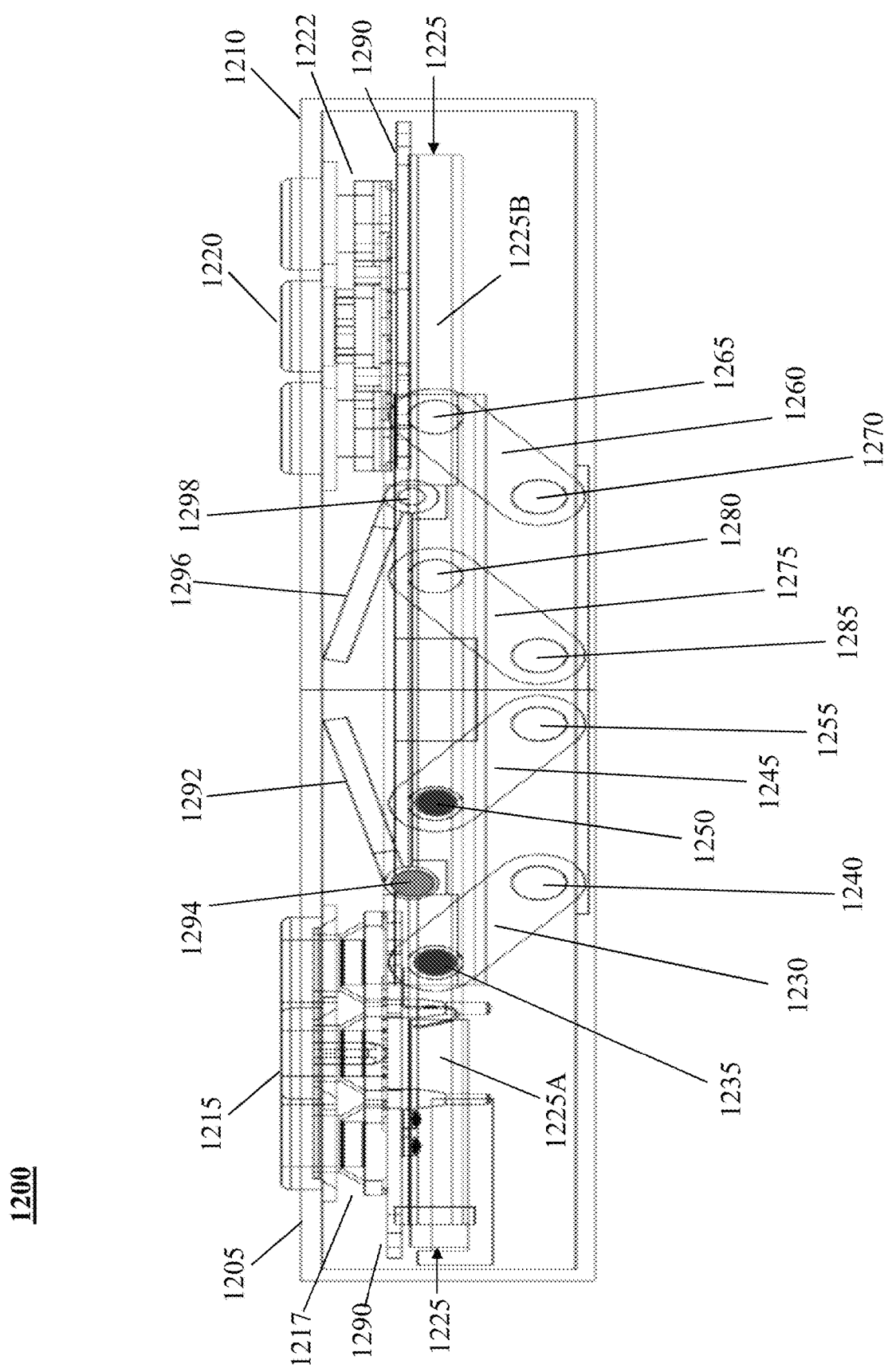
FIG. 12 is an illustration of a side view of an alternative mobile device controller in a closed or collapsed configuration for interacting with client applications.

FIG. 12 is an illustration of a side view of an alternative mobile device controller 1200 in a closed or collapsed configuration for interacting with client applications. The mobile device controller 1200 can be form-fitting to a mobile device and provide the physical inputs that allow the user to control, interact or otherwise engage with client applications executing on the mobile device. In some implementations of the present invention, the mobile device controller 1200 can comprise a multi-bar expansion mechanism for use with mobile devices. For purposes of illustration and not limitation, FIG. 12 illustrates a four-bar expansion mechanism (i.e., four pairs of swing bars, each pair located on opposing inner sides of the casing, for total of eight swing bars) for the mobile device controller 1200, although less than or greater than a four-bar configuration can be used. The mobile device controller 1200 can include a first controller module 1205 (e.g., a left-hand controller) and a second controller module 1210 (e.g., a right-hand controller). The first and second controller modules 1205 and 1210 can be split so that they can be positioned on opposing sides (e.g., left and right or top and bottom, but not front and back) of the mobile device. Although illustrated as having approximately equivalent size, the first and second controller modules 1205 and 1210 can be of similar or different sizes, depending on the desired configuration. The first controller module 1205 can include a first button layout 1215 on a first (e.g., upper) surface of the first controller module 1205. For example, the first button layout 1215 can include any suitable number of button or arrow keys in any appropriate configuration (e.g., buttons for A, B, X, Y, and/or arrows for up, down, left, right, or the like). The second controller module 1210 can include a second button layout 1220 on a second (e.g., upper) surface of the second controller module 1210. For example, the second button layout 1220 can include any suitable number of buttons or keys in any appropriate configuration (e.g., buttons for A, B, X, Y, and/or arrows for up, down, left, right, or the like). The first and second controller modules 1205 and 1210 can each include or otherwise support any suitable button and/or key layout. For example, the button layouts can be similar to game consoles, such as with two analog sticks, a D-pad, four right-side input buttons, four shoulder buttons and two triggers. The first and second controller modules 1205 and 1210 can additionally or alternatively include menu, function, and backside paddle inputs, although other combinations of buttons, triggers, paddles, joysticks, and the like are possible.

In an embodiment, the mobile device controller 1200 can include an extendible bridge structure 1225 that can reside between and within the first and second controller modules 1205 and 1210. The extendible bridge structure 1225 can include two separate sections or portions—a first extendible portion 1225A residing within the first controller module 1205 and a second extendible portion 1225B residing within the second controller module 1210. The first extendible portion 1225A includes a pair of first swing arms 1230 (each located on opposing sides of the first extendible portion 1225A). The pair of first swing arms 1230 can be coupled to the first extendible portion 1225A via a pair of first pivot joints 1235 (each located on opposing sides of the first extendible portion 1225A) that allow an upper portion of the pair of first swing arms 1230 to rotate about an axis. The first extendible portion 1225A can be coupled to the inner casing of the first controller module 1205 through the pair of first swing arms 1230 via a pair of second pivot joints 1240 (each located on opposing sides of the first extendible portion 1225A) that allow a lower portion of the pair of first swing arms 1230 to rotate about an axis. The first extendible portion 1225A includes a pair of second swing arms 1245 (each located on opposing sides of the first extendible portion 1225A). The pair of second swing arms 1245 can be coupled to the first extendible portion 1225A via a pair of third pivot joints 1250 (each located on opposing sides of the first extendible portion 1225A) that allow an upper portion of the pair of second swing arms 1245 to rotate about an axis. The first extendible portion 1225A can be further coupled to the inner casing of the first controller module 1205 through the pair of second swing arms 1245 via a pair of fourth pivot joints 1255 (each located on opposing sides of the first extendible portion 1225A) that allow a lower portion of the pair of second swing arms 1245 to rotate about an axis.

In an embodiment, the second extendible portion 1225B includes a pair of third swing arms 1260 (each located on opposing sides of the second extendible portion 1225B). The pair of third swing arms 1260 can be coupled to the second extendible portion 1225B via a pair of fifth pivot joints 1265 (each located on opposing sides of the second extendible portion 1225B) that allow an upper portion of the pair of third swing arms 1260 to rotate about an axis. The second extendible portion 1225B can be coupled to the inner casing of the second controller module 1210 through the pair of third swing arms 1260 via a pair of sixth pivot joints 1270 (each located on opposing sides of the second extendible portion 1225B) that allow a lower portion of the pair of third swing arms 1260 to rotate about an axis. The second extendible portion 1225B includes a pair of fourth swing arms 1275 (each located on opposing sides of the second extendible portion 1225B). The pair of fourth swing arms 1275 can be coupled to the second extendible portion 1225B via a pair of seventh pivot joints 1280 (each located on opposing sides of the second extendible portion 1225B) that allow an upper portion of the pair of fourth swing arms 1275 to rotate about an axis. The second extendible portion 1225B can be further coupled to the inner casing of the second controller module 1210 through the pair of fourth swing arms 1275 via a pair of eighth pivot joints 1285 (each located on opposing sides of the second extendible portion 1225B) that allow a lower portion of the pair of fourth swing arms 1275 to rotate about an axis.

In an embodiment, the first and second extendible portions 1225A and 1225B of the extendible bridge structure 1225 can be coupled via or otherwise mounted on a pair of guide rails 1290 (although one or more than two guide rails 1290 can be used) that can extend through and within the first and second extendible portions 1225A and 1225B. In some implementations of the present invention, the pair of guide rails 1290 is not directly coupled to either the first or second controller modules 1205 and 1210, which can allow the extendible bridge structure 1225 to swing freely within the casing of the mobile device controller 1200 (via the respective swing arms) as the first and second controller modules 1205 and 1210 are extended apart. In an embodiment, one or both of the pair of guide rails 1290 can comprise a rigid or semi-rigid hollow structure (e.g., tubes). A suitable elastic structure (e.g., springs or the like) can reside either internally or externally along the length (full or partial) of one or both of the pair of guide rails 1290. In an alternative embodiment, one or both of the pair of guide rails 1290 can comprise a rigid or semi-rigid solid structure. A suitable elastic structure (e.g., springs or the like) can reside externally along the length (full or partial) of one or both of the pair of guide rails 1290. For example, a suitable elastic structure can reside externally around and be anchored to respective end portions of the pair of guide rails 1290, with the other ends of the suitable elastic structure anchored or otherwise attached to respective ends of the first and second extendible portions 1225A and 1225B. Alternatively, one or both of the pair of guide rails 1290 itself can comprise a suitable elastic structure (e.g., springs or the like). In each of the aforementioned embodiments, the first and second extendible portions 1225A and 1225B can be mounted along the pair of guide rails 1290 and be coupled to the suitable elastic structure. The suitable elastic structure can allow the first and second controller modules 1205 and 1210 to be pulled apart or extended laterally, wrapped around the back side of the mobile device, and then contracted to engage with and firmly hold opposing sides of the mobile device in a form-fitting configuration. In such a configuration, the extendible bridge structure 1225 can engage with a back side of the mobile device. In this way, the mobile device controller 1200 can adapt to mobile devices of different sizes and in different orientations.

In some implementations of the present invention, the mobile device controller 1200 can include a pair of flappers for grasping and holding mobile devices and which allow the mobile device controller 1200 to be a more compact size and a thinner design. For example, the flappers can reside within the body of the mobile device controller 1200 and be preloaded to allow them to automatically raise when the first and second controller modules 1205 and 1210 are extended apart and automatically retract and lower back into the body when the first and second controller modules 1205 and 1210 are contracted back together. According to an embodiment of the present invention, the first controller module 1205 can include a first flapper hinge 1292 for engaging a first side of a mobile device. The first flapper hinge 1292 can be of any appropriate width between opposing sides of the first extendible portion 1225A and any appropriate height and thickness, depending on, for example, the thickness of mobile devices to be grasped, the desired amount of extension outside of the first controller module 1205 when in the fully engaged position, and the like. The first flapper hinge 1292 can be coupled to the first extendible portion 1225A via a pair of first pivot joints 1294 (each located on opposing sides of the first extendible portion 1225A) to allow the first flapper hinge 1292 to rotate. In an embodiment, one or both of the pair of first pivot joints 1294 can comprise a spring-loaded configuration to allow the first flapper hinge 1292 to raise as the first controller module 1205 is extended laterally and to lower as the first controller module 1205 is contracted laterally. The second controller module 1210 can include a second flapper hinge 1296 for engaging a second side of a mobile device. The second flapper hinge 1296 can be of any appropriate width between opposing sides of the second extendible portion 1225B and any appropriate height and thickness, depending on, for example, the thickness of mobile devices to be grasped, the desired amount of extension outside of the second controller module 1210 when in the fully engaged position, and the like. In an embodiment, the first flapper hinge 1292 and the second flapper hinge 1296 can be similar or identical in size and shape. In an alternative embodiment, the first flapper hinge 1292 and the second flapper hinge 1296 can each be a different size and shape. The second flapper hinge 1296 can be coupled to the second extendible portion 1225B via a pair of second pivot joints 1298 (each located on opposing sides of the second extendible portion 1225B) to allow the second flapper hinge 1296 to rotate. In an embodiment, either or both of the pair of second pivot joints 1298 can comprise a spring-loaded configuration to allow the second flapper hinge 1296 to raise as the second controller module 910 is extended laterally and to lower as the second controller module 910 is contracted laterally.

The first and second controller modules 1205 and 1210 can include suitable electronic components (e.g., first electronic components 1217 in first controller module 1205 and/or second electronic components 1222 in second controller module 1210) to support wireless communication with at least the mobile device and control of the client application executing on the mobile device through the physical inputs provided by the user when interacting with first and second button layouts 1215 and 1220. In such a configuration, either or both of the first and second controller modules 1205 and 1210 can include battery components to provide power for the mobile device controller 1200. For example, if one of the first and second controller modules 1205 and 1210 includes a battery component, the controller module with the battery component can supply power to the other controller module through a power communication channel that can run within and through the extendible bridge structure 1225 (e.g., through either or both of the pair of guide rails 1290). Additionally or alternatively, the extendible bridge structure 1225 can include suitable electronic and/or power components to support some or all of such functionality. In some implementations of the present invention, the extendible bridge structure 1225 can include an inductive charging array with a magnetic alignment feature (e.g., MagSafe or the like or other suitable electronic circuitry). For example, such an inductive charging array or other suitable electronic circuitry can reside in either or both of the first and second extendible portions 1225A and 1225B. The extendible bridge structure 1225 can expand and contract from a center or middle of the mobile device controller 1200 (or approximately therefrom) so that the inductive charging array (e.g., each half of the inductive charging array from the first and second extendible portions 1225A and 1225B) of the mobile device controller 1200 can be maintained at, near or around a center of the mobile device controller 1200. Such a centering action can be used to maintain alignment between the mobile device controller 1200 and the mobile device, regardless of model and orientation. Such an inductive charging array (or other suitable electronic circuitry) can also be used to support additional setup and playability features and functionality that are similar or identical to that described above with respect to the inductive charging array integrated into the adjustable bridge structure 125 of mobile device controller 100 of FIG. 1. In an embodiment, the first and second controller modules 1205 and 1210 can communicate with each other via a wired communication channel. For example, a wired communication channel can run within and through the extendible bridge structure 1225 (e.g., via one or both of the pair of guide rails 1290) to allow communication between the first and second controller modules 1205 and 1210. In an alternative embodiment, the first and second controller modules 1205 and 1210 can include appropriate electronic components to support communication with each other using any suitable wireless communication protocol (e.g., Bluetooth, Wi-Fi, NFC, or the like). Either or both of the first and second controller modules 1205 and 1210 can include suitable electronic components to support wireless communication with the mobile device using any appropriate wireless communication protocol (e.g., Bluetooth, Wi-Fi, NFC, etc.). For example, the first and second controller modules 1205 and 1210 can communicate wirelessly with each other and the mobile device.

Figure 13:
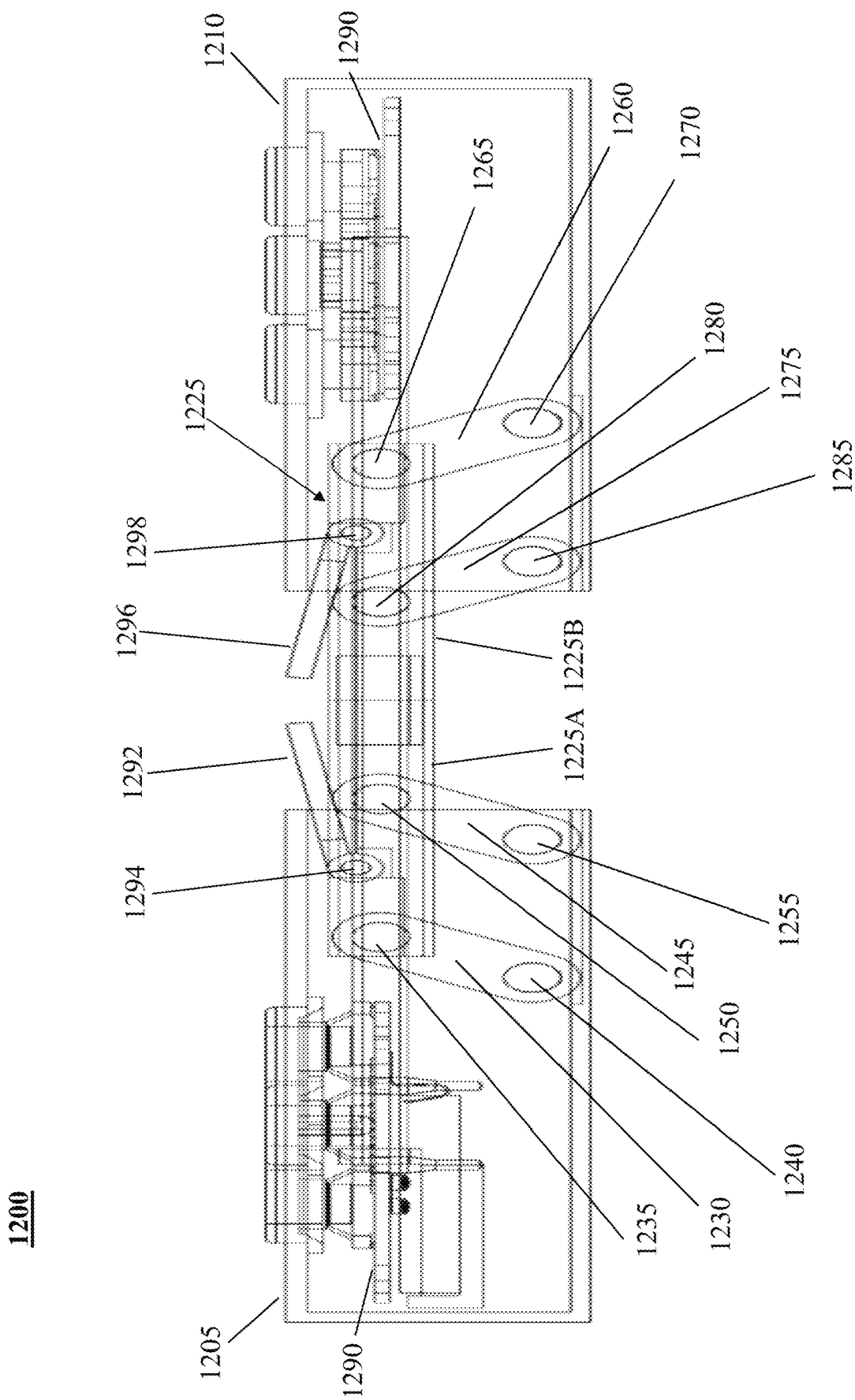
FIG. 13 is an illustration of an alternative mobile device controller in a partially extended configuration.

FIG. 13 is an illustration of the mobile device controller 1200 in a partially extended configuration. In FIG. 13, the first and second controller modules 1205 and 1210 have been extended laterally from each other, partially exposing the first and second extendible portions 1225A and 1225B of the extendible bridge structure 1225. As the user pulls apart the first and second controller modules 1205 and 1210, the first and second extendible portions 1225A and 1225B begin extending out of the casings of the first and second controller modules 1205 and 1210 along the pair of guide rails 1290. The first extendible portion 1225A extends by rotating or swinging via the pairs of first and second swing arms 1230 and 1245 (around the respective pairs of first, second, third, and fourth pivot joints 1235, 1240, 1250, and 1255) along the pair of guide rails 1290. The second extendible portion 1225B extends by rotating or swinging via the pairs of third and fourth swing arms 1260 and 1275 (around respective pairs of fifth, sixth, seventh, and eighth pivot joints 1265, 1270, 1280, and 1285) along the pair of guide rails 1290. Additionally, the first and second flapper hinges 1292 and 1296 have been exposed and partially raised. As discussed above, the first and second flapper hinges 1292 and 1296 can be preloaded to allow them to raise and retract automatically (e.g., using spring-loaded pairs of first and second pivot joints 1294 and 1298).

Figure 14:
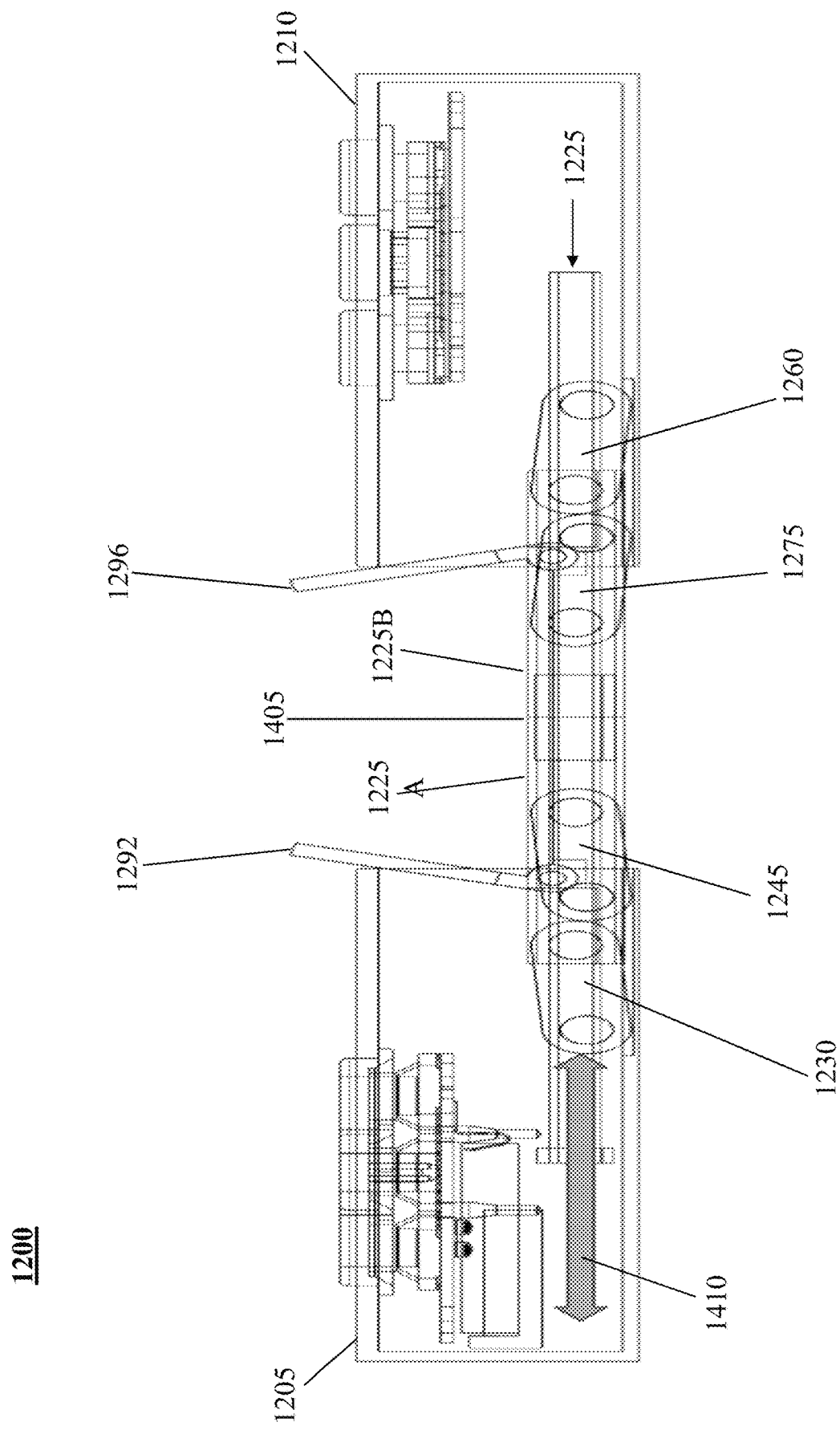
FIG. 14 is an illustration of an alternative mobile device controller in a fully extended configuration.

FIG. 14 is an illustration of the mobile device controller 1200 in a fully extended configuration. In FIG. 14, the first and second controller modules 1205 and 1210 have been fully expanded laterally. Consequently, the first and second extendible portions 1225A and 1225B of the extendible bridge structure 1225 have been extended out of the casings of the first and second controller modules 1205 and 1210, respectively. In some implementations of the present invention, the extendible bridge structure 1225 can include an inductive charging array with a magnetic alignment feature or other suitable electronic circuitry. In an embodiment, the inductive charging array can be arranged in a first surface 1405 of the extendible bridge structure 1225 that will engage with or otherwise be in contact with or close to the back side of the mobile device (e.g., a first portion of the circuitry residing in the first extendible portion 1225A and a second portion of the circuitry residing in the second extendible portion 1225B). An arrow 1410 indicates the location and movement of the extendible bridge structure 1225, which has swung near the bottom of the casing of the mobile device controller 1200 (via the respective pairs of first, second, third, and fourth swing arms 1230, 1245, 1260, and 1275). The first and second flapper hinges 1292 and 1296 are fully open and upright and extend substantially perpendicular to the extendible bridge structure 1225. In such a fully expanded configuration, a mobile device is ready to be loaded or otherwise inserted into the mobile device controller 1200. The mobile device controller 1200 can then be contracted to engage with and firmly hold opposing sides of the mobile device in a form-fitting configuration. In this way, the mobile device controller 1200 can adapt to mobile devices of different sizes and in different orientations.

As discussed above, the mobile device controllers 100, 500, 900, and/or 1200 can include and support any suitable number of buttons and/or keys in any appropriate configuration in the button layouts of the respective controller modules. Different structures and mechanisms can be used for the button layouts to support buttons and/or keys, as well as additional functionality. For example, a directional pad ("D-pad") position sensing mechanism of the present invention can seek to resolve two previously mutually exclusive controller layouts—the conventional D-pad and the analog stick— into a single, unified control mechanism. In embodiments, the same layout can be used on the A-B-X-Y input button side of a mobile device controller, which can allow for a compact layout and dual analog stick inputs on a space previously impossible with conventional layouts. In addition to allowing for more compact packaging of the mobile device controller, such a hybrid analog-button layout can also offer potential for play performance improvements. For example, by placing the analog stick and the buttons on essentially the same surface, such a mechanism can make actuating a button input (such as A-B-X-Y) while maintaining input on the analog "stick" possible.

Figure 15:
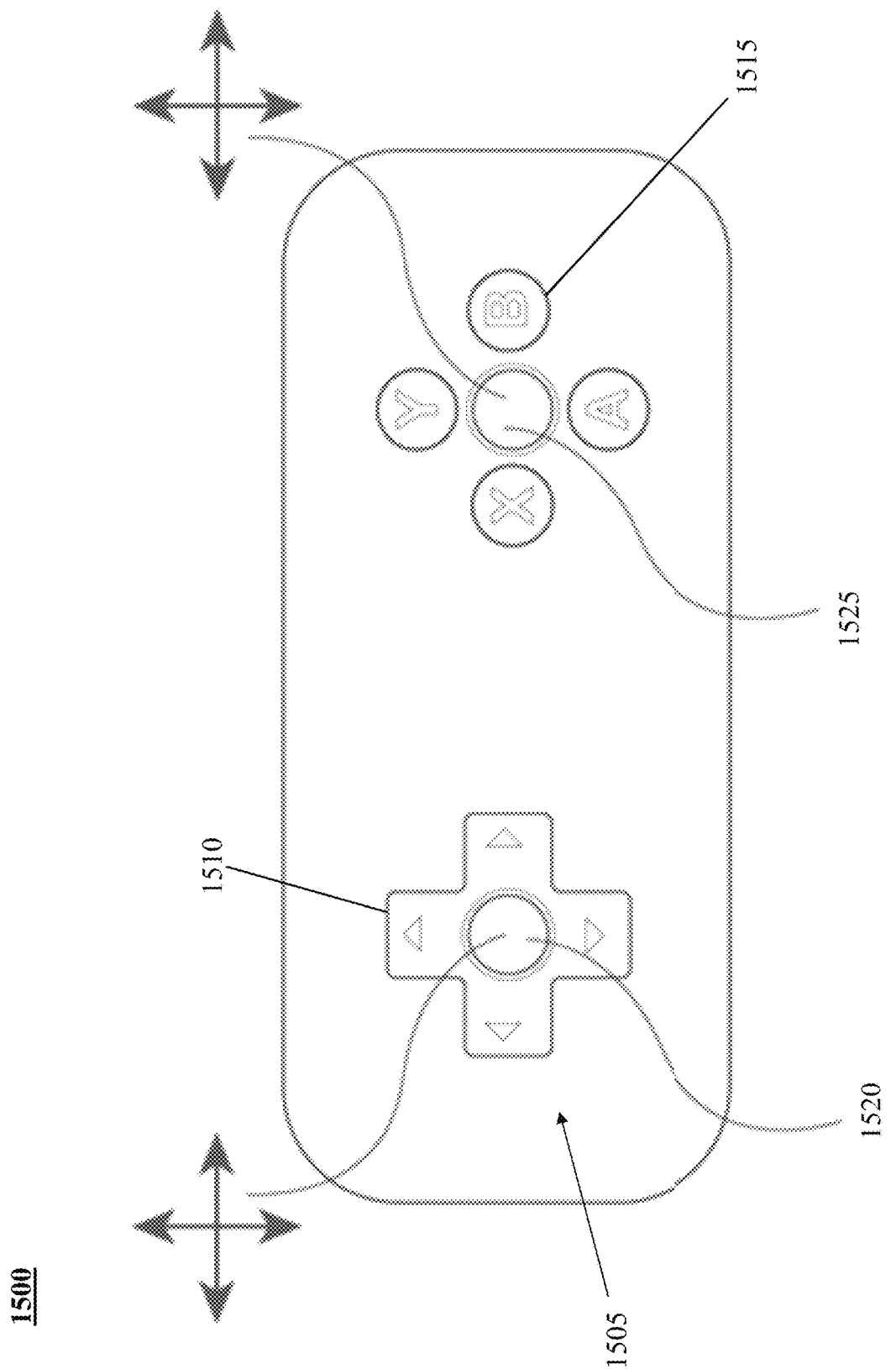
FIG. 15 is an illustration of a translatable directional pad using a pointing stick for a keyboard layout.

FIG. 15 is an illustration of a translatable directional pad using a pointing stick for a keyboard layout, in accordance with an embodiment of the present invention. In FIG. 15, a keypad layout 1500 includes a directional pad 1505 with a set of arrow keys 1510 (e.g., up, down, left, and right). The keypad layout 1500 can also include a set of buttons 1515 (e.g., A, B, X, and Y). The set of arrow keys 1510 can include a first protuberance 1520 with a generally circular configuration that can be located in a center of the set of arrow keys 1510. The set of buttons 1515 can include a second protuberance 1525 with a generally circular configuration that can be located in a center of the set of buttons 1515. In an embodiment, the first and second protuberances 1520 and 1525 can partially extend through the surface to provide suitable input interfaces. In an alternative embodiment, the directional pad 1505 can rest on the first protuberance 1520 instead of a conventional post/ball joint. In such an alternative embodiment, a detent or "grippy" surface can be used for the first protuberance 1520 with which a user can interact. A similar alternative embodiment can be used for the second protuberance 1525 for the set of buttons 1515 to provide a secondary "analog" input for users. In either embodiment, the bezel of the first and second protuberances 1520 and 1525 can act as a translatable input surface to provide additional input control functionality for the user.

Figure 16:
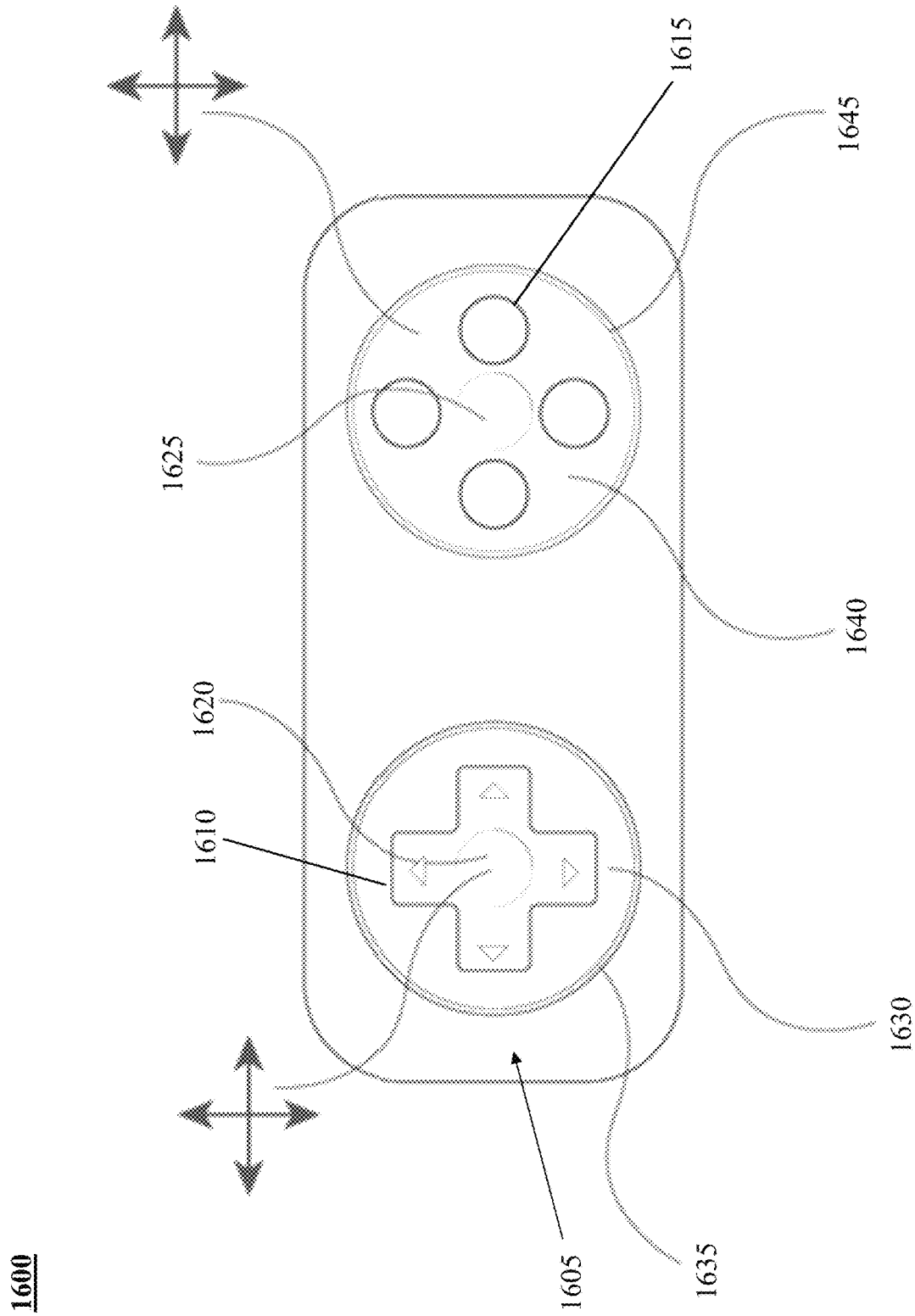
FIG. 16 is an illustration of translatable input surfaces for a keypad layout.

FIG. 16 is an illustration of translatable input surfaces for a keypad layout, in accordance with an embodiment of the present invention. In FIG. 16, a keypad layout 1600 includes a directional pad 1605 with a set of arrow keys 1610 (e.g., up, down, left, and right). The keypad layout 1600 can also include a set of buttons 1615 (e.g., A, B, X, and Y). The set of arrow keys 1610 can include a first detent 1620 with a generally circular configuration that can be located in a center of the set of arrow keys 1610. The set of buttons 1615 can include a second detent 1625 with a generally circular configuration that can be located in a center of the set of buttons 1615. In an embodiment, the set of arrow keys 1610 of the directional pad 1605 can be mounted on a floating plate 1630 with a surround that can allow for clicking on the Z-axis via the contacts of the directional pad 1605. A flexible membrane 1635 (e.g., TPU (thermoplastic polyurethane) or other suitable material) can surround the floating plate 1630 to allow for X-Y translation input. A similar configuration can be used for the set of buttons 1615. In an embodiment, the set of buttons 1615 can be mounted on a floating plate 1640 with a surround that can allow for clicking on the Z-axis via the contacts of the set of buttons 1615. A flexible membrane 1645 (e.g., TPU or other suitable material) can surround the floating plate 1640 to allow for translation input. A limited amount of travel can provide a modest level of resistance to the user for either or both of the set of arrow keys 1610 or the set of buttons 1615.

Figure 17B:
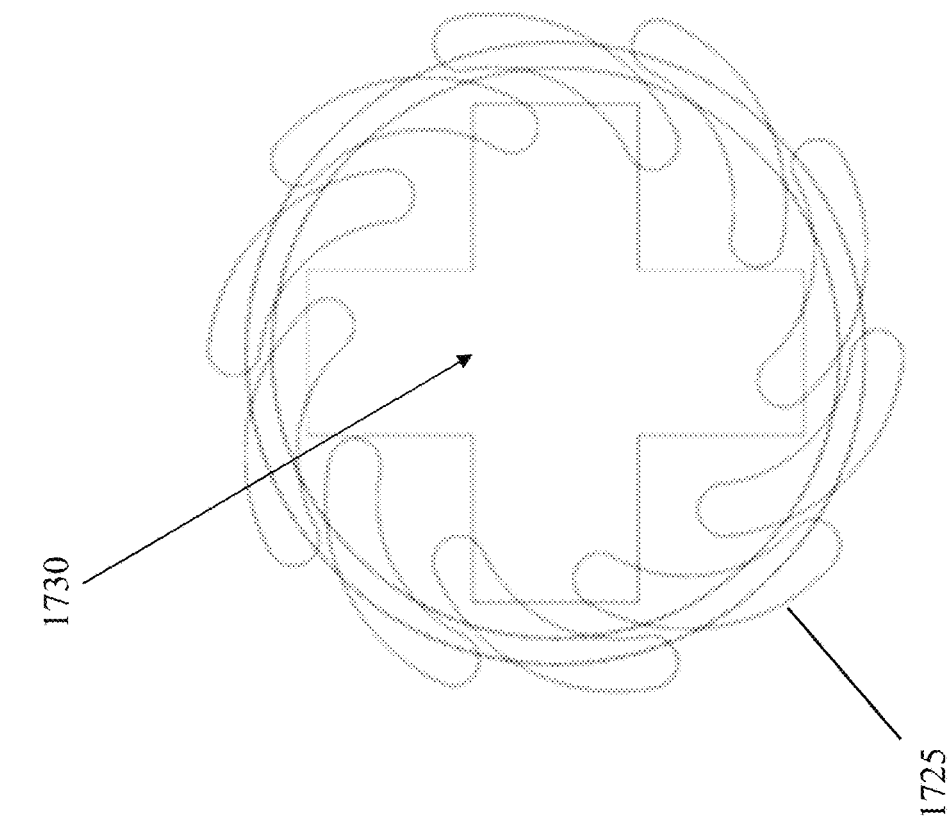
FIGS. 17A and 17B are illustrations of arrays of point of contact fingers for a directional pad.
Figure 17A:
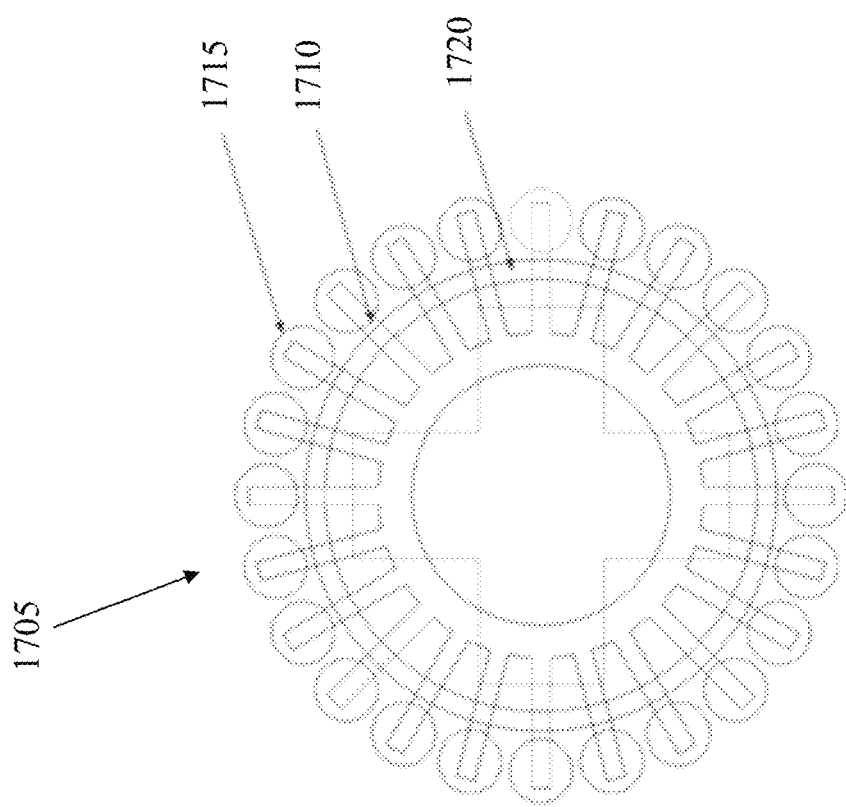

FIGS. 17A and 17B are illustrations of arrays of point of contact fingers for a directional pad, in accordance with an embodiment of the present invention. A radial layout 1705 is illustrated in FIG. 17A. The radial layout 1705 can include a plurality of metal fingers 1710. A corresponding plurality of metal contacts 1715 can reside underneath each of the plurality of metal fingers 1710. In such an embodiment, by using the plurality of metal fingers 1710 in the radial layout 1705, a closed electrical connection can be created when actuated in a certain direction (i.e., when the user presses one or more of the plurality of metal fingers 1710 into electrical contact with the corresponding one or more of the plurality of metal contacts 1710). By knowing which channel has created the closed connection, the present invention can determine in which direction the directional pad 1720 was actuated. In an alternative embodiment illustrated in FIG. 17B, a plurality of individual curved metal fingers 1725 can be arranged and substantially equally spaced around a periphery of a directional pad 1730. One or more suitable electrical contacts (not shown) can be placed underneath each of the plurality of individual curved metal fingers 1725. In such an alternative embodiment, a closed electrical connection can be created when actuated in a certain direction (i.e., when the user presses one or more of the plurality of individual curved metal fingers 1725 into electrical contact with the corresponding one or more underlying metal contacts). By knowing which channel has created the closed connection, the present invention can determine in which direction the directional pad 1730 was actuated. In either embodiment, the closed connection can also be used as a magnitude input. For example, a deformable material, such as, for instance, TPE (thermoplastic elastomer) or silicone or the like, can be used above the section being pushed onto the contacts. The number of contacts being pressed can be measured, from which a general direction can be determined by averaging the orientations of the contacts around the circle. In FIGS. 17A and 17B, the client application can be configured to report the required fidelity for directionality needed for an appropriate user experience. Merely for purposes of illustration and not limitation, the client application can report, for example, 4/8/360 points of directionality. Consequently, if a client application needs only four directions (e.g., up, down, left, and right), presses or contacts in other directions would not generate incorrect inputs, while still allowing the client application to use the directional pad (e.g., the center portion of the directional pad) in a similar fashion as an analog stick with 360 degrees of freedom.

Figure 18:
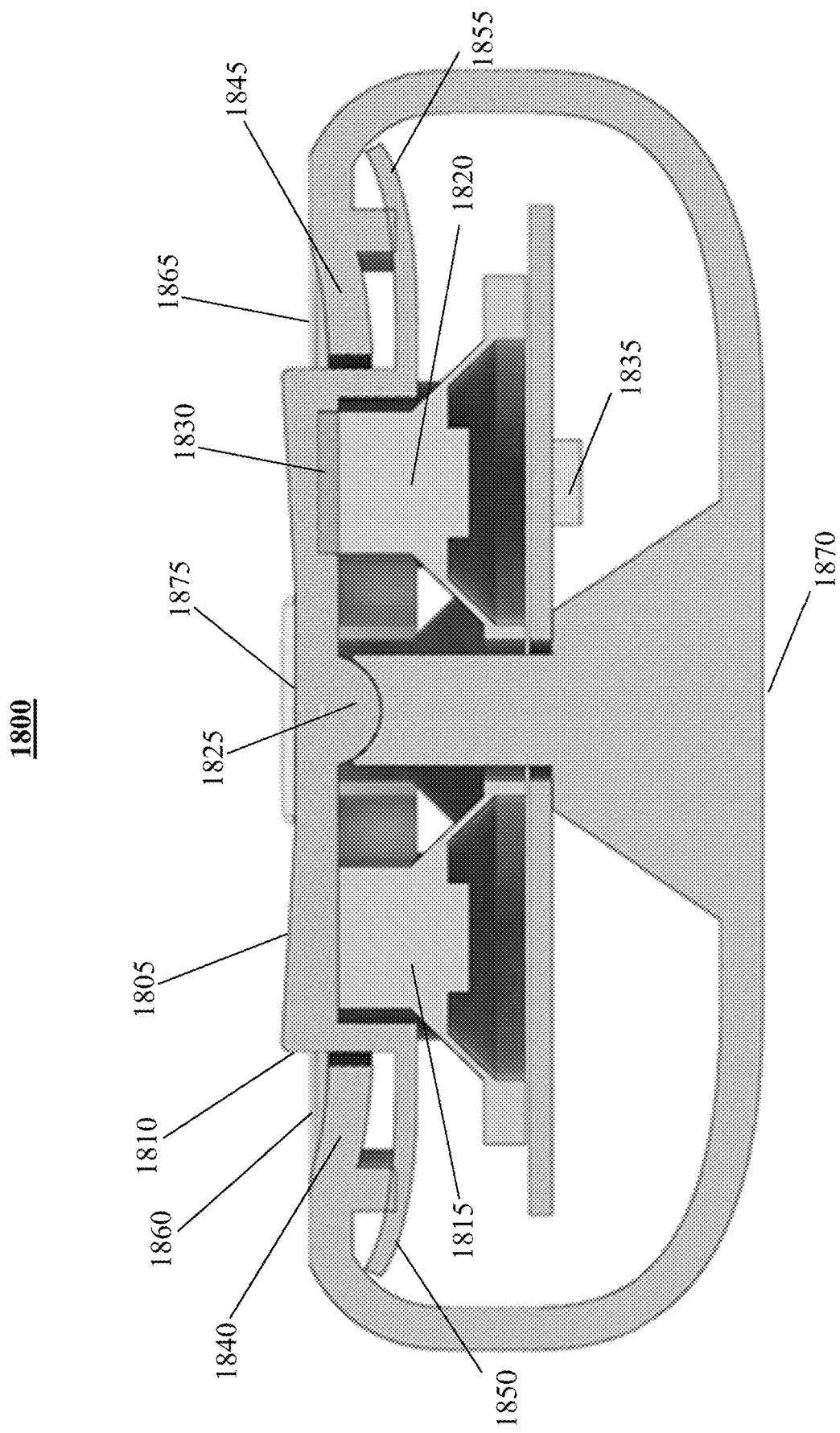
FIG. 18 is an illustration of a side view of contact pads for a directional pad.

FIG. 18 is an illustration of a side view of contact pads 1805 for a directional pad 1800, in accordance with an embodiment of the present invention. In FIG. 18, for a client application that can accept up, down, left, and right inputs via the directional pad 1800, a conventional button membrane 1810 to contact switch configuration can be used. For client applications that can use analog inputs, two distance sensors 1815 and 1820 can be used to detect deflection on both the X- and Y-axes. According to an embodiment, the contact pad 1805 can be mechanically designed to pivot on a fixed ball joint 1825 so that motion of the contact pad 1805 can be reliably predictable. In an embodiment, a magnet 1830 can be positioned above a hall effect sensor 1835 on a back side of the printed circuit board assembly (PCBA) on one axis (either the X or Y axis), and a similar magnet/hall effect sensor pair mounted on the other axis (the other of the X or Y axis). The hall effect sensors on the X and Y axes, working in conjunction with the corresponding magnets, can return the linear displacement of the X- and Y-axes, which can be used to calculate a directional vector with magnitude for a key press on the contact pad 1805. In the embodiment illustrated in FIG. 18, spring fingers 1840 and 1845 off of each arm of the contact pad 1805 can be used to keep the contact pad 1805 of the directional pad 1800 from floating in the housing. Each spring finger 1840 and 1845 can be slightly preloaded in a starting position. The button membrane 1810 can also be slightly preloaded (1850 and 1855) in an opposite direction to keep the contact pad 1805 securely in place. Guides 1860 and 1865 on each side of the contact pad 1805 can keep the contact pad 1805 constrained to X and Y movement. In an alternative embodiment, a hall effect sensor can be centered underneath at or near a bottom 1870 of the directional pad 1800 with a magnet located above (e.g., directly above) the hall effect sensor at or near a top 1875 of the directional pad 1800 that can be configured to tilt with the contact pad 1805. In such an alternative embodiment, the hall effect sensor can return the change in magnetic field vectors (magnitude and direction) that can be used to approximate the angle of displacement of the contact pad 1805. In a further alternative embodiment, a pair of suitable gyroscopic ICs can be used to determine a positional delta between a reference internal surface and the contact pad 1805.

Figure 19:
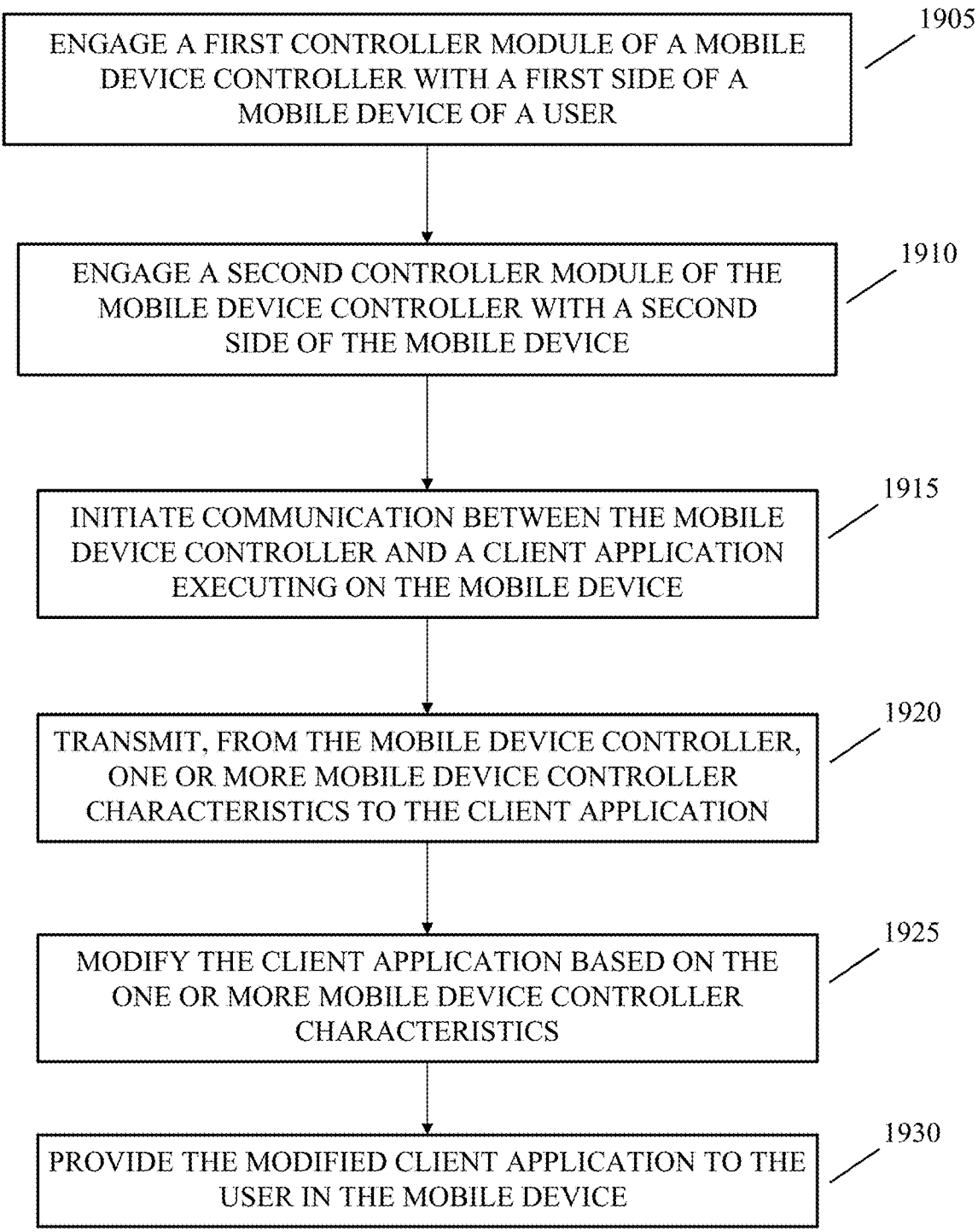
FIG. 19 is a flowchart illustrating an example method for interacting with client applications.

FIG. 19 is a flowchart illustrating an example method 1900 for interacting with client applications that can be performed using, for example, the mobile device controllers 100, 500, 900, and/or 1200, in accordance with embodiments of the disclosure. At block 1905, a first controller module of a mobile device controller can engage with a first side of a mobile device of a user. At block 1910, a second controller module of the mobile device controller can engage with a second side of the mobile device. The first and second sides can be located on opposing sides of the mobile device. In an embodiment, the first controller module can be elastically coupled to the second controller module, and the mobile device controller can be in contact with the mobile device in a form-fitting configuration. At block 1915, communication can be initiated between the mobile device controller and a client application executing on the mobile device. At block 1920, one or more mobile device controller characteristics can be transmitted from the mobile device controller to the client application. For example, the one or more mobile device controller characteristics can be associated with characteristics of the mobile device controller. At block 1925, the client application can be modified based on the one or more mobile device controller characteristics. In an embodiment, the client application can be modified by a data processor on the mobile device. At block 1930, the modified client application can be provided to the user in the mobile device. In an embodiment, the modified client application can be provided by the data processor on the mobile device. The user can interact with the modified client application using the mobile device controller.

Figure 20:
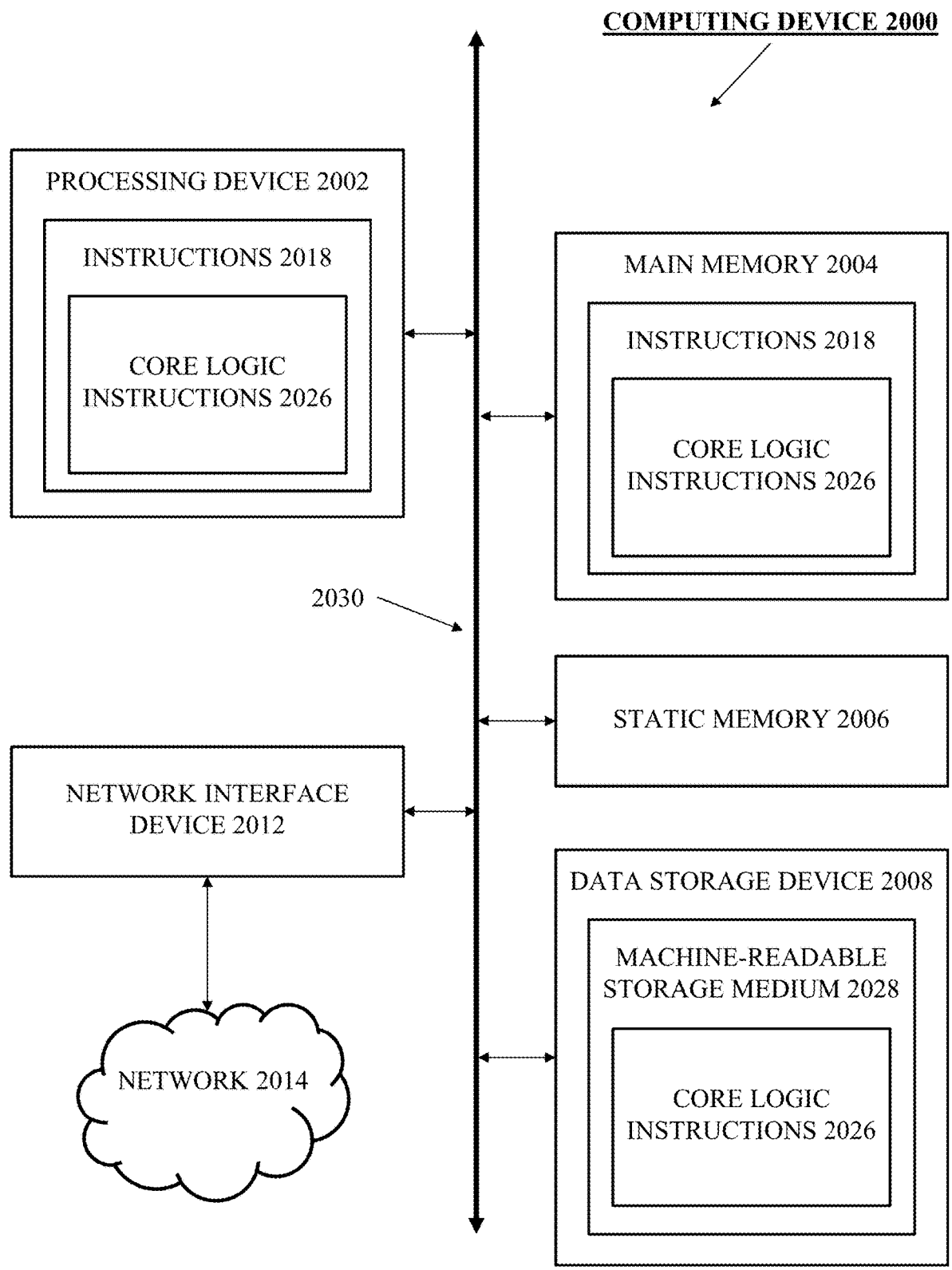
FIG. 20 is a block diagram of an example computing device that may perform one or more of the operations described herein, in accordance with the present embodiments.

FIG. 20 is a block diagram of an example computing device 2000 that may perform one or more of the operations described herein, in accordance with the present embodiments. The computing device 2000 may be connected to other computing devices in a LAN, an intranet, an extranet, and/or the Internet. The computing device 2000 may operate in the capacity of a server machine in client-server network environment or in the capacity of a client in a peer-to-peer network environment. The computing device 2000 may be provided by a personal computer (PC), a set-top box (STB), a server, a network router, switch or bridge, or any machine capable of executing a set of instructions (sequential or otherwise) that specify actions to be taken by that machine. Further, while only a single computing device 2000 is illustrated, the term "computing device" shall also be taken to include any collection of computing devices that individually or jointly execute a set (or multiple sets) of instructions to perform the methods discussed herein.

The example computing device 2000 may include a computer processing device 2002 (e.g., a general purpose processor, ASIC, etc.), a main memory 2004, a static memory 2006 (e.g., flash memory or the like), and a data storage device 2008, which may communicate with each other via a bus 2030. The computer processing device 2002 may be provided by one or more general-purpose processing devices such as a microprocessor, central processing unit, or the like. In an illustrative example, computer processing device 2002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 2002 may also comprise one or more special-purpose processing devices, such as an application specific integrated circuit (ASIC), a field programmable gate array (FPGA), a digital signal processor (DSP), network processor, or the like. The computer processing device 2002 may be configured to execute the operations described herein, in accordance with one or more aspects of the present disclosure, for performing the operations and steps discussed herein.

The computing device 2000 may further include a network interface device 2012, which may communicate with a network 2014. The data storage device 2008 may include a machine-readable storage medium 2028 on which may be stored one or more sets of instructions, e.g., instructions for carrying out the operations described herein, in accordance with one or more aspects of the present disclosure. Instructions 2018 implementing core logic instructions 2026 may also reside, completely or at least partially, within main memory 2004 and/or within computer processing device 2002 during execution thereof by the computing device 2000, main memory 2004 and computer processing device 2002 also constituting computer-readable media. The instructions may further be transmitted or received over the network 2014 via the network interface device 2012.

While machine-readable storage medium 2028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, magnetic media, and the like.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, solid state drives, or the like. However, a computer need not have such devices. Moreover, a computer can be embedded in another device, e.g., a smart phone, a mobile audio or media player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or the like, for displaying information to the user and a keyboard and a pointing device, e.g., a mouse, a trackball, a touchpad, a stylus, or the like, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), peer-to-peer networks (e.g., ad hoc peer-to-peer networks), and the like.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this disclosure to "one embodiment" or "an embodiment" means that a particular feature, structure, or characteristic described in connection with the embodiments included in at least one embodiment. Thus, the appearances of the phrase "in one embodiment" or "in an embodiment" in various places throughout this disclosure are not necessarily all referring to the same embodiment. In addition, the term "or" is intended to mean an inclusive "or" rather than an exclusive "or."

While this disclosure contains many specific implementation details, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description of illustrated implementations of the invention is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation. Additionally, any solid line, or combination of solid lines, illustrated in the drawings can alternatively be illustrated as dotted lines and vice versa.

What is claimed is:

1. A method, comprising:
engaging a first controller module of a mobile device controller with a first side of a mobile device of a user;
engaging a second controller module of the mobile device controller with a second side of the mobile device, causing the mobile device to be contacted with an inductive charging module comprising a magnetic charging module configured to align the mobile device with charging coils of the charging module, wherein the magnetic alignment module is additionally configured to allow the mobile device to rotate into a portrait mode or a landscape mode while contacted to the inductive charging module, wherein the first controller module is elastically coupled to the second controller module via an expandable bridge, wherein the expandable bridge is configured to expand and contract to maintain the mobile device and the inductive charging module in a center position between the first controller module and the second controller module, and wherein the mobile device controller is in contact with the mobile device in a form-fitting configuration;
transmitting, from the mobile device controller, one or more mobile device controller characteristics to the mobile device, wherein the one or more mobile device controller characteristics are associated with characteristics of the mobile device controller;
modifying, by a first data processor, a client application on the mobile device based on the one or more mobile device controller characteristics; and
providing, by the first data processor, the modified client application to the user in the mobile device, wherein the user interacts with the modified client application using the mobile device controller.

2. The method of claim 1, further comprising:
initiating communication between the mobile device controller and the mobile device.

3. The method of claim 2, wherein the initiating includes pairing the mobile device controller with the mobile device over a wireless communication protocol.

4. The method of claim 1, wherein the engaging of the first controller module with the mobile device includes sliding the first controller module away from the second controller module.

5. The method of claim 1, wherein the mobile device controller includes a pair of flaps configured to retain the mobile device when the first side of the mobile device is engaged by the first controller module and when the second side of the mobile device is engaged by the second controller module.

6. The method of claim 1, further comprising:
disengaging the mobile device from the first controller module and the second controller module; and
sliding the first controller module toward the second controller module.

7. The method of claim 1, wherein at least one of the first controller module and the second controller module includes at least one button disposed thereon and configured to receive a user input for controlling the client application.

8. The method of claim 1, wherein at least one of the first controller module and the second controller module includes a directional pad button disposed thereon and configured to receive a user input for controlling the client application.

9. A mobile device controller, comprising:
a first controller module configured to engage a first side of a mobile device;
a second controller module configured to engage a second side of the mobile device, the second side opposite the first side;
an inductive charging module configured to contact the mobile device, the charging module comprising:
a magnetic alignment module configured to align the mobile device with charging coils of the charging module, wherein the magnetic alignment module is additionally configured to allow the mobile device to rotate into a portrait mode or a landscape mode while contacted to the inductive charging module; and
an expandable bridge positioned between the first controller module and the second controller module to elastically couple the first controller module to the second controller module, wherein the mobile device controller is in contact with the mobile device in a form-fitting configuration, wherein the expandable bridge is configured to expand and contract to maintain the mobile device and the inductive charging module in a center position between the first controller module and the second controller module, and wherein at least one of the first controller module or the second controller module includes at least one processor and a memory storing instructions, which, when executed by the at least one processor, cause the at least one processor to perform operations comprising:

transmitting, from the mobile device controller, one or more mobile device controller characteristics to the mobile device, wherein the one or more mobile device controller characteristics are associated with characteristics of the mobile device controller, wherein a client application on the mobile device is modified based on the one or more mobile device controller characteristics, wherein the modified client application is provided to the user in the mobile device, and wherein the user interacts with the modified client application using the mobile device controller.

10. The mobile device controller of claim 9, wherein the first controller module is configured to receive a first user input for controlling the client application, and wherein the second controller module is configured to receive a second user input for controlling the client application.

11. The mobile device controller of claim 9, wherein the first controller module includes a first hinge structure configured to extend from the first controller module and to engage with the first side of the mobile device when the first controller module is extended laterally away from the second controller module.

12. The mobile device controller of claim 11, wherein the second controller module includes a second hinge structure, and wherein the second hinge structure is configured to extend from the second controller module and engage with a second side of the mobile device when the second controller module is extended laterally away from the first controller module.

13. The mobile device controller of claim 9, wherein the expandable bridge includes a first elastic structure and a second elastic structure for adjusting the mobile device controller to fit mobile devices of different sizes, wherein the first elastic structure is coupled between the first controller module and a first end of the expandable bridge, wherein the second elastic structure is coupled between the second controller module and a second end of the expandable bridge.

14. The mobile device controller of claim 9, wherein the operations further include:

initiating communication between the mobile device controller and the client application executing on the mobile device.

15. The mobile device controller of claim 14, wherein the initiating includes pairing the mobile device controller with the mobile device over a wireless communication protocol.

16. The mobile device controller of claim 9, wherein the mobile device is positioned in a portrait orientation when the first side of the mobile device is engaged by the first controller module and when the second side of the mobile device is engaged by the second controller module.

17. The mobile device controller of claim 9, wherein at least one of the first controller module and the second controller module includes at least one button disposed thereon and configured to receive a user input for controlling the client application.

18. The mobile device controller of claim 9, wherein at least one of the first controller module and the second controller module includes a directional pad button disposed thereon and configured to receive a user input for controlling the client application.

19. The mobile device controller of claim 17, wherein the first controller module and the second controller module include at least one button disposed thereon and configured to receive a user input for controlling the client application, wherein the expandable bridge is configured to place the first controller module in an expanded position or in a contracted position, wherein the expandable bridge is configured to place the second controller module in an expanded position or a contracted position, wherein a button of the first controller module is configured to receive the user input when the first controller module in the expanded position or in the contracted position, and wherein a button of the second controller module is configured to receive the user input when the second controller module is in the expanded position or in the contracted position.

* * * * *